(12) United States Patent
Fong et al.

(10) Patent No.: US 12,458,191 B2
(45) Date of Patent: Nov. 4, 2025

(54) CONTROL OF AUTONOMOUS MOBILE ROBOTS

(71) Applicant: iRobot Corporation, Bedford, MA (US)

(72) Inventors: Philip Fong, South Pasadena, CA (US); Ryan Schneider, Arlington, MA (US)

(73) Assignee: iRobot Corporation, Bedford, MA (US)

( * ) Notice: Subject to any disclaimer, the term of this patent is extended or adjusted under 35 U.S.C. 154(b) by 1234 days.

(21) Appl. No.: 16/895,848

(22) Filed: Jun. 8, 2020

(65) Prior Publication Data

US 2021/0282613 A1    Sep. 16, 2021

Related U.S. Application Data

(60) Provisional application No. 62/988,468, filed on Mar. 12, 2020.

(51) Int. Cl.
*G05D 1/00*    (2024.01)
*A47L 9/00*    (2006.01)
(Continued)

(52) U.S. Cl.
CPC ............. *A47L 9/2852* (2013.01); *A47L 9/009* (2013.01); *A47L 9/0477* (2013.01);
(Continued)

(58) Field of Classification Search
CPC ...... A47L 9/2852; A47L 9/009; A47L 9/0477; A47L 9/2826; A47L 9/2831; A47L 2201/022; A47L 2201/04; A47L 2201/06; A47L 9/2857; A47L 9/2894; A47L 11/4011; A47L 11/4061; A47L 9/2805; G05D 1/0212; G05D 2201/0203; G05D 2201/0215; G05D 1/0227; G05D 1/0274; G05D 1/0044; G05D 1/0246
(Continued)

(56) References Cited

U.S. PATENT DOCUMENTS 6,690,134 B1    2/2004    Jones et al.
8,386,081 B2    2/2013    Landry et al.
(Continued)

FOREIGN PATENT DOCUMENTS

JP    2005312893 A    * 11/2005
JP    2013-045463    3/2013
(Continued)

OTHER PUBLICATIONS

JP2005312893A.translate (Year: 2005).*
(Continued)

*Primary Examiner* — B M M Hannan
(74) *Attorney, Agent, or Firm* — Fish & Richardson P.C.

(57) ABSTRACT

A method includes receiving mapping data collected by an autonomous cleaning robot as the autonomous cleaning robot moves about an environment. A portion of the mapping data is indicative of a location of an object in the environment. The method includes defining a clean zone at the location of the object such that the autonomous cleaning robot initiates a clean behavior constrained to the clean zone in response to encountering the clean zone in the environment.

24 Claims, 35 Drawing Sheets

(51) Int. Cl.
    *A47L 9/04*           (2006.01)
    *A47L 9/28*           (2006.01)

(52) U.S. Cl.
    CPC ........... *A47L 9/2826* (2013.01); *A47L 9/2831* (2013.01); *G05D 1/0212* (2013.01); *A47L 2201/022* (2013.01); *A47L 2201/04* (2013.01); *A47L 2201/06* (2013.01)

(58) Field of Classification Search
    USPC ......................................................... 701/25
    See application file for complete search history.

(56) References Cited

U.S. PATENT DOCUMENTS

| | | | |
|---|---|---|---|
| 9,026,302 | B2 | 5/2015 | Stout et al. |
| 9,436,186 | B2 * | 9/2016 | Oh ..................... G05D 1/0251 |
| 9,554,508 | B2 | 1/2017 | Balutis et al. |
| 9,868,211 | B2 | 1/2018 | Williams et al. |
| 10,383,497 | B2 * | 8/2019 | Han ..................... G05D 1/0274 |
| 10,583,562 | B2 * | 3/2020 | Stout .................... B25J 5/007 |
| 11,199,853 | B1 * | 12/2021 | Afrouzi ............... G05D 1/0246 |
| 11,241,791 | B1 * | 2/2022 | Ebrahimi Afrouzi ... G06T 7/262 |
| 11,274,929 | B1 * | 3/2022 | Afrouzi ............... A47L 11/4013 |
| 2002/0153184 | A1 * | 10/2002 | Song ................... G05D 1/0282 |
| | | | 180/167 |
| 2011/0202175 | A1 * | 8/2011 | Romanov ........... A47L 11/4036 |
| | | | 700/250 |
| 2011/0264305 | A1 * | 10/2011 | Choe .................... G05D 1/0246 |
| | | | 701/28 |
| 2013/0211589 | A1 | 8/2013 | Landry et al. |
| 2014/0303775 | A1 * | 10/2014 | Oh ....................... G05D 1/0016 |
| | | | 901/1 |
| 2015/0150428 | A1 * | 6/2015 | Park .................... A47L 11/4011 |
| | | | 15/340.1 |
| 2015/0158174 | A1 | 6/2015 | Romanov et al. |
| 2016/0297072 | A1 * | 10/2016 | Williams ............... B25J 9/1694 |
| 2017/0265703 | A1 * | 9/2017 | Park ......................... B25J 9/16 |
| 2018/0050634 | A1 | 2/2018 | White et al. |
| 2018/0074508 | A1 | 3/2018 | Kleiner et al. |
| 2018/0284792 | A1 | 10/2018 | Kleiner et al. |
| 2018/0292832 | A1 | 10/2018 | Bae et al. |
| 2018/0344116 | A1 * | 12/2018 | Schriesheim ......... G06F 3/0486 |
| 2019/0015985 | A1 * | 1/2019 | Kim ..................... B25J 11/0085 |
| 2019/0120633 | A1 * | 4/2019 | Afrouzi ............... G05D 1/0219 |
| 2019/0176321 | A1 * | 6/2019 | Afrouzi .................... A47L 9/00 |
| 2019/0204851 | A1 * | 7/2019 | Afrouzi ................ A47L 9/2852 |
| 2019/0332114 | A1 * | 10/2019 | Moroniti ................ G06V 20/64 |
| 2020/0012289 | A1 * | 1/2020 | Kim ..................... G05D 1/0246 |
| 2020/0069134 | A1 * | 3/2020 | Ebrahimi Afrouzi ........................ G05D 1/0248 |
| 2020/0089255 | A1 * | 3/2020 | Kolling ................. G05D 1/0219 |
| 2020/0170470 | A1 * | 6/2020 | Liggett ................. A47L 9/2852 |
| 2020/0178748 | A1 * | 6/2020 | Han ..................... G05D 1/0238 |
| 2020/0293060 | A1 * | 9/2020 | Jeong ................... A47L 9/2826 |
| 2021/0055736 | A1 * | 2/2021 | Han ..................... G05D 1/0217 |
| 2021/0059493 | A1 * | 3/2021 | Watanabe ............ G05D 1/0219 |
| 2021/0096560 | A1 | 4/2021 | Al-Mohssen et al. |
| 2021/0114220 | A1 * | 4/2021 | Shin ..................... A47L 9/2852 |
| 2021/0132607 | A1 * | 5/2021 | Maeng ................. G05D 1/0231 |
| 2021/0272471 | A1 * | 9/2021 | Kolling ................. A47L 9/2826 |
| 2021/0282613 | A1 * | 9/2021 | Fong .................... G05D 1/0227 |
| 2021/0330163 | A1 * | 10/2021 | Kim ..................... G05D 1/0221 |
| 2022/0047141 | A1 * | 2/2022 | Xu ...................... A47L 11/4055 |
| 2022/0061617 | A1 * | 3/2022 | Byun ........................ A47L 9/28 |

FOREIGN PATENT DOCUMENTS

| | | |
|---|---|---|
| JP | 2016-036725 | 3/2016 |
| JP | 2019-103618 A | 12/2017 |
| JP | 2018-075167 | 5/2018 |
| JP | 2018-165872 | 10/2018 |
| JP | 2019-071046 A | 5/2019 |
| JP | 2019-126427 | 8/2019 |
| JP | 2019-171001 | 10/2019 |
| JP | 2019-171017 A | 10/2019 |
| WO | WO 2019/063066 A1 | 4/2019 |
| WO | WO 2019/072965 | 4/2019 |

OTHER PUBLICATIONS

[No Author Listed] "Neato All-Floor Robotic Vacuum User's Guide," Neato Robotics, 2011, 174 pages.
Ecovacs.cn [online] "DN33 tips," retrieved on Jun. 17, 2019, retrieved from URL <https://www.ecovacs.cn/deebot/dn33/use-tips-4.html>.
International Search Report and Written Opinion in International Appln. No. PCT/US2020/26183, dated Jun. 29, 2020, 13 pages.
PCT Invitation to Pay Additional Fees in International Appln. No. PCT/US2021/017240, dated May 25, 2021, 8 pages.
PCT International Search Report and Written Opinion in International Appln. No. PCT/US2021/017240, dated Jul. 5, 2021, 16 pages.
International Preliminary Report on Patentability in International Appln. No. PCT/US2021/017240, mailed Sep. 22, 2022, 9 pages.

* cited by examiner

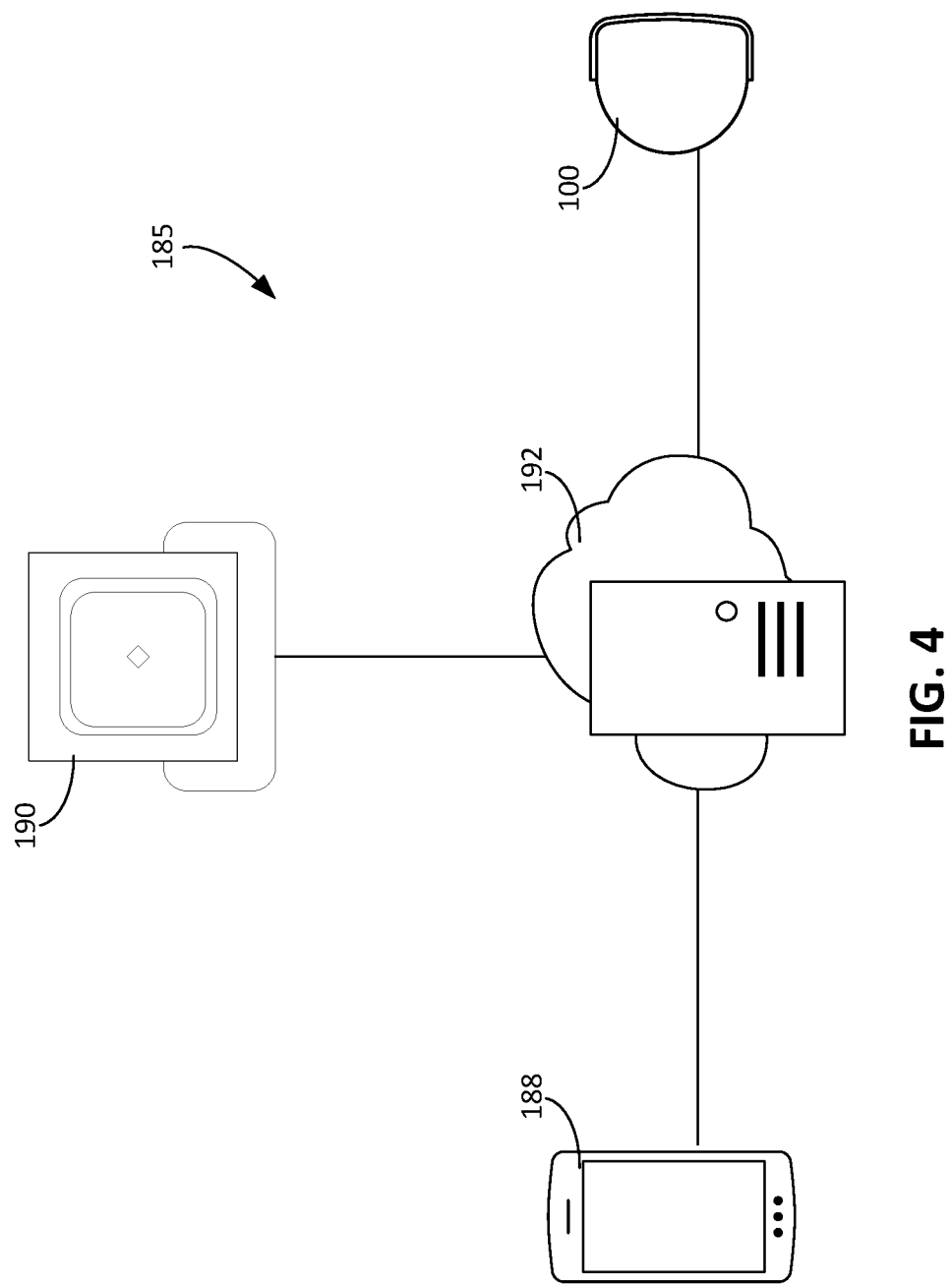

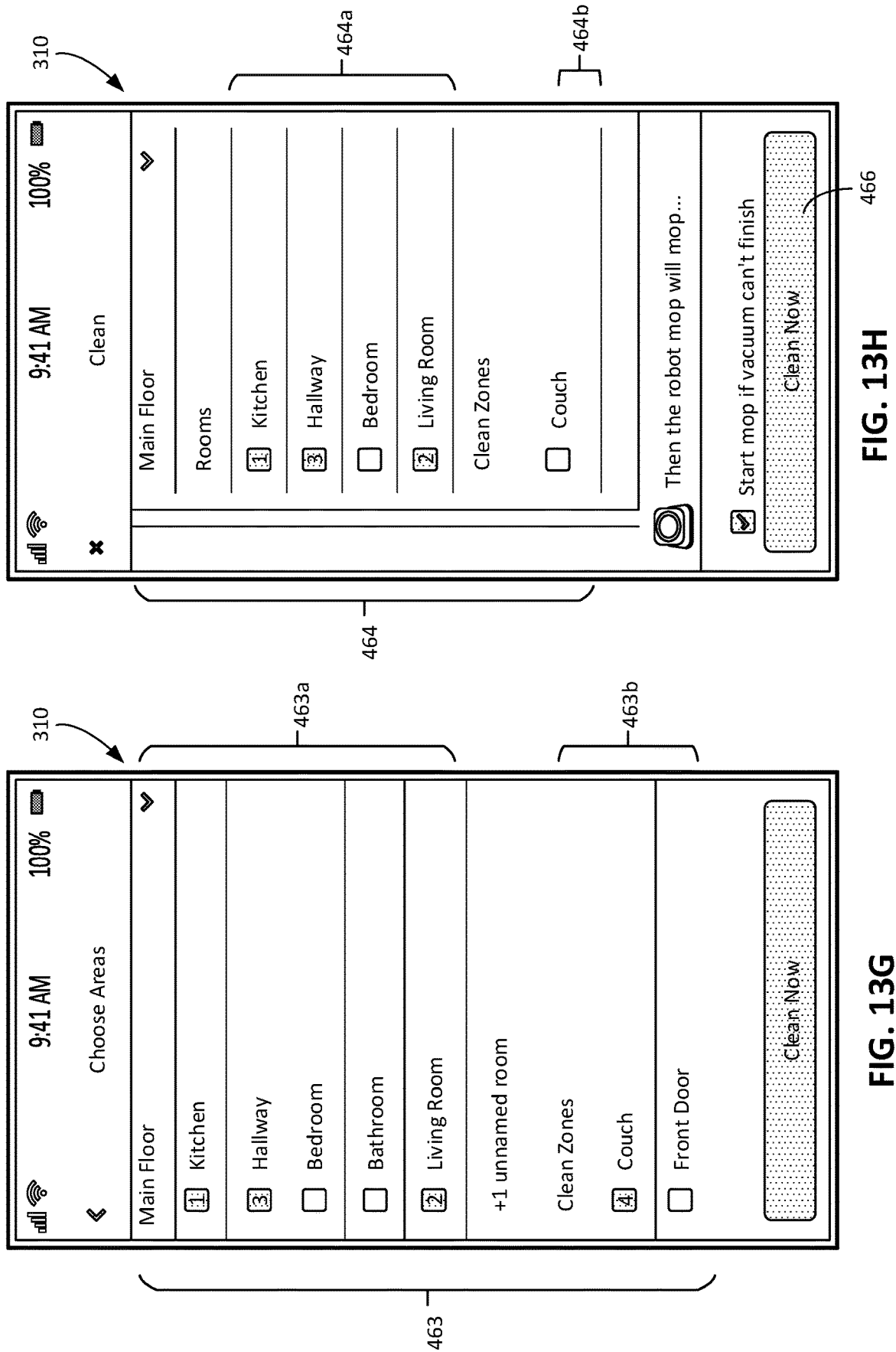

CONTROL OF AUTONOMOUS MOBILE ROBOTS

CROSS-REFERENCE TO RELATED APPLICATIONS

This application claims priority to U.S. Application Ser. No. 62/988,468, filed on Mar. 12, 2020, the entirety of which is incorporated by reference in this disclosure.

TECHNICAL FIELD

This specification relates to control of autonomous mobile robots.

BACKGROUND

Autonomous mobile robots include autonomous cleaning robots that autonomously perform cleaning tasks within an environment, e.g., a home. Many kinds of cleaning robots are autonomous to some degree and in different ways. A cleaning robot can include a controller configured to autonomously navigate the robot about an environment such that the robot can ingest debris as it moves.

SUMMARY

An autonomous mobile robot can clean a home during a cleaning mission, e.g., by vacuuming, mopping, or performing some other cleaning operation in the home. A user can operate a user computing device, such as a smartphone, to establish behavior control zones that trigger the robot to perform certain behaviors in response to encountering the behavior control zones. A behavior control zone can be prioritized, e.g., through user, computer, etc., selection so that the robot prioritizes moving to the behavior control zone and initiating the behavior associated with the behavior control zone during a cleaning mission. The behavior control zone can be, for example, a focused clean zone, and the robot can prioritize cleaning the region encompassed by the behavior control zone at the beginning of the cleaning mission.

Advantages of the implementations described in this disclosure may include, but are not limited to, those described below and elsewhere in this disclosure.

The cleaning missions performed by the robot can be optimized to allow the robot to efficiently clean regions. For example, in implementations in which the behavior control zones are clean zones, the robot can prioritize regions covered by the clean zones so that the robot can increase the amount of debris that the robot picks up during a cleaning mission. In particular, if the cleaning mission is time-constrained, and priorities for the behavior control zones can indicate to the robot which regions in an environment to prioritize during the cleaning mission. The behavior control zones can correspond to regions that tend to become dirtier more quickly, and thus the priorities can allow the robot to clean dirtier regions first in time-constrained cleaning missions. In some implementations, the cleaning mission can be time-constrained because of the energy level of the robot. For example, the robot may be less than fully charged, and may have an insufficient energy level to be able to cover an entirety of a floor surface of the environment because of this insufficient energy level. The robot can prioritize the behavior control zones so that the robot can first clean the dirtier regions in the environment. Thus, through the methods, systems, etc., described in this disclosure, the robot can clean the environment in a way that prioritizes cleaning dirtier regions.

In implementations in which multiple behavior control zones are defined, the methods and systems described in this disclosure can provide ways for a user to manage and prioritize cleaning these multiple behavior control zones, thus improving the efficiency in which robots can clean an environment. For example, the user can prioritize one behavior control zone over another behavior control zone, thus allowing the user to define, with particularity, which zones the robot should first direct its attention at the start of a cleaning mission, and which zones the robot should next directs its attention. Each behavior control zone also can be associated with multiple priorities, each priority corresponding to a different autonomous mobile robot that operates in the environment. This way, the behavior control zones can have different priorities depending on the autonomous mobile robot.

The prioritization of the behavior control zones can be based on data collected by autonomous mobile robots operating in the environment, allowing computer-selected and user-selected behavior control zones to be based on accurate real world observations of conditions in the environment. For example, the robot can have a debris sensor that can collect data indicative of an amount of debris collected in different portions of the environment. These data can be used by a computer system to recommend a behavior control zone, or can be used to present information to the user about the amount of debris collected in different portions of the environment so that the user can make an informed selection of a behavior control zone. Other sensors of the robot can also be used for a data-driven approach for selecting behavior control zones. For example, the robot can have an image capture device that collects data indicative of objects in the environment. The objects can be objects associated with debris, e.g., kitchen counters, entryways, dining room tables, or other objects where debris tends to be dropped onto the floor surface. The locations of these objects can be used for recommending or selecting a behavior control zone.

The systems and methods described in this disclosure can improve system-level interactions among autonomous mobile robots, users, and, if present, remote computing systems. In particular, the systems and methods can allow data and input from the autonomous mobile robots, the users, and the remote computing systems to be used together to control the behaviors of one or more of the autonomous mobile robots. Behavior control zones can be generated based on a combination of both sensor data produced by an autonomous mobile robot as well as user input provided by a user. In addition, in implementations in which multiple autonomous mobile robots are present, sensor data from each of the autonomous mobile robots can be used to generate a behavior control zone. Remote computing systems can gather the sensor data from one or more autonomous mobile robots operating in the environment, and can also gather user input from one or more users. A behavior control zone that is generated can be used to control behaviors of multiple autonomous mobile robots operating in the environment. Furthermore, the behavior control zone can allow for tailored control of the autonomous mobile robots. For example, a first of the autonomous mobile robots can be controlled to perform a first behavior when the first autonomous mobile robot encounters the behavior control zone, while a second of the autonomous mobile robots can be controlled to perform a second behavior when the second autonomous mobile robot encounters the behavior control zone.

The systems and methods described in this disclosure can improve user interactions with autonomous mobile robots operating in the environment. The user interface can serve as a medium for the user to receive visual information on location-based control of the autonomous mobile robot. The user interface of the user computing device can present an intuitive map of the environment that shows how the autonomous robot behavior may behave when operating in the environment. The user can thus view the map presented on the user interface to get a sense of the different behavior control zones that are controlling the behavior of the autonomous mobile robot. Furthermore, the user can easily use the user interface to modify or create behavior control zones in the environment.

In one aspect, a method includes receiving mapping data collected by an autonomous cleaning robot as the autonomous cleaning robot moves about an environment. A portion of the mapping data is indicative of a location of an object in the environment. The method includes defining a clean zone at the location of the object such that the autonomous cleaning robot initiates a clean behavior constrained to the clean zone in response to encountering the clean zone in the environment.

In another aspect, a method includes receiving mapping data collected by an autonomous cleaning robot as the autonomous cleaning robot moves about an environment, defining a behavior control zone corresponding to a portion of the mapping data such that an autonomous cleaning robot initiates a behavior in response to encountering the behavior control zone in the environment, and associating a priority with the behavior control zone such that the autonomous cleaning robot, based on the priority associated with the behavior control zone, initiates movement to the behavior control zone.

In another aspect, a method performed by an autonomous cleaning robot includes transmitting, to a remote computing system, mapping data collected by the autonomous cleaning robot as the autonomous cleaning robot moves about an environment, receiving data indicative of a behavior control zone associated with a portion of the mapping data and data indicative of a priority associated with the behavior control zone, and initiating, based on the priority, movement to the behavior control zone and initiating a behavior in the behavior control zone in response to encountering the behavior control zone in the environment.

In another aspect, an autonomous cleaning robot includes a drive system configured to move the autonomous cleaning robot about an environment as the autonomous cleaning robot cleans a floor surface in the environment, a sensor to generate mapping data as the autonomous cleaning robot moves about the environment, and a controller configured to execute instructions to perform operations. The operations include transmitting, to a remote computing system, the mapping data collected by the autonomous cleaning robot as the autonomous cleaning robot moves about the environment, receiving data indicative of a behavior control zone associated with a portion of the mapping data and data indicative of a priority associated with the behavior control zone, and initiating, based on the priority, movement to the behavior control zone and initiating a behavior in the behavior control zone in response to encountering the behavior control zone in the environment.

In some implementations, defining the clean zone can include defining the clean zone based on a type of the object.

In some implementations, the method can further include determining the type of the object based on one or more contextual features in the environment proximate to the object in the environment. Defining the clean zone can include defining, based on the determined type of the object, the clean zone.

In some implementations, after performing the clean behavior within the clean zone, the autonomous cleaning robot can initiate movement to another clean zone associated with another object in the environment, and then can initiate a clean behavior in response to encountering the other clean zone.

In some implementations, the method can further include associating a priority with the clean zone such that the autonomous cleaning robot, based on the priority associated with the clean zone, initiates movement to the clean zone. In some implementations, the autonomous cleaning robot can initiate the movement to the clean zone in response to a mission with an expected duration less than a threshold duration. In some implementations, the autonomous cleaning robot can initiate the movement to the clean zone in response to a low battery status of the autonomous cleaning robot. In some implementations, the method can further include causing the autonomous cleaning robot, in response to an initiation of a mission in the environment, to initiate the movement to the clean zone from a docking station.

In some implementations, the clean behavior can correspond to a focused clean behavior. In some implementations, the focused clean behavior can cause the autonomous cleaning robot to cover the clean zone two or more times, to increase a vacuum power of the autonomous cleaning robot, or to decrease a movement speed of the autonomous cleaning robot.

In some implementations, associating the priority with the behavior control zone can cause the autonomous cleaning robot to initiate the movement to the behavior control zone at a start of a mission, and then initiate the behavior in response to encountering the behavior control zone, the behavior corresponding to a focused clean behavior performed within the behavior control zone. In some implementations, after performing the focused clean behavior within the behavior control zone, the autonomous cleaning robot can initiate movement to another behavior control zone associated with another priority lower than the priority associated with the behavior control zone, and then can initiate a focused clean behavior in response to encountering the other behavior control zone.

In some implementations, associating the priority with the behavior control zone can include associating the priority with the behavior control zone based on a user selection of an environmental feature to associate with the behavior control zone.

In some implementations, the method can further include defining a multiple behavior control zones. Defining the multiple behavior control zones can include defining the behavior control zone. The method can further include associating a multiple priorities with the multiple behavior control zones, respectively. Associating the multiple priorities with the multiple behavior control zones can include associating the priority with the behavior control zone. In some implementations, the method can further include providing, to the autonomous cleaning robot, a schedule to cause the autonomous cleaning robot to prioritize cleaning a first subset of the multiple behavior control zones during a first time, and to prioritize cleaning a second subset of the multiple behavior control zones during a second time. In some implementations, the first time can be during a first cleaning mission, and the second time can be during a second cleaning mission. In some implementations, the first time and the second time can be during a cleaning mission.

In some implementations, the autonomous cleaning robot can initiate the movement to the behavior control zone in response to a mission with an expected duration less than a threshold duration.

In some implementations, the autonomous cleaning robot initiates the movement to the behavior control zone in response to a low battery status of the autonomous cleaning robot.

In some implementations, the autonomous cleaning robot initiates the movement to the behavior control zone before the autonomous cleaning robot initiates movement to a region in the environment associated with a priority lower than the priority associated with the behavior control zone.

In some implementations, the method can further include causing the autonomous cleaning robot, in response to an initiation of a mission in the environment, to initiate the movement to the behavior control zone from a docking station.

In some implementations, the behavior control zone can be a first behavior control zone, the priority can be a first priority, and the behavior can be a first behavior. The method can further include defining a second behavior control zone such that the autonomous cleaning robot initiates a second behavior in response to encountering the second behavior control zone in the environment, and associating the second behavior control zone with a second priority such that the autonomous cleaning robot, based on the second priority associated with the second behavior control zone, initiates movement to the second behavior control zone. In some implementations, the first priority of the first behavior control zone can be higher than the second priority of the second behavior control zone such that the autonomous cleaning robot initiates movement to the first behavior control zone before initiating movement to the second behavior control zone.

In some implementations, associating the priority with the behavior control zone can include associating the priority with the behavior control zone based on a user selection of the priority.

In some implementations, the method can further include receiving sensor data collected by the autonomous cleaning robot as the autonomous cleaning robot moves about the environment. Associating the priority with the behavior control zone can include associating the priority with the behavior control zone based on the sensor data. In some implementations, the sensor data can be indicative of an amount of debris detected in a region covered by the behavior control zone during a mission of the autonomous cleaning robot, and associating the priority with the behavior control zone based on the sensor data can include associating the priority with the behavior control zone based on the amount of debris detected in the region covered by the behavior control zone. In some implementations, the sensor data can be indicative of a type of debris detected in a region covered by the behavior control zone during a mission of the autonomous cleaning robot, and associating the priority with the behavior control zone based on the sensor data can include associating the priority with the behavior control zone based on the type of debris. In some implementations, the sensor data can be indicative of an object proximate to or within the behavior control zone during a mission of the autonomous cleaning robot, and associating the priority with the behavior control zone based on the sensor data can include associating the priority with the behavior control zone based on a type of the object.

In some implementations, associating the priority with the behavior control zone can include receiving a user selection of the priority based on a recommended priority. The recommended priority can be based on sensor data collected by the autonomous cleaning robot as the autonomous cleaning robot moves about the environment.

In some implementations, the behavior can correspond to a focused clean behavior.

In some implementations, the focused clean behavior can cause the autonomous cleaning robot to cover the behavior control zone two or more times, to increase a vacuum power of the autonomous cleaning robot, or to decrease a movement speed of the autonomous cleaning robot.

In some implementations, initiating the movement to the behavior control zone can include initiating the movement to the behavior control zone at a start of a mission, and initiating the behavior in the behavior control zone can include initiating a focused clean behavior in the behavior control zone.

In some implementations, the method can further include after initiating the behavior in the behavior control zone, initiating movement to another behavior control zone associated with another priority lower than the priority associated with the behavior control zone and initiating a focused clean behavior in the other behavior control zone in response to encountering the other behavior control zone.

In some implementations, the method can further include receiving data indicative of a multiple behavior control zones and data indicative of a multiple priorities associated with the multiple behavior control zones, respectively. Receiving the data indicative of the multiple behavior control zones and the data indicative of the multiple priorities can include receiving the data indicative of the behavior control zone and the data indicative of the priority. In some implementations, the method can further include receiving a schedule to cause the autonomous cleaning robot to prioritize cleaning a first subset of the multiple behavior control zones during a first mission, and to prioritize cleaning a second subset of the multiple behavior control zones during a second mission.

In some implementations, initiating, based on the priority, the movement to the behavior control zone can include initiating, based on the priority, the movement to the behavior control zone in response to a mission with an expected duration less than a threshold duration.

In some implementations, initiating, based on the priority, the movement to the behavior control zone can include initiating the movement to the behavior control zone in response to a low battery status of the autonomous cleaning robot.

In some implementations, initiating, based on the priority, the movement to the behavior control zone can include initiating the movement to the behavior control zone before initiating movement to a region in the environment associated with a priority lower than the priority associated with the behavior control zone.

In some implementations, initiating, based on the priority, movement to the behavior control zone can include initiating, in response to initiating a mission in the environment, the movement to the behavior control zone.

In some implementations, the behavior control zone can be a first behavior control zone, the priority can be a first priority, and the behavior can be a first behavior, and the method can further include receiving data indicative of a second behavior control zone and data indicative of a second priority associated with the second behavior control zone and initiating, based on a second priority, movement to a second behavior control zone and initiating a second behavior in the second behavior control zone in response to encountering the second behavior control zone in the environment. In some implementations, the first priority of the first behavior control zone can be higher than the second priority of the second behavior control zone, and initiating, based on the second priority, the movement to the second behavior control zone can include initiating the movement to the second behavior control zone after initiating, based on the first priority, the movement to the first behavior control zone.

In some implementations, the priority can be a user-selected priority.

In some implementations, the method can include transmitting, to the remote computing system, sensor data collected by the autonomous cleaning robot as the autonomous cleaning robot moves about the environment. The priority can be selected based on the sensor data. In some implementations, the sensor data can be indicative of an amount of debris detected in a region covered by the behavior control zone during a mission of the autonomous cleaning robot, and the priority can be selected based on the amount of debris detected in the region covered by the behavior control zone. In some implementations, the sensor data can be indicative of a type of debris detected in a region covered by the behavior control zone during a mission of the autonomous cleaning robot, and the priority can be selected based on the type of debris. In some implementations, the sensor data can be indicative of an object proximate to or within the behavior control zone during a mission of the autonomous cleaning robot, and the priority can be selected based on a type of the object.

In some implementations, the priority can be a user-selected priority selected based on a recommended priority. The recommended priority can be based on sensor data collected by the autonomous cleaning robot as the autonomous cleaning robot moves about the environment.

In some implementations, the behavior can correspond to a focused clean behavior. The focused clean behavior can cause the autonomous cleaning robot to cover the behavior control zone two or more times, to increase a vacuum power of the autonomous cleaning robot, or to decrease a movement speed of the autonomous cleaning robot.

In a further aspect, a method includes receiving mapping data collected by an autonomous cleaning robot as the autonomous cleaning robot moves about an environment, and defining a behavior control zone corresponding to a portion of the mapping data such that the autonomous cleaning robot disables a behavior as the autonomous cleaning robot traverses the behavior control zone.

In another aspect, a method performed by an autonomous cleaning robot includes transmitting, to a remote computing system, mapping data collected by the autonomous cleaning robot as the autonomous cleaning robot moves about an environment, receiving data indicative of a behavior control zone associated with a portion of the mapping data, and navigating through the behavior control zone while disabling a behavior in the behavior control zone in response to encountering the behavior control zone.

In some implementations, the behavior can correspond to a rug ride up behavior in which the autonomous cleaning robot moves in a rearward direction.

In some implementations, the portion of the mapping data can correspond to a threshold in the environment.

In some implementations, disabling the behavior can include disabling a cleaning system of the autonomous cleaning robot.

In some implementations, disabling the behavior can include disabling a rug ride up behavior of the autonomous cleaning robot.

In another aspect, an autonomous cleaning robot includes a drive system configured to move the autonomous cleaning robot about an environment as the autonomous cleaning robot cleans a floor surface in the environment, a sensor to generate mapping data as the autonomous cleaning robot moves about the environment, and a controller configured to execute instructions to perform operation. The operations include transmitting, to a remote computing system, the mapping data collected by the autonomous cleaning robot as the autonomous cleaning robot moves about the environment, receiving data indicative of a behavior control zone associated with a portion of the mapping data, and navigating through the behavior control zone while disabling a behavior in the behavior control zone in response to encountering the behavior control zone.

The details of one or more implementations of the subject matter described in this specification are set forth in the accompanying drawings and the description below. Other potential features, aspects, and advantages will become apparent from the description, the drawings, and the claims.

BRIEF DESCRIPTION OF THE DRAWINGS

FIG. 4 is a diagram of a communication network.

FIGS. 13G-13H are illustrations of user interfaces for allowing a user to select a behavior control zone.

DETAILED DESCRIPTION

Figure 1:
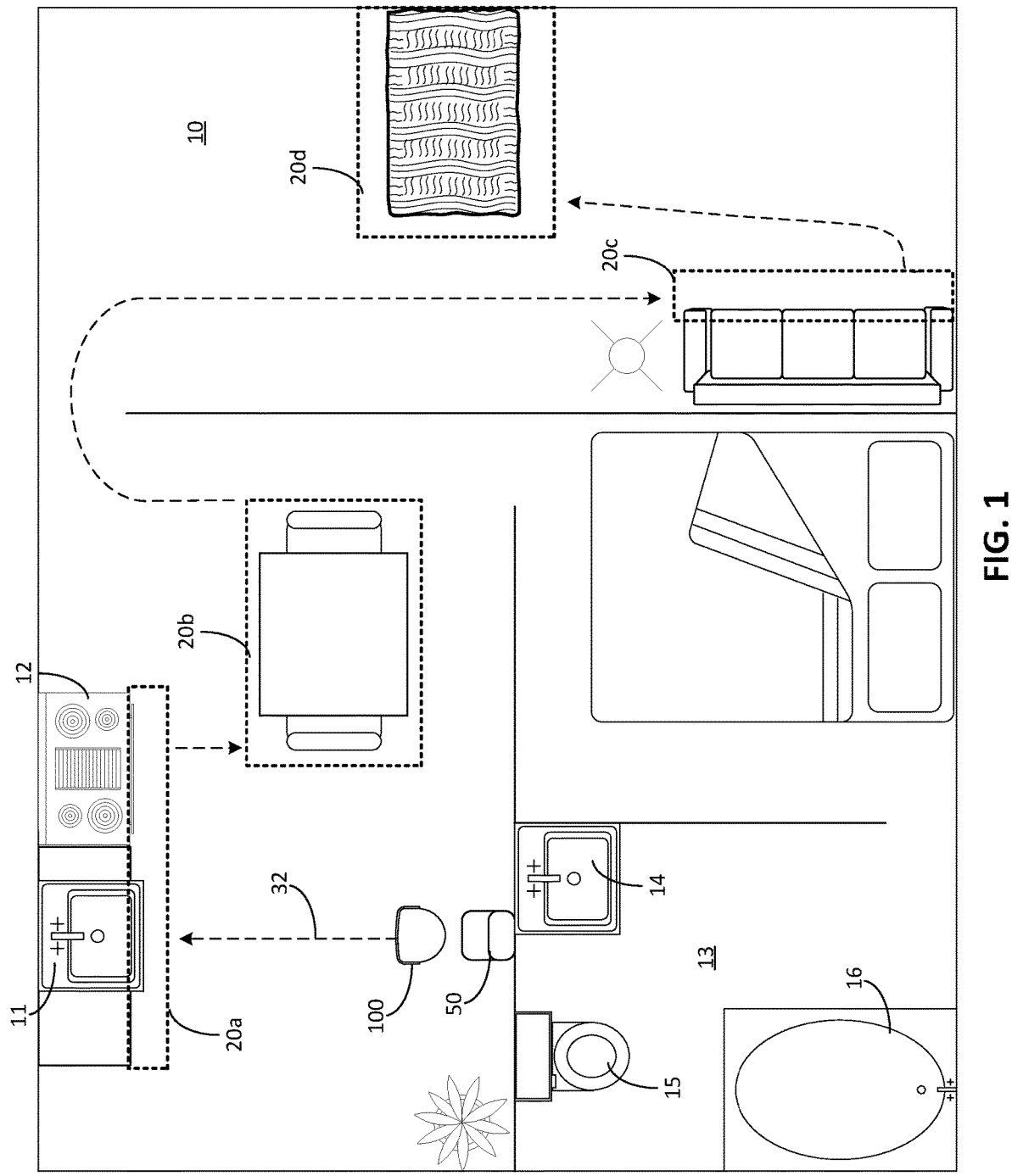
FIG. 1 is a top view of an example of an environment including an autonomous mobile robot and behavior control zones for the autonomous mobile robot.

Referring to FIG. 1, an autonomous mobile robot 100 moves about a floor surface 10 in an environment. The robot 100 is a cleaning robot, e.g., a robot vacuum, a robot mop, or other cleaning robot, that cleans the floor surface 10 as the robot 100 navigates about the floor surface 10. The robot 100 returns to a docking station 50 that charges the robot 100. In examples in which the robot is a robot vacuum that collects debris as the robot 100 travels around the environment, in some implementations, the docking station 50 also evacuates debris from the robot 100 to allow the robot 100 to collect additional debris. As described in this disclosure, the robot 100 can prioritize cleaning certain portions of the floor surface 10 through systems and processes that enable selection of behavior control zones. For example, a process for defining behavior control zones 20a, 20b, 20c, 20d (collectively referred to as behavior control zones 20) on the floor surface 10 can be performed. In response to encountering one of these behavior control zones 20, the robot 100 can initiate a behavior. The behavior control zones 20 can be clean zones that trigger the robot 100 to initiate a cleaning behavior within one of the behavior control zones 20 in response to encountering the behavior control zone. The behavior control zones 20 can be selected to correspond to regions in the environment associated with higher incidents of debris. For example, the behavior control zone 20a corresponds to a region adjacent to kitchen workspaces, such as a sink, a stove, and kitchen counters. The behavior control zone 20b corresponds to a region under and adjacent to a table. The behavior control zone 20c corresponds to a region adjacent to a couch. The behavior control zone 20d corresponds to a region covering an entryway rug.

As described in this disclosure, the behavior control zones 20 can be associated with priorities to create a sequence in which the robot 100 travels to the behavior control zones. For example, a priority of the behavior control zone 20a is higher than a priority of the behavior control zone 20b, the priority of the behavior control zone 20b is higher than a priority of the behavior control zone 20c, and the priority of the behavior control zone 20c is higher than a priority of the behavior control zone 20d. As a result, as shown in FIG. 1, in a mission in which the robot 100 first cleans regions with high priorities, the robot 100 moves along a path 32 from the docking station 50 to the behavior control zone 20a, then to the behavior control zone 20b, then to the behavior control zone 20c, and then to the behavior control zone 20d.

Example Autonomous Mobile Robots

Figure 2:
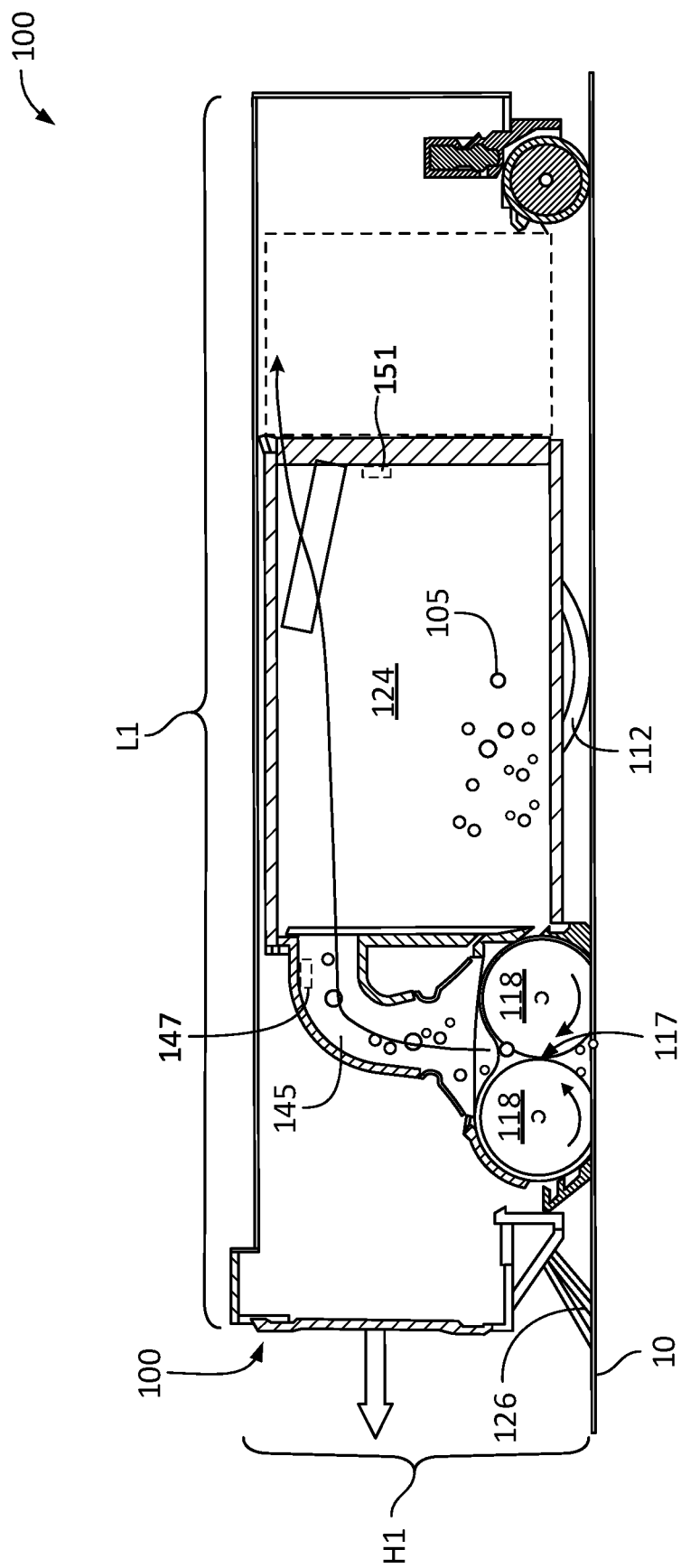
FIGS. 2, 3A, and 3B are side cross-sectional, bottom, and top perspective views of an autonomous mobile robot.
Figure 3A:
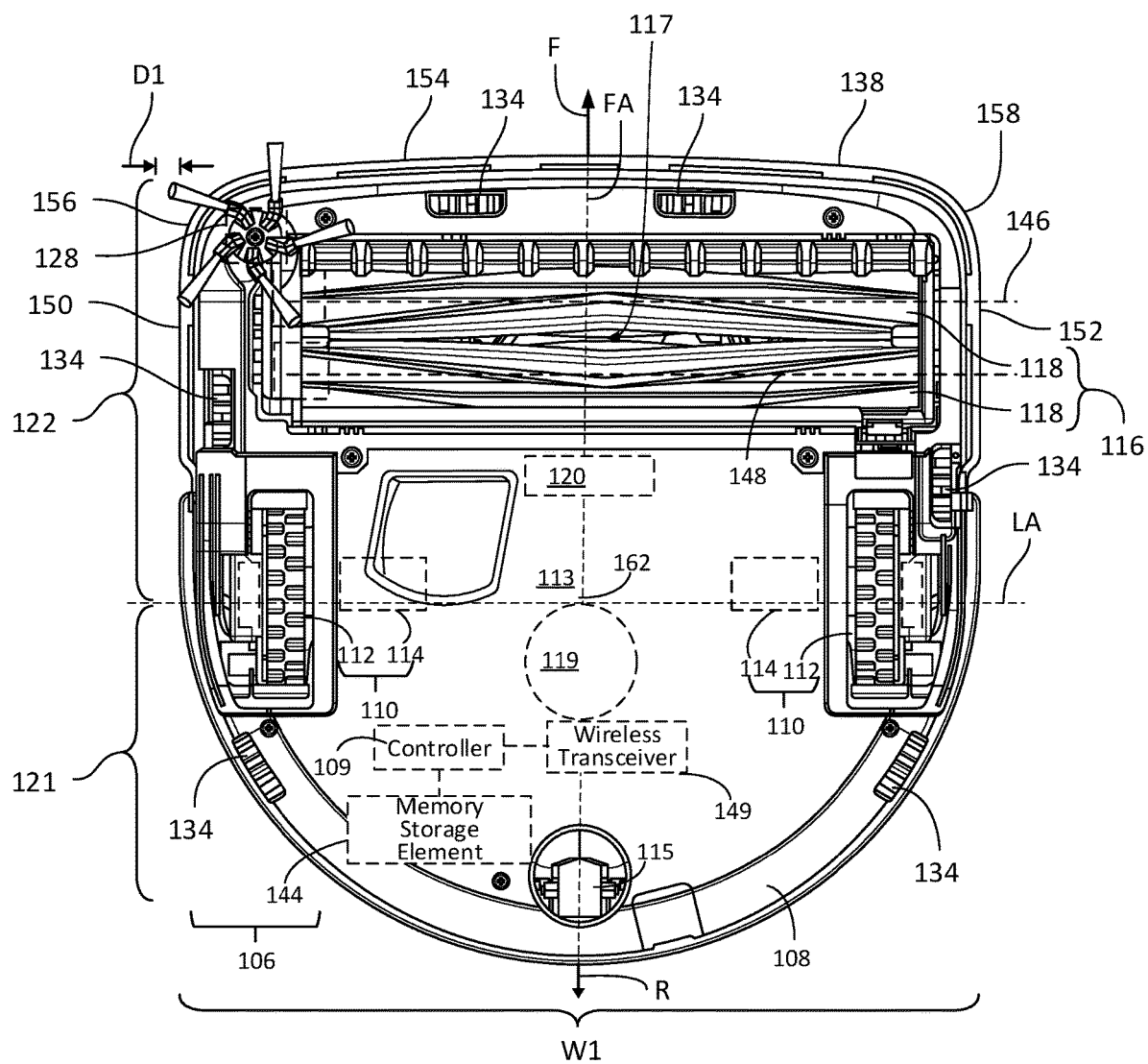

Referring to FIG. 2, the robot 100 collects debris 105 from the floor surface 10 as the robot 100 traverses the floor surface 10. Referring to FIG. 3A, the robot 100 includes a robot housing infrastructure 108. The housing infrastructure 108 can define the structural periphery of the robot 100. In some examples, the housing infrastructure 108 includes a chassis, cover, bottom plate, and bumper assembly. The robot 100 is a household robot that has a small profile so that the robot 100 can fit under furniture within a home. A height H1 (shown in FIG. 2) of the robot 100 relative to the floor surface is, for example, no more than 13 centimeters. The robot 100 is also compact. An overall length L1 (shown in FIG. 2) of the robot 100 and an overall width W1 (shown in FIG. 3A) are each between 30 and 60 centimeters, e.g., between 30 and 40 centimeters, 40 and 50 centimeters, or 50 and 60 centimeters. The overall width W1 can correspond to a width of the housing infrastructure 108 of the robot 100.

The robot 100 includes a drive system 110 including one or more drive wheels. The drive system 110 further includes one or more electric motors including electrically driven portions forming part of the electrical circuitry 106. The housing infrastructure 108 supports the electrical circuitry 106, including at least a controller 109, within the robot 100.

The drive system 110 is operable to propel the robot 100 across the floor surface 10. The robot 100 can be propelled in a forward drive direction F or a rearward drive direction R. The robot 100 can also be propelled such that the robot 100 turns in place or turns while moving in the forward drive direction F or the rearward drive direction R. In the example depicted in FIG. 3A, the robot 100 includes drive wheels 112 extending through a bottom portion 113 of the housing infrastructure 108. The drive wheels 112 are rotated by motors 114 to cause movement of the robot 100 along the floor surface 10. The robot 100 further includes a passive caster wheel 115 extending through the bottom portion 113 of the housing infrastructure 108. The caster wheel 115 is not powered. Together, the drive wheels 112 and the caster wheel 115 cooperate to support the housing infrastructure 108 above the floor surface 10. For example, the caster wheel 115 is disposed along a rearward portion 121 of the housing infrastructure 108, and the drive wheels 112 are disposed forward of the caster wheel 115.

Figure 3B:
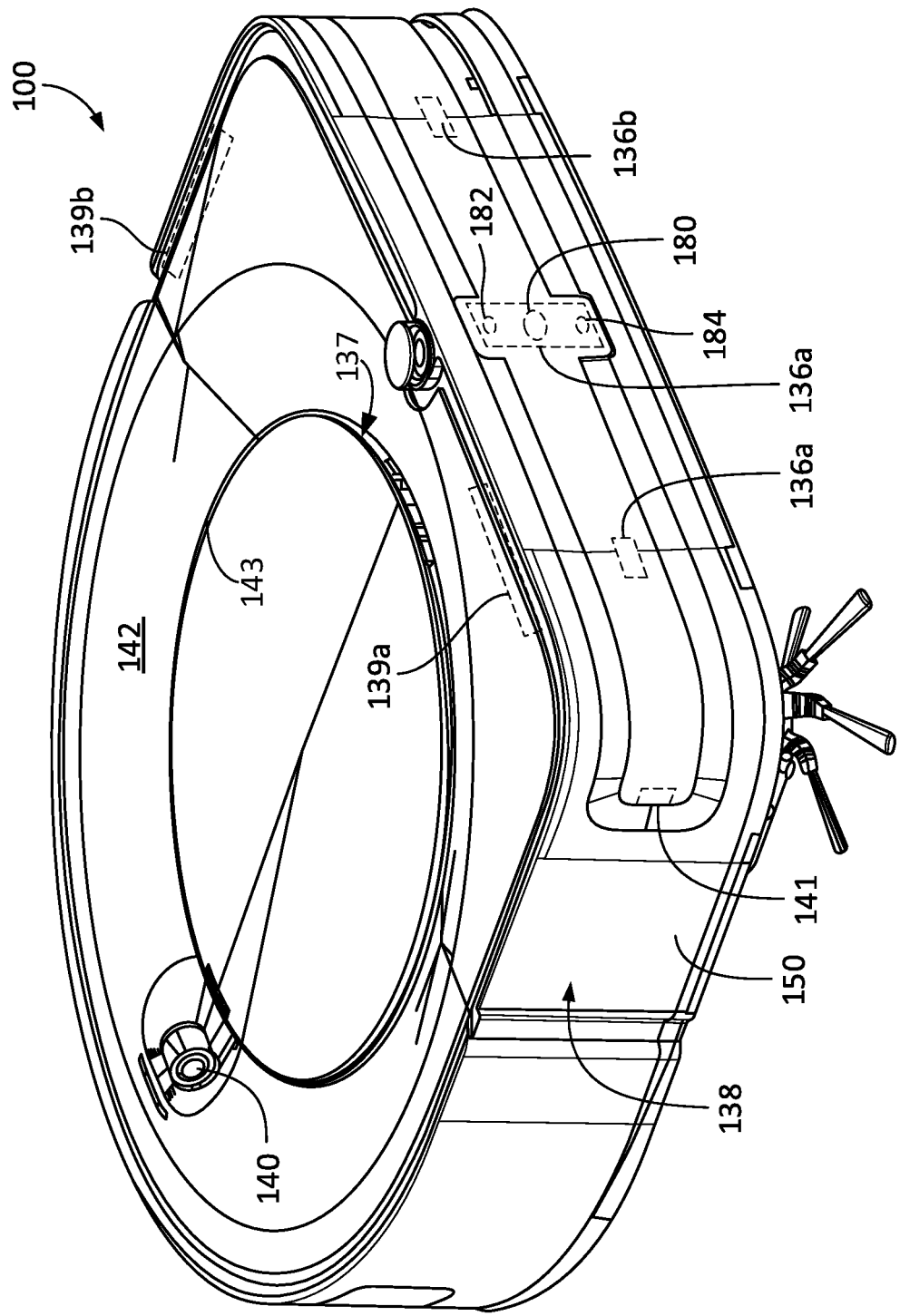

Referring to FIG. 3B, the robot 100 includes a forward portion 122 that is substantially rectangular and a rearward portion 121 that is substantially semicircular. The forward portion 122 includes side surfaces 150, 152, a forward surface 154, and corner surfaces 156, 158. The corner surfaces 156, 158 of the forward portion 122 connect the side surface 150, 152 to the forward surface 154.

In the example depicted in FIGS. 2, 3A, and 3B, the robot 100 is an autonomous mobile floor cleaning robot that includes a cleaning assembly 116 (shown in FIG. 3A) operable to clean the floor surface 10. For example, the robot 100 can be a robot vacuum in which the cleaning assembly 116 is operable to clean the floor surface 10 by ingesting debris 105 (shown in FIG. 2) from the floor surface 10. The cleaning assembly 116 includes a cleaning inlet 117 through which debris is collected by the robot 100. The cleaning inlet 117 is positioned forward of a center of the robot 100, e.g., a center 162, and along the forward portion 122 of the robot 100 between the side surfaces 150, 152 of the forward portion 122.

The cleaning assembly 116 includes one or more rotatable members, e.g., rotatable members 118 driven by a motor 120. The rotatable members 118 extend horizontally across the forward portion 122 of the robot 100. The rotatable members 118 are positioned along a forward portion 122 of the housing infrastructure 108, and extend along 75% to 95% of a width of the forward portion 122 of the housing infrastructure 108, e.g., corresponding to an overall width W1 of the robot 100. Referring also to FIG. 2, the cleaning inlet 117 is positioned between the rotatable members 118.

As shown in FIG. 2, the rotatable members 118 are rollers that counter rotate relative to one another. For example, the rotatable members 118 can be rotatable about parallel horizontal axes 146, 148 (shown in FIG. 3A) to agitate debris 105 on the floor surface 10 and direct the debris 105 toward the cleaning inlet 117, into the cleaning inlet 117, and into a suction pathway 145 (shown in FIG. 2) in the robot 100. Referring back to FIG. 3A, the rotatable members 118 can be positioned entirely within the forward portion 122 of the robot 100. The rotatable members 118 include elastomeric shells that contact debris 105 on the floor surface 10 to direct debris 105 through the cleaning inlet 117 between the rotatable members 118 and into an interior of the robot 100, e.g., into a debris bin 124 (shown in FIG. 2), as the rotatable members 118 rotate relative to the housing infrastructure 108. The rotatable members 118 further contact the floor surface 10 to agitate debris 105 on the floor surface 10.

The robot 100 further includes a vacuum system 119 operable to generate an airflow through the cleaning inlet 117 between the rotatable members 118 and into the debris bin 124. The vacuum system 119 can include an impeller and a motor to rotate the impeller to generate the airflow. The vacuum system 119 cooperates with the cleaning assembly 116 to draw debris 105 from the floor surface 10 into the debris bin 124. In some cases, the airflow generated by the vacuum system 119 creates sufficient force to draw debris 105 on the floor surface 10 upward through the gap between the rotatable members 118 into the debris bin 124. In some cases, the rotatable members 118 contact the floor surface 10 to agitate the debris 105 on the floor surface 10, thereby allowing the debris 105 to be more easily ingested by the airflow generated by the vacuum system 119.

The robot 100 further includes a brush 126 that rotates about a non-horizontal axis, e.g., an axis forming an angle between 75 degrees and 90 degrees with the floor surface 10. The non-horizontal axis, for example, forms an angle between 75 degrees and 90 degrees with the longitudinal axes of the rotatable members 118. The robot 100 includes a motor 128 operably connected to the brush 126 to rotate the brush 126.

The brush 126 is a side brush laterally offset from a fore-aft axis FA of the robot 100 such that the brush 126 extends beyond an outer perimeter of the housing infrastructure 108 of the robot 100. For example, the brush 126 can extend beyond one of the side surfaces 150, 152 of the robot 100 and can thereby be capable of engaging debris on portions of the floor surface 10 that the rotatable members 118 typically cannot reach, e.g., portions of the floor surface 10 outside of a portion of the floor surface 10 directly underneath the robot 100. The brush 126 is also forwardly offset from a lateral axis LA of the robot 100 such that the brush 126 also extends beyond the forward surface 154 of the housing infrastructure 108. As depicted in FIG. 3A, the brush 126 extends beyond the side surface 150, the corner surface 156, and the forward surface 154 of the housing infrastructure 108. In some implementations, a horizontal distance D1 that the brush 126 extends beyond the side surface 150 is at least, for example, 0.2 centimeters, e.g., at least 0.25 centimeters, at least 0.3 centimeters, at least 0.4 centimeters, at least 0.5 centimeters, at least 1 centimeter, or more. The brush 126 is positioned to contact the floor surface 10 during its rotation so that the brush 126 can easily engage the debris 105 on the floor surface 10.

The brush 126 is rotatable about the non-horizontal axis in a manner that brushes debris on the floor surface 10 into a cleaning path of the cleaning assembly 116 as the robot 100 moves. For example, in examples in which the robot 100 is moving in the forward drive direction F, the brush 126 is rotatable in a clockwise direction (when viewed from a perspective above the robot 100) such that debris that the brush 126 contacts moves toward the cleaning assembly and toward a portion of the floor surface 10 in front of the cleaning assembly 116 in the forward drive direction F. As a result, as the robot 100 moves in the forward drive direction F, the cleaning inlet 117 of the robot 100 can collect the debris swept by the brush 126. In examples in which the robot 100 is moving in the rearward drive direction R, the brush 126 is rotatable in a counterclockwise direction (when viewed from a perspective above the robot 100) such that debris that the brush 126 contacts moves toward a portion of the floor surface 10 behind the cleaning assembly 116 in the rearward drive direction R. As a result, as the robot 100 moves in the rearward drive direction R, the cleaning inlet 117 of the robot 100 can collect the debris swept by the brush 126.

The electrical circuitry 106 includes, in addition to the controller 109, a memory storage element 144 and a sensor system with one or more electrical sensors, for example. The sensor system, as described in this disclosure, can generate a signal indicative of a current location of the robot 100, and can generate signals indicative of locations of the robot 100 as the robot 100 travels along the floor surface 10.

The controller 109 is configured to execute instructions to perform one or more operations as described in this disclosure. The memory storage element 144 is accessible by the controller 109 and disposed within the housing infrastructure 108. The one or more electrical sensors are configured to detect features in an environment of the robot 100. For example, referring to FIG. 3A, the sensor system includes cliff sensors 134 disposed along the bottom portion 113 of the housing infrastructure 108. Each of the cliff sensors 134 is an optical sensor that can detect the presence or the absence of an object below the optical sensor, such as the floor surface 10. The cliff sensors 134 can thus detect obstacles such as drop-offs and cliffs below portions of the robot 100 where the cliff sensors 134 are disposed and redirect the robot accordingly.

Referring to FIG. 3B, the sensor system includes one or more proximity sensors that can detect objects along the floor surface 10 that are near the robot 100. For example, the sensor system can include proximity sensors 136a, 136b, 136c disposed proximate the forward surface 154 of the housing infrastructure 108. Each of the proximity sensors 136a, 136b, 136c includes an optical sensor facing outward from the forward surface 154 of the housing infrastructure 108 and that can detect the presence or the absence of an object in front of the optical sensor. For example, the detectable objects include obstacles such as furniture, walls, persons, and other objects in the environment of the robot 100.

The sensor system includes a bumper system including the bumper 138 and one or more bump sensors that detect contact between the bumper 138 and obstacles in the environment. The bumper 138 forms part of the housing infrastructure 108. For example, the bumper 138 can form the side surfaces 150, 152 as well as the forward surface 154. The sensor system, for example, can include the bump sensors 139a, 139b. The bump sensors 139a, 139b can include break beam sensors, capacitive sensors, or other sensors that can detect contact between the robot 100, e.g., the bumper 138, and objects in the environment. In some implementations, the bump sensor 139a can be used to detect movement of the bumper 138 along the fore-aft axis FA (shown in FIG. 3A) of the robot 100, and the bump sensor 139b can be used to detect movement of the bumper 138 along the lateral axis LA (shown in FIG. 3A) of the robot 100. The proximity sensors 136a, 136b, 136c can detect objects before the robot 100 contacts the objects, and the bump sensors 139a, 139b can detect objects that contact the bumper 138, e.g., in response to the robot 100 contacting the objects.

The sensor system includes one or more obstacle following sensors. For example, the robot 100 can include an obstacle following sensor 141 along the side surface 150. The obstacle following sensor 141 includes an optical sensor facing outward from the side surface 150 of the housing infrastructure 108 and that can detect the presence or the absence of an object adjacent to the side surface 150 of the housing infrastructure 108. The obstacle following sensor 141 can emit an optical beam horizontally in a direction perpendicular to the forward drive direction F of the robot 100 and perpendicular to the side surface 150 of the robot 100. For example, the detectable objects include obstacles such as furniture, walls, persons, and other objects in the environment of the robot 100. In some implementations, the sensor system can include an obstacle following sensor along the side surface 152, and the obstacle following sensor can detect the presence or the absence of an object adjacent to the side surface 152. The obstacle following sensor 141 along the side surface 150 is a right obstacle following sensor, and the obstacle following sensor along the side surface 152 is a left obstacle following sensor. The one or more obstacle following sensors, including the obstacle following sensor 141, can also serve as obstacle detection sensors, e.g., similar to the proximity sensors described in this disclosure. In this regard, the left obstacle following can be used to determine a distance between an object, e.g., an obstacle surface, to the left of the robot 100 and the robot 100, and the right obstacle following sensor can be used to determine a distance between an object, e.g., an obstacle surface, to the right of the robot 100 and the robot 100.

In some implementations, at least some of the proximity sensors 136a, 136b, 136c, and the obstacle following sensor 141 each include an optical emitter and an optical detector. The optical emitter emits an optical beam outward from the robot 100, e.g., outward in a horizontal direction, and the optical detector detects a reflection of the optical beam that reflects off an object near the robot 100. The robot 100, e.g., using the controller 109, can determine a time of flight of the optical beam and thereby determine a distance between the optical detector and the object, and hence a distance between the robot 100 and the object.

In some implementations, the proximity sensor 136a includes an optical detector 180 and multiple optical emitters 182, 184. One of the optical emitters 182, 184 can be positioned to direct an optical beam outwardly and downwardly, and the other of the optical emitters 182, 184 can be positioned to direct an optical beam outwardly and upwardly. The optical detector 180 can detect reflections of the optical beams or scatter from the optical beams. In some implementations, the optical detector 180 is an imaging sensor, a camera, or some other type of detection device for sensing optical signals. In some implementations, the optical beams illuminate horizontal lines along a planar vertical surface forward of the robot 100. In some implementations, the optical emitters 182, 184 each emit a fan of beams outward toward an obstacle surface such that a one-dimensional grid of dots appears on one or more obstacle surfaces. The one-dimensional grid of dots can be positioned on a horizontally extending line. In some implementations, the grid of dots can extend across multiple obstacle surfaces, e.g., multiple obstacles surfaces adjacent to one another. The optical detector 180 can capture an image representative of the grid of dots formed by the optical emitter 182 and the grid of dots formed by the optical emitter 184. Based on a size of a dot in the image, the robot 100 can determine a distance of an object on which the dot appears relative to the optical detector 180, e.g., relative to the robot 100. The robot 100 can make this determination for each of the dots, thus allowing the robot 100 to determine a shape of an object on which the dots appear. In addition, if multiple objects are ahead of the robot 100, the robot 100 can determine a shape of each of the objects. In some implementations, the objects can include one or more objects that are laterally offset from a portion of the floor surface 10 directly in front of the robot 100.

The sensor system further includes an image capture device 140, e.g., a camera, directed toward a top portion 142 of the housing infrastructure 108. The image capture device 140 generates digital imagery of the environment of the robot 100 as the robot 100 moves about the floor surface 10. The image capture device 140 is angled in an upward direction, e.g., angled between 30 degrees and 80 degrees from the floor surface 10 about which the robot 100 navigates. The camera, when angled upward, is able to capture images of wall surfaces of the environment so that features corresponding to objects on the wall surfaces can be used for localization.

When the controller 109 causes the robot 100 to perform the mission, the controller 109 operates the motors 114 to drive the drive wheels 112 and propel the robot 100 along the floor surface 10. In addition, the controller 109 operates the motor 120 to cause the rotatable members 118 to rotate, operates the motor 128 to cause the brush 126 to rotate, and operates the motor of the vacuum system 119 to generate the airflow. To cause the robot 100 to perform various navigational and cleaning behaviors, the controller 109 executes software stored on the memory storage element 144 to cause the robot 100 to perform by operating the various motors of the robot 100. The controller 109 operates the various motors of the robot 100 to cause the robot 100 to perform the behaviors.

The sensor system can further include sensors for tracking a distance traveled by the robot 100, or detecting motion of the robot 100. For example, the sensor system can include encoders associated with the motors 114 for the drive wheels 112, and these encoders can track a distance that the robot 100 has traveled. In some implementations, the sensor system includes an optical sensor facing downward toward a floor surface. The optical sensor can be an optical mouse sensor. For example, the optical sensor can be positioned to direct light through a bottom surface of the robot 100 toward the floor surface 10. The optical sensor can detect reflections of the light and can detect a distance traveled by the robot 100 based on changes in floor features as the robot 100 travels along the floor surface 10. In some implementations, other motion sensors could include odometers, accelerometers, gyroscopes, inertial measurement units, and/or other sensors that generate signals indicative of a distance traveled, an amount of rotation, a velocity, or an acceleration of the robot 100. For example, the robot 100 includes a directional sensor, such as a gyroscope, that generates signals indicative of an amount that the mobile robot 300 has rotated from a heading. In some implementations, the sensor system can include a dead reckoning sensor, such as an IR wheel encoder, to generate signals indicative of the rotation of the drive wheels 112 and the controller 109 uses the detected rotation to estimate distance traveled by the robot 100.

The sensor system can further include a debris detection sensor 147 (shown in FIG. 2) for detecting debris on the floor surface 10. The debris detection sensor 147 can be used to detect portions of the floor surface 10 in the environment that are dirtier than other portions of the floor surface 10 in the environment. In some implementations, the debris detection sensor 147 is capable of detecting an amount of debris, or a rate of debris, passing through the suction pathway 145. The debris detection sensor 147 can be an optical sensor configured to detect debris as it passes through the suction pathway 145. Alternatively, the debris detection sensor 147 can be a piezoelectric sensor that detects debris as the debris impacts a wall of the suction pathway 145. In some implementations, the debris detection sensor 147 detects debris before the debris is ingested by the robot 100 into the suction pathway 145. The debris detection sensor 147 can be, for example, an image capture device that captures images of a portion of the floor surface 10 ahead of the robot 100. The image capture device can be positioned on a forward portion of the robot 100 can be directed in such a manner to detect debris on the portion of the floor surface 10 ahead of the robot 100. The controller 109 can then use these images to detect the presence of debris on this portion of the floor surface 10.

The sensor system can further include a bin capacity sensor 151 (shown in FIG. 2) for determining an amount of debris in the debris bin 124. The bin capacity sensor 151 can be an optical, infrared, or ultrasonic sensor that can indicate a level of debris within the debris bin 124. In some implementations, the bin capacity sensor 151 could be a switch that is triggered in response to the level of debris reaching a certain threshold level. The bin capacity sensor 151 alternatively could be a pressure sensor that is triggered in response to a certain air pressure generated by the vacuum system 119 of the robot 100.

The sensor system can further include a floor type sensor. The floor type sensor can be a downward facing optical sensor that identifies a floor type of a portion of the floor surface below the robot 100 or a forward facing optical sensor that identifies a floor type of a portion of the floor surface ahead of the robot 100.

The controller 109 uses data collected by the sensors of the sensor system to control navigational behaviors of the robot 100 during the mission. For example, the controller 109 uses the sensor data collected by obstacle detection sensors of the robot 100, e.g., the cliff sensors 134, the proximity sensors 136a, 136b, 136c, and the bump sensors 139a, 139b, to enable the robot 100 to avoid obstacles within the environment of the robot 100 during the mission.

The sensor data can be used by the controller 109 for simultaneous localization and mapping (SLAM) techniques in which the controller 109 extracts features of the environment represented by the sensor data. From the sensor data, mapping data for constructing a map of the floor surface 10 of the environment can be generated. The sensor data collected by the image capture device 140 can be used for techniques such as vision-based SLAM (VSLAM) in which the controller 109 extracts visual features corresponding to objects in the environment and constructs the map using these visual features. As the controller 109 directs the robot 100 about the floor surface 10 during the mission, the controller 109 uses SLAM techniques to determine a location of the robot 100 within the map by detecting features represented in collected sensor data and comparing the features to previously stored features. The map formed from the mapping data can indicate locations of traversable and non-traversable space within the environment. For example, locations of obstacles are indicated on the map as non-traversable space, and locations of open floor space are indicated on the map as traversable space.

The sensor data collected by any of the sensors can be stored in the memory storage element 144. In addition, other data generated for the SLAM techniques, including mapping data forming the map, can be stored in the memory storage element 144. These data produced during the mission can include persistent data that are produced during the mission and that are usable during a further mission. For example, the mission can be a first mission, and the further mission can be a second mission occurring after the first mission. In addition to storing the software for causing the robot 100 to perform its behaviors, the memory storage element 144 stores sensor data or data resulting from processing of the sensor data for access by the controller 109 from one mission to another mission. For example, the map is a persistent map that is usable and updateable by the controller 109 of the robot 100 from one mission to another mission to navigate the robot 100 about the floor surface 10.

The persistent data, including the persistent map, enable the robot 100 to efficiently clean the floor surface 10. For example, the persistent map enables the controller 109 to direct the robot 100 toward open floor space and to avoid non-traversable space. In addition, for subsequent missions, the controller 109 is able to plan navigation of the robot 100 through the environment using the persistent map to optimize paths taken during the missions.

The robot 100 can, in some implementations, include a light indicator system 137 located on the top portion 142 of the robot 100. The light indicator system 137 can include light sources positioned within a lid 149 covering the debris bin 124 (shown in FIG. 3A). The light sources can be positioned to direct light to a periphery of the lid 149. The light sources are positioned such that any portion of a continuous loop 143 on the top portion 142 of the robot 100 can be illuminated. The continuous loop 143 is located on a recessed portion of the top portion 142 of the robot 100 such that the light sources can illuminate a surface of the robot 100 as they are activated.

The robot 100 can perform various missions in the environment. The robot 100, when not operating in the environment to perform a mission, can dock at a docking station, such as the docking station 50 (shown in FIG. 1). The missions that the robot 100 performs can vary in implementations. The robot 100 can perform a cleaning mission in which the robot 100 cleans traversable portions of the environment. At the start of the cleaning mission, the robot 100 can leave from the docking station 50 and then proceed to perform a combination of behaviors to cover and clean the traversable portions of the environment. The robot 100 can initiate certain behaviors during the cleaning mission to ensure that the robot 100 substantially covers an entirety of the traversable portions of the environment, such as coverage and follow behaviors described in this disclosure. The robot 100 can also initiate certain behaviors in response to the sensor system of the robot 100 detecting certain features in the environment. These behaviors can performed as part of the coverage and follow behaviors performed by the robot 100 to cover the traversable portions of the environment. For example, if the robot 100 encounters an obstacle during the coverage behavior or the follow behavior, the robot 100 can perform an avoidance behavior as described in this disclosure to avoid the obstacle. The robot 100 can also initiate certain behaviors in response to encountering behavior control zones defined in the environment in accordance with methods described in this disclosure.

In some implementations, the robot 100 collects sensor data and generates mapping data sufficient to construct a map of the environment. In some implementations, in addition to being able to perform a cleaning mission, the robot 100 can perform a training or mapping mission in which the robot 100 collects sensor data and generates mapping data to construct a map of the environment. During the training mission, the robot 100 moves about the environment without activating a cleaning system of the robot 100, e.g., without activating the cleaning assembly 116 or the vacuum system 119 of the robot 100. During the mapping mission, the robot 100 can also move at an average movement speed faster than an average movement speed at which the robot 100 moves during the cleaning mission. The training mission can thus allow the robot 100 to collect the sensor data and generate mapping data sufficient to construct a map of the environment while producing less noise (e.g., produced by the cleaning system of the robot 100) and while moving about the environment more quickly.

Example Communication Networks

Referring to FIG. 4, an example communication network 185 is shown. Nodes of the communication network 185 include the robot 100, a user computing device 188, an autonomous mobile robot 190, and a remote computing system 192. Using the communication network 185, the robot 100, the user computing device 188, the robot 190, and the remote computing system 192 can communicate with one another to transmit data to one another and receive data from one another. In some implementations, the robot 100, the robot 190, or both the robot 100 and the robot 190 communicate with the user computing device 188 through the remote computing system 192. Alternatively or additionally, the robot 100, the robot 190, or both the robot 100 and the robot 190 communicate directly with the user computing device 188. Various types and combinations of wireless networks (e.g., Bluetooth, radio frequency, optical-based, etc.) and network architectures (e.g., mesh networks) may be employed by the communication network 185.

In some implementations, the user computing device 188 as shown in FIG. 4 is a remote device that can be linked to the remote computing system 192 and can enable the user 30 to provide inputs on the user computing device 188. The user computing device 188 can include user input elements such as, for example, one or more of a touchscreen display, buttons, a microphone, a mouse, a keyboard, or other devices that respond to inputs provided by the user 30. The user computing device 188 alternatively or additionally includes immersive media (e.g., virtual reality) with which the user 30 interacts to provide a user input. The user computing device 188, in these cases, is, for example, a virtual reality headset or a head-mounted display. The user can provide inputs corresponding to commands for the mobile robot 100. In such cases, the user computing device 188 transmits a signal to the remote computing system 192 to cause the remote computing system 192 to transmit a command signal to the mobile robot 100. In some implementations, the user computing device 188 can present augmented reality images. In some implementations, the user computing device 188 is a smartphone, a laptop computer, a tablet computing device, or other mobile device.

In some implementations, the communication network 185 can include additional nodes. For example, nodes of the communication network 185 can include additional robots. Alternatively or additionally, nodes of the communication network 185 can include network-connected devices. In some implementations, a network-connected device can generate information about the environment. The network-connected device can include one or more sensors to detect features in the environment, such as an acoustic sensor, an image capture system, or other sensor generating signals from which features can be extracted. Network-connected devices can include home cameras, smart sensors, and the like.

In the communication network 185 depicted in FIG. 4 and in other implementations of the communication network 185, the wireless links may utilize various communication schemes, protocols, etc., such as, for example, Bluetooth classes, Wi-Fi, Bluetooth-low-energy, also known as BLE, 802.15.4, Worldwide Interoperability for Microwave Access (WiMAX), an infrared channel or satellite band. In some cases, the wireless links include any cellular network standards used to communicate among mobile devices, including, but not limited to, standards that qualify as 1G, 2G, 3G, 4G, or 5G. The network standards, if utilized, qualify as, for example, one or more generations of mobile telecommunication standards by fulfilling a specification or standards such as the specifications maintained by International Telecommunication Union. The 3G standards, if utilized, correspond to, for example, the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods, e.g., FDMA, TDMA, CDMA, or SDMA.

Example Processes

The robot 100 can be controlled in certain manners in accordance with processes described in this disclosure to define, establish, and prioritize certain behavior control zones in an environment. The processes described in this disclosure are exemplary. While some operations of these processes may be described as being performed by the robot 100, by a user, by a computing device, or by another actor, these operations may, in some implementations, be performed by actors other than those described. For example, an operation performed by the robot 100 can be, in some implementations, performed by the remote computing system 192, by another computing device, or by a combination of multiple computing devices. An operation performed by the user 30 can be performed by a computing device or a combination of multiple computing devices. In some implementations, the remote computing system 192 does not perform any operations. Rather, other computing devices perform the operations described as being performed by the remote computing system 192, and these computing devices can be in direct (or indirect) communication with one another and the robot 100. And in some implementations, the robot 100 can perform, in addition to the operations described as being performed by the robot 100, the operations described as being performed by the remote computing system 192 or the user computing device 188. Other variations are possible. Furthermore, while the methods, processes, and operations described herein are described as including certain operations or sub-operations, in other implementations, one or more of these operations or sub-operations may be omitted, or additional operations or sub-operations may be added.

Behavior control zones are used to control behaviors of one or more autonomous mobile robots in an environment based on a position of an autonomous mobile robot. A behavior control zone can indicate a region in a room where an autonomous mobile robot operates in a certain manner in response to being within the region. For example, such an operation can involve controlling a certain behavior of the robot 100 while the robot 100 is in the region, such as initiating a certain behavior while the robot 100 is in the region and/or disabling a certain behavior while the robot 100 is in the region. The behavior controlled by the behavior control zone can vary in implementations.

As the robot 100 moves about the environment, in the absence of behavior control zones, the robot 100 can initiate different behaviors to efficiently move about the environment and clean the environment. The behavior can control a movement of the robot 100. For instance, the robot 100 can initiate a coverage behavior to move about the environment and efficiently cover surface area in the environment. The coverage behavior can involve moving in cornrows across the floor surface. As the robot 100 moves about the environment in the coverage behavior, the robot 100 can initiate a follow behavior in response to detecting an obstacle in the environment. In the follow behavior, the robot 100 moves along an edge defined by the obstacle. The follow behavior allows the robot 100 to clean along the edge. The robot 100 can also initiate the follow behavior after performing the coverage behavior. The robot 100 can clean along the outer perimeter of a room in a follow behavior performed after performing a coverage behavior.

The movement behavior can also correspond to a behavior that helps the robot 100 avoid becoming stuck in an obstacle field. The movement behavior can correspond to an escape behavior in which the robot 100 performs one or more small movements and turns to avoid becoming stuck within a field of obstacles. The movement behavior can correspond to an avoidance behavior in which the robot 100 avoids a certain region in the environment because, for example, the region contains non-traversable obstacles or objects that could interfere with operations of the robot 100's drive system or cleaning system. The avoidance behavior can be, for example, a rug ride up behavior that is triggered in response to the robot 100 detecting that it is moving over an object that is riding up, such as an area rug. The robot 100, for example, can initiate the rug ride up behavior in response to a motion sensor of the robot 100 detecting a change in acceleration of the robot 100. The change can be a change in pitch and/or roll of the robot 100 above a threshold level.

The behavior can alternatively control cleaning operations of the robot. Such behaviors can help the robot collect debris in dirtier areas. For example, the behavior can control a parameter associated with the cleaning operations to improve the debris pickup capability of the robot. The parameter can be a suction power of the vacuum system 119 of the robot 100, a movement speed of the robot 100, a rotation speed of the brush 126, a rotation speed of the rotatable members 118, or a movement pattern of the robot 100. The robot can initiate the behavior in response to detecting debris on the floor surface or in response to detecting a certain rate of debris collection by the robot. Alternatively, the behavior can disable certain cleaning operations of the robot 100, such as the vacuum system 119 of the robot 100, the brush 126, or the rotatable members 118. This behavior can be used to reduce noise produced by the vacuum system 119 of the robot 100 as the robot 100 passes through a certain region in the environment, or can be used to reduce the likelihood that the brush 126 or the rotatable members 118 are entangled in an object in a region in the environment as the robot 100 moves through the region.

The behavior control zones can be used to trigger or disable certain behaviors of the robot based on the location of the robot. For example, if the behavior is a movement behavior, the behavior control zone can cause the robot 100 to initiate or disable a movement behavior, such as a ride up behavior, an escape behavior, an avoidance behavior, or a follow behavior.

If the movement behavior is an escape behavior and the behavior control zone causes the robot to initiate the escape behavior, entering or encountering the behavior control zone can indicate that the robot 100 is near obstacles that could cause the robot 100 to become stuck. The robot 100 can initiate movement in a manner to avoid becoming stuck by certain obstacles in the vicinity of the behavior control zone. If the movement behavior is an avoidance behavior and the behavior control zone causes the robot to initiate the avoidance behavior, the behavior control zone is a keep out zone. The robot 100 can move in a manner to avoid entering into an interior of the behavior control zone. Such movement can include reversing relative to the behavior control zone and then moving away from the behavior control zone. If the movement behavior is a follow behavior and the behavior control zone causes the robot to initiate the follow behavior, the robot 100 can follow along the perimeter of the behavior control zone without entering into the interior of the behavior control zone.

In some implementations, the behavior controlled by the behavior control zone can be a parameter of a cleaning process of the robot 100. The behavior control zone can be, for example, a focused clean zone. The parameter can be a suction power of the vacuum system 119 of the robot 100, a movement speed of the robot 100, a rotation speed of the brush 126, a rotation speed of the rotatable members 118, or a movement pattern of the robot 100. The suction power can be increased in the focused clean behavior, the movement speed of the robot 100 can be decreased, and/or the movement pattern of the robot 100 can be adjusted to pass over a region covered by the behavior control zone multiple times, e.g., two times, three times, or more. The behavior can correspond to a focused clean behavior in which the robot 100 performed a focused clean of a region covered by the behavior control zone. To perform the focused clean, the behavior control zone causes the robot 100 to adjust the parameter of the cleaning process of the robot 100.

A type of the behavior control zone can vary in implementations. In some implementations, the behavior control zone is a keep out zone that causes the robot 100 to perform a movement behavior to avoid entering the keep out zone. In some implementations, the behavior control zone can be a quiet zone in which the robot 100 initiates a quiet behavior that can involve initiating a movement behavior and initiating a change in a cleaning parameter of the robot 100. In the quiet behavior, certain systems of the robot 100 are deactivated or activated at low power to reduce the noise produced by the robot 100 as the robot 100 moves through the quiet zone. The motor of the vacuum system of the robot 100 and/or the motor for the rotatable members of the robot 100 can be deactivated or run at low power. The motor of the drive system of the robot 100 can be run at low power, thereby causing the robot 100 to traverse the quiet zone more slowly than the robot 100 would traverse areas of the environment that are not covered by behavior control zones.

In some implementations, the behavior control zone is a clean zone in which the robot 100 restricts itself to cleaning the region covered by the behavior control zone in response to encountering the behavior control zone. For example, the robot 100, in response to encountering the behavior control zone, can move in a manner to restrict its movement to within the behavior control zone. Only after covering the region in the behavior control zone does the robot 100 continue to clean other portions of the environment. In some implementations, the behavior control zone is a focused clean zone in which the robot 100 restricts itself to cleaning the region covered by the behavior control zone and also changes a cleaning parameter of the robot 100 to allow the robot 100 to perform a focused clean behavior in the focused clean zone, e.g., passing over the region multiple times, increasing a vacuum power, decreasing a movement speed of the robot, etc. The focused clean zone can be a multi-pass zone, a double pass zone, a triple pass zone, etc.

In some implementations, the behavior control zone is a caution zone in which the robot 100 operates the systems of the robot 100 in a caution behavior to avoid a potential obstacle. The caution zone can cover an area near an obstacle that was previously detected by the robot 100. For example, if the potential obstacle is an obstacle that restricts movement of the robot 100 across the floor surface, the robot 100 can reduce its movement in the caution zone before the robot 100 detects, using its sensor system, the obstacle that triggered the creation of the caution zone. The obstacle alternatively could be an obstacle that can easily become entangled in a rotatable member, a side brush, or a drive wheel of the robot 100. In such examples, the caution zone can cause the robot 100 to reduce a speed of its drive wheels, its rotatable members, or its side brush. The size of the caution zone can correspond to a computer-selected or user-selected obstacle avoidance sensitivity associated with the caution zone. Examples of caution behaviors, caution zones, and obstacle avoidance sensitivities are described in U.S. patent application Ser. No. 16/588,295, titled Image Capture Devices for Autonomous Mobile Robots and Related Systems and Methods, and filed Sep. 30, 2019, the entirety of which is incorporated by reference in the present disclosure.

In implementations in which multiple types of autonomous mobile robots operate in the environment, the behavior control zone can restrict which operations each of the robots can perform in the behavior control zone. For example, if a robot vacuum and a robot mop both operate the environment, the behavior control zone could be defined such that only one of the robot vacuum or the robot mop responds to encountering the behavior control zone. Alternatively or additionally, the behavior control zone can cause both the robot vacuum and the robot mop to respond to the behavior control zone. The behavior control zone can be a mixed-type behavior control zone in which the type of the behavior control zone for the robot vacuum differs from the type of the behavior control zone for the robot mop. For example, in implementations in which the behavior control zone covers a rug, the behavior control zone can be a keep out zone for the robot mop and can be a clean zone for the robot vacuum.

Figure 5:
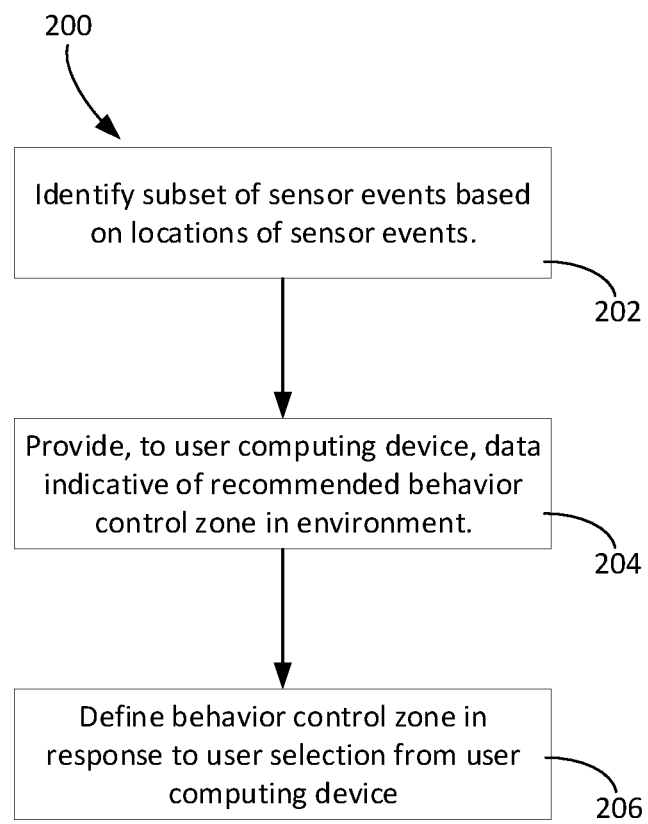
FIG. 5 is a flowchart of a process of defining a behavior control zone.

As discussed in this disclosure, behavior control zones can be defined and then can be associated with priorities. FIGS. 5, 6A-6B, 7-9, and 10A-10D illustrate example methods of defining behavior control zones. FIG. 5 illustrates a flowchart of an example method for defining a behavior control zone. Sensor data collected by an autonomous mobile robot, e.g., the robot 100 shown in FIG. 1, can be used to provide a recommended behavior control zone, and a user can accept or modify the recommended behavior control zone to define a behavior control zone for controlling the behavior of the robot 100. This method is described with respect to control of the robot 100 described herein. In other implementations, other types of autonomous mobile robots may be controlled by defining a behavior control zone in accordance with implementations of the method shown in FIG. 5.

Referring to FIG. 5, a process 200 includes operations 202, 204, and 206. The process 200 is used to define a behavior control zone for controlling a behavior of the robot 100, or other autonomous mobile robots operating in the environment. In particular, when the robot 100 encounters the behavior control zone, the robot 100 can initiate a certain behavior in response to the encounter. The robot 100 can encounter the behavior control zone upon being within a certain distance of the behavior control zone or upon entering the behavior control zone.

A subset of sensor events can be identified as a candidate for recommending a behavior control zone to the user. For example, at the operation 202, a subset of sensor events is identified based on locations of the sensor events. Before the subset of sensor events are identified, the robot 100 can collect sensor data as the robot 100 moves about the environment. These sensor data can be indicative of the sensor events and locations associated with the sensor events.

A sensor event can occur when one or more sensors of the sensor system of the robot 100 are triggered. An environmental feature can be associated with the sensor event. A location of a sensor event can correspond to a location of the robot 100 when the sensor event occurs, or can correspond to a location of the feature detected by the sensor of the robot 100 for which the sensor event has occurred.

The feature associated with the subset of sensor events and detected by the sensor of the robot 100 can vary in implementations. For example, the feature detected by the sensor of the robot 100 can correspond to an object in the environment. The object can be an obstacle. In such examples, the sensor events are obstacle detection events in which one or more sensors of the robot 100 is triggered. The obstacle can define non-traversable space on the floor surface 10, i.e., a portion of the floor surface 10 that the robot 100 cannot move across due to the presence of the object. The obstacle could be, for example, a fixture, a wall, a cliff, a cord, or other types of stationary or movable objects in the environment that could impede movement of the robot 100. In some implementations, the feature detected by the sensor of the robot 100 can correspond to a geometry of traversable space defined by one or more objects in the environment. For example, walls and other objects in the environment could define a narrow passageway of traversable space, e.g., having a width of 1 to 3 widths of the robot 100. A sensor event could occur based on detecting the presence of the passageway of traversable space, the robot 100. In some implementations, the obstacle can be a feature on the floor surface 10 that could impede operations of the robot 100.

For example, the obstacle could become entrained in a wheel, brush, or rotatable member of the robot 100. The obstacle could be a cord, an article of clothing, or other object that can wrap around a rotating member of the robot 100.

In some implementations, the feature detected by the sensor of the robot 100 can correspond to debris on the floor surface 10. For example, the feature can correspond to debris detected on the floor surface 10 or debris ingested by the robot 100. The subset of the sensor events can be debris detection events in which the robot 100 detects debris on the floor surface 10 or detects debris ingested by the robot 100.

In some implementations, the feature can correspond to an object in the environment associated with debris. For example, the object could be a dining room table. The sensor event can correspond to one or more sensors of the robot 100 detecting the dining room table. Because debris may be more frequently dropped around the dining room table as compared to certain other objects, detection of the dining room table may trigger a sensor event for the purpose of defining a behavior control zone. The behavior control zone can be recommended even if the robot 100 does not detect debris in a vicinity around the dining room table. Other objects may also be associated with frequent debris drops. For example, the object can be a doormat, a door, a kitchen island, a dining room table, a trash can, a window, a pet home, a cabinet, or another feature object in the environment associated with increased debris.

In examples in which the feature can correspond to an object in the environment associated with debris, this feature in combination with one or other contextual features in the environment can serve as the basis for a recommendation to define a behavior control zone. The feature alone may not be associated with debris. For example, the object could be a table, and the table in itself may not necessarily be associated with debris. The table could be an office table, an end table, or some other table where debris is not typically dropped. One or more contextual features can indicate that the table is a type of table that typically is associated with debris, such as a dining table or a coffee table. The one or more contextual features can indicate a type of the room, which in turn can indicate a type of the table. The one or more contextual features can correspond to objects proximate to the table that indicate the type of the table or the type of the room. Alternatively, the one or more contextual features could be features on the walls of the room that indicate the type of the room.

Other features can be detected by the robot 100 and can trigger sensor events. For example, the feature detected by the sensor of the robot 100 to trigger a sensor event can be a floor surface type or a room type.

In some implementations, the sensor events are error events in which errors associated with the robot 100 are triggered as the robot 100 moves about the floor surface 10. In response to such error events, the robot 100 may cease movement during a mission. In some implementations, the error events include a wheel drop event in which one or more of the drive wheels 112 of the robot 100 extends from the robot beyond a threshold distance. The wheel drop event can be detected by a wheel drop sensor of the robot 100. In some implementations, the error events include a wheel slip event in which one or more of the drive wheels 112 of the robot 100 loses traction with the floor surface 10 across which the robot 100 moves. The wheel slip event can be detected by one or more of the sensors of the robot 100, such as the encoders, the odometer, or other movement sensors of the robot 100. In some implementations, the error events include a wedge event in which the robot 100 is wedged between an obstacle in the environment above the robot 100 and the floor surface 10. The wedge event can be detected by a bump sensor of the robot 100 or the image capture device 140 of the robot 100. In some implementations, the error events include a robot stuck event in which the robot 100 moves into a region in the environment and is unable to exit the region. For example, a traversable portion of the region may have constrained dimensions that make it difficult for the robot 100 to exit the region. In some implementations, the error events include a brush stall event in which the brush 126, or the rotatable members 118 are unable to rotate. The brush stall event can be detected by an encoder associated with a motor that drives the brush 126 or a motor that drives the rotatable members 118.

Figure 15:
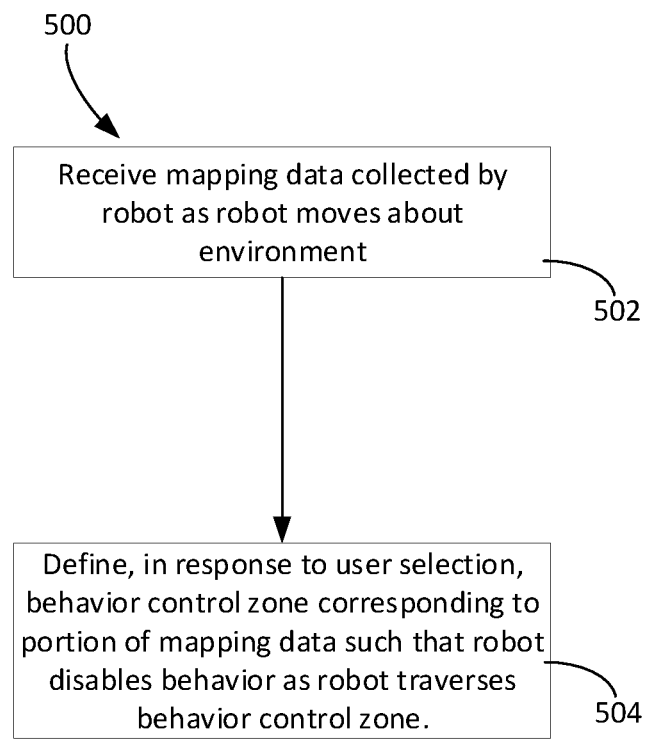
FIG. 15 is a flowchart of a process of defining a behavior control zone for disabling a behavior of an autonomous mobile robot.
Figure 16:
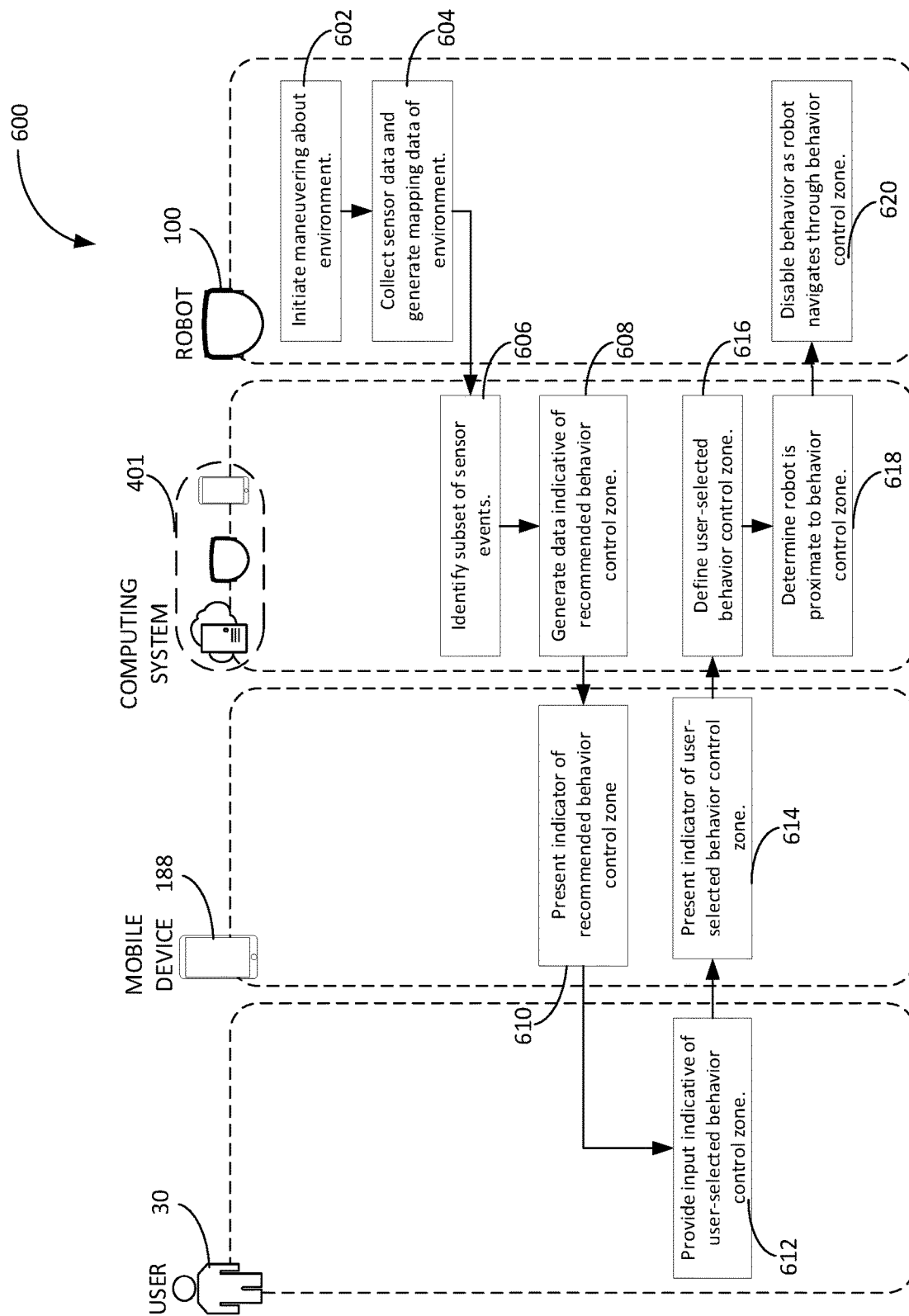
FIG. 16 is a flowchart of a process of defining a behavior control zone for disabling a behavior of an autonomous mobile robot, presenting a visual representation of the behavior control zone, and controlling an autonomous mobile robot using the behavior control zone.

In some implementations, as discussed in this disclosure with respect to FIG. 15, the sensor events can be indicative of a behavior that should be disabled to allow the robot 100 to traverse a portion of the floor surface. The behavior can be triggered by one or more sensor events. The behavior can be, for example, an obstacle avoidance behavior, e.g., to avoid an obstacle above the floor surface or to avoid a cliff or a drop-off. For example, the obstacle avoidance behavior can be a cliff avoidance behavior or a rug ride up behavior. The obstacle avoidance behavior typically allows the robot 100 to navigate about the environment with fewer errors. In some implementations, the obstacle avoidance behavior can be triggered by a feature on the floor surface that does not constitute a non-traversable obstacle for the robot 100. For example, the surface feature could be a dark-colored area of the floor surface that would trigger the cliff avoidance behavior or a ridge extending along a portion of the floor surface that would trigger the rug ride up behavior. Both the dark-colored area and the ridge are traversable by the robot 100. The ridge can be a threshold between two regions of the environment, e.g., between two rooms in the environment. As discussed in this disclosure with respect to FIG. 15, a behavior control zone disabling the cliff avoidance behavior or the rug ride up behavior could be established to allow the robot 100 to traverse these portions of the floor surface.

The set of sensor events that could be used as the basis for recommending a behavior control zone could include the specific sensor event triggering the obstacle avoidance behavior and one or more sensor events indicating that the portion of the floor surface is traversable. For example, the one or more sensor events could include mapping data indicative of traversable floor surface portions adjacent to the portion of the floor surface. The traversable floor surface portions could indicate that the portion of the floor surface is traversable. For example, if the portion of the floor surface includes a ridge extending along the floor surface, a first adjacent portion could be on one lengthwise side of the ridge, and a second adjacent portion could be on the other lengthwise side of the ridge. Alternatively, the one or more sensor events can correspond to mapping data indicating that a percent of a surrounding portion of the floor surface around the portion of the floor surface is above a threshold percent, e.g., at least 55%, 60%, 65%, 70%, 75%, or more. In some implementations in which the behavior to be disabled is a rug ride up behavior, the one or more sensor events can correspond to floor type data indicating that the floor type around the portion of the floor surface is, for example, not rug or carpet. In some implementations in which the behavior to be disabled is a cliff avoidance behavior, the one or more sensor events can correspond to image data indicating that the portion of the floor surface is not a drop-off or a cliff.

For example, if the robot 100 includes a bump sensor, a sensor event can occur when the bump sensor is triggered. A location of the sensor event can correspond to a location of the robot 100 when the bump sensor is triggered, or can correspond to a location of contact between the robot 100 and an object in the environment that triggers the bump sensor. In further examples, if the robot 100 includes the image capture device 140, a sensor event can occur when the image capture device 140 captures imagery containing a particular object in the environment. The object can be an obstacle in the environment that the robot 100 can contact during navigation. A location of the sensor event can correspond to a location of the robot 100 when the image capture device 140 detects the object. Alternatively, the location of the sensor event can correspond to an estimated location of the detected object. The imagery captured by the image capture device 140 can be analyzed to determine a position of the object relative to the robot 100 such that the location of the object within the environment can be estimated. Sensor events can occur when other sensors of the robot 100 are triggered as well. For example, the sensor events can occur based on sensing performed by the proximity sensors 136a, 136b, 136c, the cliff sensors 134, the obstacle following sensor 141, the optical mouse sensor, the encoders, a brush motor controller, a wheel motor controller, a wheel drop sensor, an odometer, or other sensors of the sensor system.

In some implementations, multiple sensors can be involved in a sensor event. For example, one of the proximity sensors 136a, 136b, 136c can detect an obstacle in the environment, and the image capture device 140 can also detect the same obstacle. A combination of data from the proximity sensor and the image capture device 140 can indicate a sensor event has occurred. A location of the sensor event can be determined based on the combination of data from the proximity sensor and the image capture device 140. Other combinations of sensors described herein could be used as the basis for a sensor event.

Figure 6A:
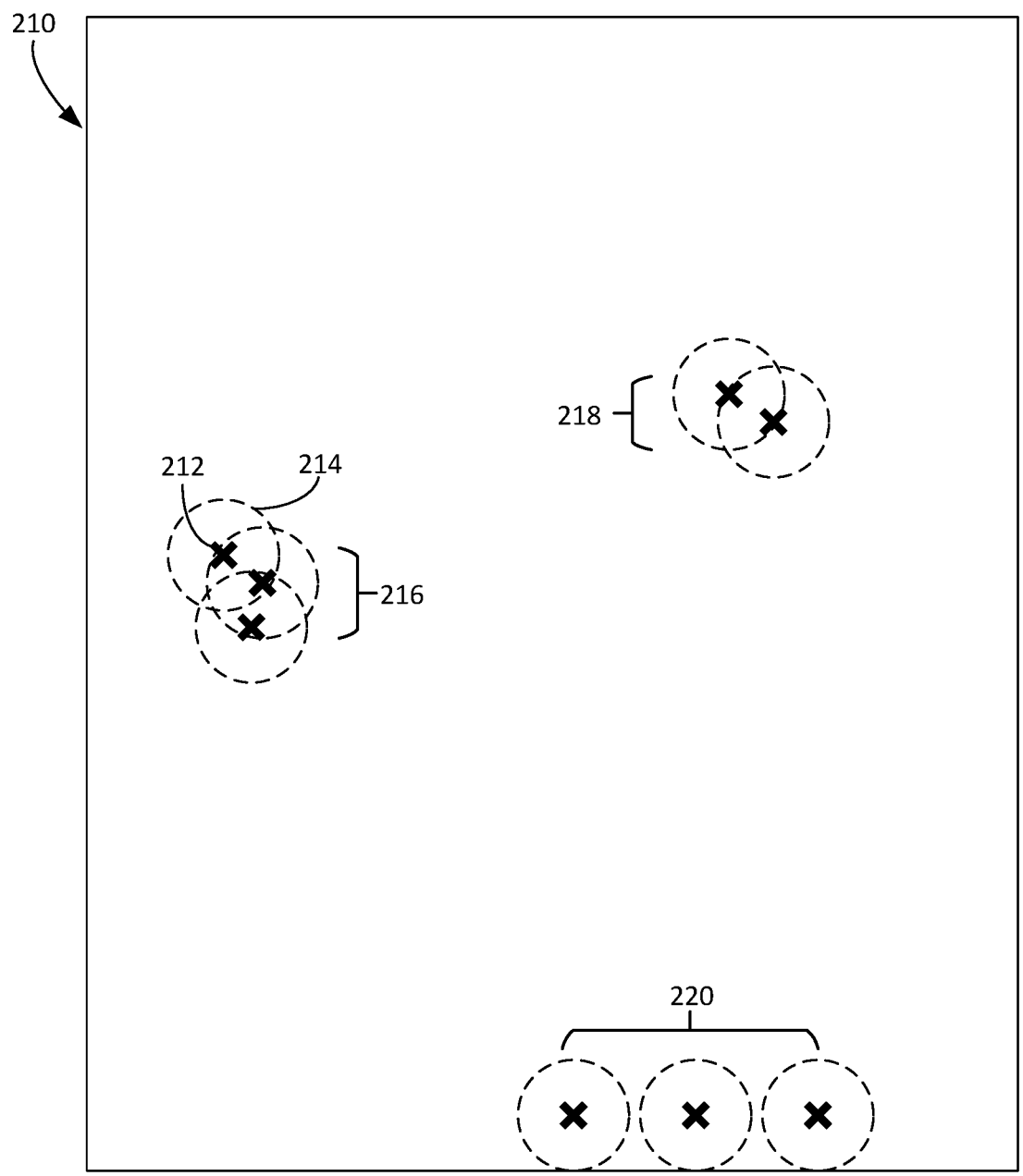
FIGS. 6A, 6B, and 7 are schematic top views of sensor events in an environment.
Figure 6B:
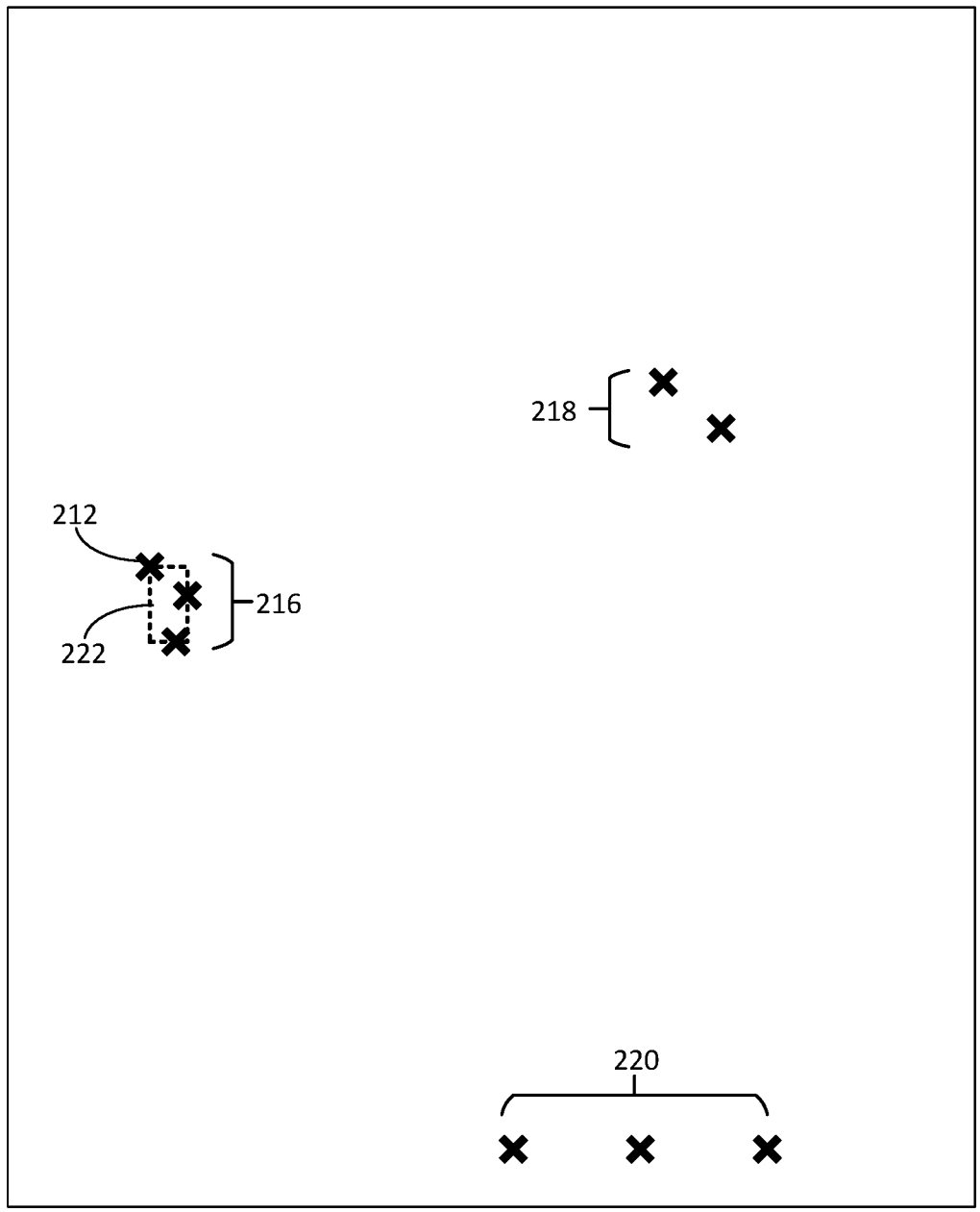
Figure 7:
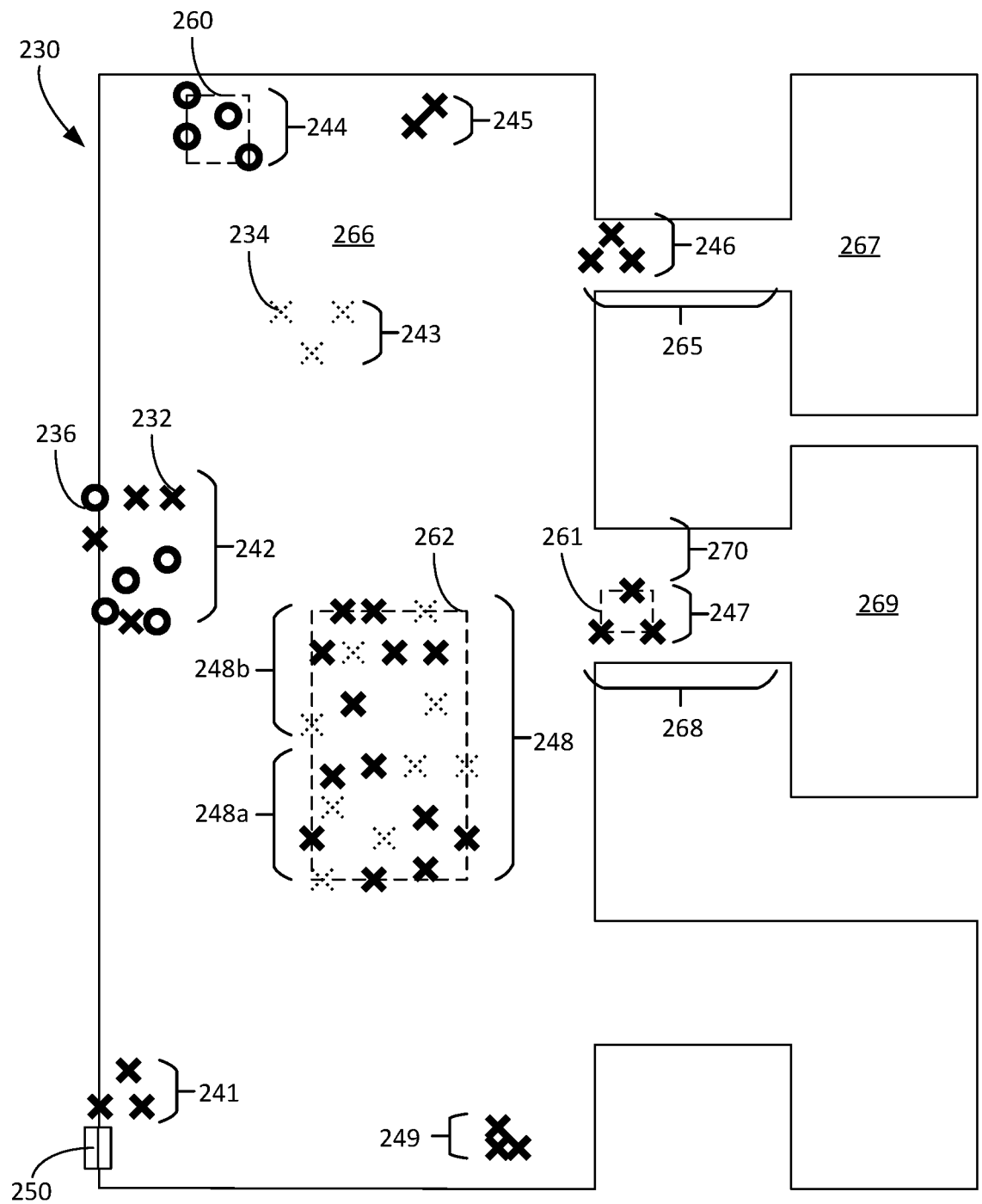

The criteria for, in the operation 202, identifying the sensor events considered to be part of a subset used for recommending a behavior control zone can vary in implementations. FIGS. 6A, 6B, and 7 illustrate examples of subsets of sensor events that satisfy criteria for recommending a behavior control zone in accordance with the process 200.

Referring to FIG. 6A, an environment 210 in which sensor events 212 occurred is illustrated. To identify a subset of the sensor events 212 for recommending a behavior control zone, locations of the sensor events 212 are determined. FIG. 6A is a schematic representation of locations of these sensor events 212 within the environment 210. The subset of the sensor events 212 is identified based on a distance between two or more of the sensor events 212 within the subset. In some implementations, sensor events 212 are considered to be in a subset that can serve as the basis for recommending a behavior control zone if the sensor events 212 are no more than a threshold distance 214 apart from one another. For illustration purposes, only one of the sensor events 212 (represented as "X"-shaped marks) and only one of the threshold distances 214 are labeled (represented as dashed circles).

The criteria for identifying the subset of sensor events 212 for recommending a behavior control zone can vary in implementations. In some implementations, only one criterion is used to identify the subset of sensor events. The criterion can be a threshold distance criterion, a threshold amount criterion, or other appropriate criteria. In some implementations, multiple criteria are used to identify the subset of sensor events, e.g., two or more criteria.

In the example depicted in FIG. 6A, a cluster 216 of the sensor events 212 satisfies a threshold distance criterion. In particular, each sensor event 212 within the cluster 216 is no more than the threshold distance 214 from at least one other sensor event 212 within the cluster 216. A cluster 218 of the sensor events 212 also satisfies the threshold distance criterion, as the sensor events 212 in the cluster 218 are no more than the threshold distance 214 apart from one another. A cluster 220 of the sensor events 212 does not satisfy the threshold distance criterion. The sensor events 212 within the cluster 220 are spaced apart from one another by more than the threshold distance 214.

In some implementations, a cluster 216 of the sensor events 212 satisfies a threshold amount criterion. For example, in some implementations, the threshold amount criterion requires a cluster contain at a threshold amount of sensor events. For example, the threshold amount could be three sensor events 212. In other implementations, the threshold amount is four, five, six, or more sensor events. The cluster 216 includes three sensor events 212 and therefore satisfies the criterion requiring a cluster to contain at least three sensor events 212. The cluster 218 does not satisfy the threshold amount criterion, as the cluster 218 only contains two sensor events. The cluster 220 satisfies the sensor event amount criterion, as the cluster 220 contains three sensor events.

Referring to FIG. 6B, because only the cluster 216 satisfies both the threshold distance criterion and the threshold amount criterion, only the cluster 216 of the sensor events 212 is used for recommending a behavior control zone 222. The cluster 218 and the cluster 220 do not satisfy both these criteria and therefore are not used for recommending a behavior control zone.

The criteria used for recommending behavior control zone can vary in other implementations as well. Referring to FIG. 7, sensor events 232 (represented as solid "X"-shaped marks), sensor events 234 (represented as dashed "X"-shaped marks), and sensor events 236 (represented as circular marks) are triggered in an environment 230. Two types of sensor events occurred, with the sensor events 232 and the sensor events 234 being of the first type, and the sensor events 236 being of the second type. For example, the first type can be an obstacle detection sensor event, and the second type can be a debris detection sensor event. The sensor events 232 and the sensor events 234 differ in the order in which they occur. The sensor events 234 occur before the sensor events 232. For example, the sensor events 234 are triggered in a first mission of an autonomous mobile robot, and the second events 232 are triggered in a second mission of the autonomous mobile robot. The first mission is an earlier mission preceding the second mission.

In the environment, clusters 241-249 of sensor events are identified. The clusters 241-249 can include one type of sensor event or both types of sensor events.

The criteria for selecting the sensor events 232, 234, 236 considered to be part of a subset used for recommending a behavior control zone can include one or more of the criteria described with respect to FIGS. 6A and 6B. In some implementations, additional or alternative criteria can be used. For example, other criteria can include a dock proximity threshold criterion. In the example shown in FIG. 7, the cluster 241 of the sensor events 232 satisfies the threshold distance criterion and the threshold amount criterion. The cluster 241 does not, however, satisfy the dock proximity threshold criterion. A location of the cluster 241 is positioned a distance no more than a threshold distance from a location of a docking station 250 for the autonomous mobile robot. The location of the cluster 241 can correspond to any one of the locations of the sensor events 232 in the cluster 241, or can correspond to a value computed based on the locations of the sensor events 232 in the cluster 241, e.g., an average location or a centroid. Because the location of the cluster 241 is within the threshold distance from the location of the docking station, to avoid defining a behavior control zone that blocks the autonomous mobile robot from docking with the docking station 250, a behavior control zone is not recommended for the cluster 241 of the sensor events 212.

In some implementations, a criterion is satisfied based on whether a cluster including a first type of sensor event is near a second type of sensor event. If the cluster of the first type of sensor event is within a threshold distance or would define a behavior control zone that covers the second type of sensor event, a behavior control zone is not recommended. In the example depicted in FIG. 7, the cluster 242 includes the sensor events 232 as well as several of the sensor events 236. The cluster 242 of the sensor events 232 satisfies both the threshold distance criterion and the threshold amount criterion. But because the cluster 242 is within a threshold distance (which is distinct from the threshold distance for the threshold distance criterion) from at least one of the sensor events 236, the cluster 242 is not used as the basis for recommending a behavior control zone. For example, in implementations in which the sensor events 232 represent obstacle detection sensor events and the sensor events 236 represent debris detection sensor events, a behavior control zone for the obstacle detection sensor events is not recommended so that the autonomous mobile robot can enter the region containing the sensor events 232 to clean the debris within the region.

In some implementations, a timing criterion is satisfied based on the amount of time. In the example depicted in FIG. 7, the cluster 243 includes the sensor events 234, which are triggered at an earlier time than the sensor events 232 are triggered. In some implementations, an amount of time since the sensor events 234 occurred exceeds a threshold amount of time, and therefore does not satisfy the timing criterion. The threshold amount of time can be one day, two days, three days, or more days, or can be one week, two weeks, or more weeks. In some implementations, the timing criterion is satisfied based on the number of missions that have elapsed since the sensor events 234 occurred. An amount of missions since the sensor events 234 occurred exceeds a threshold amount of missions, and therefore does not satisfy the timing criterion. The threshold amount of missions can be one mission, two missions, three missions, or more missions. Because the timing criterion is not satisfied, the cluster 243 is not used for recommending a behavior control zone.

In some implementations, the threshold distance criterion and the threshold amount criterion are used regardless of the type of the sensor event in the cluster. For example, the cluster 244 includes only the sensor events 236. The threshold distance criterion and the threshold amount criterion can use the same threshold distance and the same threshold amount, respectively, as the threshold distance criterion and the threshold amount criterion for a cluster of the sensor events 232. In other implementations, threshold distances and threshold amounts can differ depending on a type of the sensor event. For example, a threshold distance for debris detection sensor events can be higher or lower than a threshold distance for obstacle detection sensor events. In the example depicted in FIG. 7, the cluster 244 of the sensor events 236 satisfies the relevant criteria for identifying a subset of sensor events for recommending a behavior control zone. Accordingly, a behavior control zone 260 is recommended. In examples in which the sensor events 236 are debris detection sensor events, the recommended behavior control zone 260 can cause the autonomous mobile robot to perform a focused clean behavior.

The cluster 245 of the sensor events 232 does not satisfy the threshold amount criterion. A behavior control zone is not recommended based on the cluster 245.

In some implementations, a criterion is satisfied based on whether a behavior control zone would block a path between a first region and a second region in the environment, thereby preventing the autonomous mobile robot from entering the region. In the example shown in FIG. 7, the cluster 246 of the sensor events 232 is positioned within a pathway 265 between a first room 266 and a second room 267. The cluster 246 satisfies the threshold distance criterion and the threshold amount criterion. But if a behavior control zone were created to cover the cluster 246 of the sensor events 232, such a behavior control zone would prevent the autonomous mobile robot from moving from the first room 266 to the second room 267 or would prevent the autonomous mobile robot from moving from the second room 267 to the first room 266.

In contrast, the cluster 247 of the sensor events 232 is positioned within a pathway 268 between the first room 266 and a third room 269. A behavior control zone 261 recommended based on the cluster 247 separates the first room 266 and the third room 269 and provides a traversable path 270 between the first room 266 and the third room 269. The traversable path 270 can have a width that is at least as wide as the autonomous mobile robot. In some implementations, to satisfy the criterion, the width of the traversable path 270 must have a width of at least one robot width, two robot widths, or more.

The cluster 248 includes both the sensor events 232 and the sensor events 234. The cluster 248 satisfies the threshold amount criterion and the threshold distance criterion. A recommended behavior control zone 262 is accordingly defined.

In some implementations, a criterion is satisfied based on whether a cluster contains sensor events over multiple missions within a period of time. In such implementations, the behavior control zone 261 and the behavior control zone 260 may not be recommended because the sensor events 232 and the sensor events 236 only occurred during a single mission. The behavior control zone 262 is nonetheless still recommended because the cluster 248 includes the sensor events 234 occurring during an earlier mission as well as the sensor events 232 occurring a later mission. The sensor data collected by the autonomous mobile robot and associated with the sensor events 232 and the sensor events 234 are collected during multiple missions and within a time period. A quantity of the multiple missions can be within a threshold quantity, e.g., two, three, or more missions. The time period can be within a threshold time period, e.g., one, two, three, or more days, months, or weeks.

In some implementations, instead of the cluster 248 being used as the basis for a recommended behavior control zone, two distinct clusters 248*a*, 248*b* are used as the basis for the recommended behavior control zone 262. Each cluster 248*a*, 248*b* independently satisfies the criteria for recommending a behavior control zone. The sensor events 232 in the cluster 248*a* and the sensor events 232 in the cluster 248*b* together, however, may not satisfy a certain criterion, e.g., the distance threshold criteria. For example, the closest sensor events 232 in the cluster 248a and in the cluster 248b may be separated by a distance greater than the distance threshold for the distance threshold criteria. As a result, two distinct behavior control zones are recommended, one being recommended for the cluster 248a, and another being recommended for the cluster 248b. In some implementations, if two or more recommended behavior control zones satisfy a behavior control zone separation criterion, the two or more recommended behavior control zones are combined with one another to form a single recommended behavior control zone. The resulting recommended behavior control zones for the clusters 248a, 248b, for example, can be separated by a distance no more than a threshold distance for the behavior control zone separation criterion. The threshold distance for the behavior control zone criterion can be, for example, between 0.5 to 4 times a width of the robot, e.g., 0.5 to 1.5 time, 1 to 2 times, 1 to 3 times, 2 to 4 times, etc., the width of the robot. As a result, the recommended behavior control zones are combined with one another to form a single recommended behavior control zone, i.e., the recommended behavior control zone 262, covering both the cluster 248a and the cluster 248b.

As described herein, the distance threshold criterion is satisfied when the sensor events in a cluster are no more than a threshold distance. In some implementations, a minimum separation criterion is satisfied when the sensor events separated by at least a threshold distance distinct from the threshold distance for the distance threshold criterion. The threshold distance for the minimum separation criterion represents a lower bound for separation between sensor events, and the threshold distance for the distance threshold criterion represents an upper bound for separation between sensor events. In some implementations, the minimum separation criterion is satisfied when at least one of the sensor events in the subset is greater than the distance threshold for the minimum separation criterion. In the example shown in FIG. 7, the cluster 249 of the sensor events 232 are too close together. Each of the sensor events 232 in the cluster 249 is within the distance threshold of each of the other sensor events 232 in the cluster 249. Because the minimum separation criterion is not satisfied, a behavior control zone is not recommended based on the cluster 249 of the sensor events 232.

Returning to FIG. 5, the subset of the sensor events is identified at the operation 202 and then can be used to provide a recommendation for a behavior control zone. After the operation 202 is performed, at the operation 204, data indicative of a recommended behavior control zone is provided to a user computing device. The recommended behavior control zone can contain a subset of the locations associated with the subset of the sensor events. In particular, an area covered by the recommended behavior control zone can include the subset of the locations associated with the subset of the sensor events.

At the operation 206, a user-selected behavior control zone is defined in response to a user selection from the user computing device. The user-selected behavior control zone can be based on the recommended behavior control zone. For example, a user can operate the user computing device to provide the user selection. The user selection can be indicative of an acceptance of the recommended behavior control zone, a rejection of the recommended behavior control zone, or a modification of the recommended behavior control zone. In some implementations, the user selection corresponds to acceptance of the recommended behavior control zone such that the user-selected behavior control zone is identical to the recommended behavior control zone.

Definition of the user-selected behavior control zone can involve defining certain parameters of the user-selected behavior control zone. Parameters of the recommended behavior control zone, which are defined at the operation 204, can serve as a starting point for modification by the user to define parameters of the user-selected behavior control zone.

In some implementations, the definition of the user-selected behavior control zone can involve defining a geometric feature of the user-selected behavior control zone. For example, to define the user-selected behavior control zone, a perimeter of the user-selected behavior control zone, one or more dimensions of the user-selected behavior control zone, a shape of the user-selected behavior control zone, or other geometric feature of the user-selected behavior control zone can be defined. The geometric features of the recommended behavior control zone can be defined at the operation 204, and then the user can modify one or more of the geometric features of the recommended behavior control zone at the operation 206 to define the user-selected behavior control zone. For example, the user can modify a length or a width of the recommended behavior control zone to define a length or a width of the user-selected behavior control zone.

In some implementations, the definition of the user-selected behavior control zone can involve defining a specific behavior to be performed by the robot 100, or defining a behavior to be performed by another autonomous mobile robot operating the environment. In implementations in which only the robot 100 operates in the environment, the user can select which behavior the robot 100 performs in response to encountering or entering the user-selected behavior control zone. For example, the robot 100 can perform a movement behavior or a focused clean behavior. In implementations in which multiple autonomous mobile robots operate in the environment, the user can select different behaviors to be performed by different autonomous mobile robots, or can select that one or more of the autonomous mobile robots does not change behavior in response to encountering or entering the behavior control zone. In some examples, a first of the autonomous mobile robots performs a focused clean behavior in the behavior control zone, while a second of the autonomous mobile robots performs a movement behavior to avoid the behavior control zone.

In some implementations, the definition of the user-selected behavior control zone can involve defining a schedule for the behavior control zone. The recommended behavior control zone defined at the operation 204 may be defined to be active at all time, for all missions performed by the robot 100. A user may not wish to have the user-selected behavior control zone active for at least some of the missions to be performed by the robot 100. The schedule can indicate a mission or missions that the user-selected behavior control zone is active, or can indicate a time period in which the user-selected behavior control zone is active. For example, the user-selected behavior control zone may be defined such that the user-selected behavior control zone is only active during missions that occur during working hours, during mornings and afternoons, during certain days of the week, or during certain months. Alternatively, the schedule may also be situationally controlled, such that the user-selected behavior control zone may only be active when certain conditions are met. For example, the user-selected behavior control zone may be defined to be only active when no human occupants of the environment are present, when human occupants are not in the vicinity of the location of the behavior control zone, when a pet is not in the vicinity of the location of the behavior control zone, when the robot 100 has a battery level exceeding a certain threshold, or when another condition related to the robot 100 or the environment is satisfied.

Figure 8:
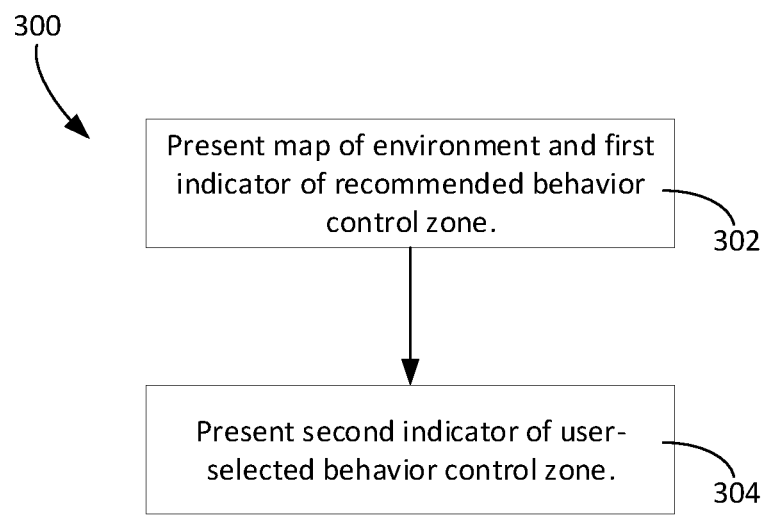
FIG. 8 is a flowchart of a process of presenting a map and indicator for behavior control zones on a user computing device.
Figure 9:
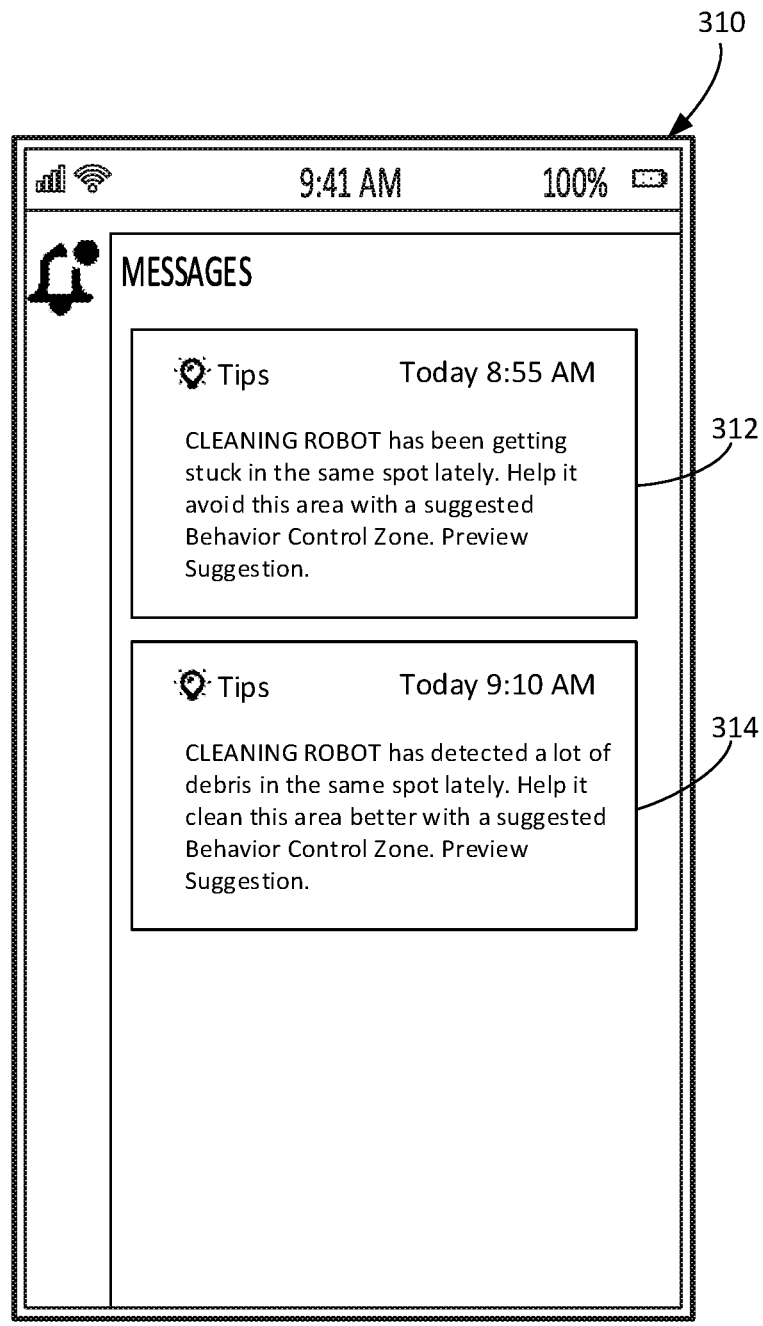
FIG. 9 is an illustration of a user interface presenting a notification for recommending a behavior control zone.

FIG. 8 illustrates a flowchart of an example method for presenting a visual representation of a recommended behavior control zone and a user-selected behavior control zone to a user. A map of an environment of the robot 100 can be visually represented, and then an indicator of the recommended behavior control zone and an indicator of the user-selected behavior control zone can be overlaid on the map. This method is described with respect to control of the robot 100 described herein. In other implementations, other types of autonomous mobile robot may be controlled by defining a behavior control zone in accordance with implementations of the method shown in FIG. 8.

Referring to FIG. 8, a process 300 includes operations 302 and 304. The process 300 is used to present indicators of recommended and user-selected behavior control zones to provide a user with a visual representation of geometric features of the behavior control zones within the environment of the robot 100.

In some implementations, before the operations 302 and 304 are performed, a notification can be transmitted on the user computing device 188 to notify the user that a behavior control zone is recommended. For example, referring to FIG. 9, a user interface 310 for a user computing device, e.g., the user computing device 188, presents a notification 312 indicating that a behavior control zone is recommended. The notification 312 indicates that the robot 100 has been getting stuck in the same spot lately, e.g., due to obstacles in the vicinity of the spot detected by obstacle detection sensors of the robot 100. The user interface 310 further presents a notification 314 indicating that another behavior control zone is recommended. The notification 314 indicates that the robot 100 has detected a lot of debris in the same spot lately, e.g., due to debris in the vicinity of the spot detected by debris sensors of the robot 100. The user can operate the user interface 310 to initiate definition of a behavior control zone in response to the notifications 312, 314.

Referring back to FIG. 8, in response to a command from the user to initiate definition of the behavior control zone, the user interface may present visual representations of the environment to aid in defining the behavior control zone. At the operation 302, a map of the environment and a first indicator of the recommended behavior control zone is presented. For example, referring to FIG. 10A, a map 316 and a first indicator 318 are visually presented to the user on the user interface 310 of the user computing device. The visual presentation of the map 316 and the first indicator 318 can allow the user to visualize where the recommended behavior control zone would be situated within the environment.

The map 316 can be a visual representation of a floor plan of the environment, e.g., the environment shown in FIG. 1. The map 316 can be generated based on mapping data collected by the robot 100 as the robot 100 moves about the environment. A recommended behavior control zone (indicated by the first indicator 318) can be generated based on sensor data collected by the robot 100 (shown in FIG. 1). For example, the recommended behavior control zone can be generated using the process 200 described herein, e.g., the operations 202 and 204. The first indicator 318 can be overlaid on the map to indicate a location of the recommended behavior control zone in the environment. Furthermore, the first indicator 318 can indicate geometric features of the recommended behavior control zone, such as a perimeter, a shape, or one or more dimensions of the recommended behavior control zone. The first indicator 318 is also positioned relative to the map 316 to indicate a location of the recommended behavior control zone in the environment.

In some implementations, information about a geometric feature of the first indicator 318 is also presented on the user interface 310. For example, dimensions 330*a*, 330*b* are presented on the user interface 310 to indicate a width and a length of the recommended behavior control zone. In some implementations, other geometric features may be indicated. For example, a perimeter length, a side length, an angle between sides, an area, or other geometric measurements of the recommended behavior control zone may be presented on the user interface 310. In addition, the first indicator 318 shows that the recommended behavior control zone is rectangular. In other implementations, the recommended behavior control zone may have other shapes, including polygonal shapes, circular shapes, triangular shapes, or other shapes.

At the operation 304, a second indicator of a user-selected behavior control zone is presented on the user interface of the user computing device. For example, referring to FIG. 10B, the map 316 and a second indicator 320 of a user-selected behavior control zone are presented on the user interface 310. The second indicator 320 can be overlaid on the map 316.

Furthermore, the second indicator 320 can indicate geometric features of the user-selected behavior control zone, such as a perimeter, a shape, or one or more dimensions of the user-selected behavior control zone. The second indicator 320 is also positioned relative to the map 316 to indicate a location of the user-selected behavior control zone in the environment.

In some implementations, information about a geometric feature of the second indicator 320 is also presented on the user interface 310. For example, dimensions 332*a*, 332*b* are presented on the user interface 310 to indicate a width and a length of the recommended behavior control zone. In some implementations, other geometric features may be indicated. For example, a perimeter length, a side length, an angle between sides, an area, or other geometric measurements of the recommended behavior control zone may be presented on the user interface 310. In addition, the first indicator 318 shows that the recommended behavior control zone is rectangular. In other implementations, the recommended behavior control zone may have other shapes, including polygonal shapes, circular shapes, triangular shapes, or other shapes.

Figure 10A:
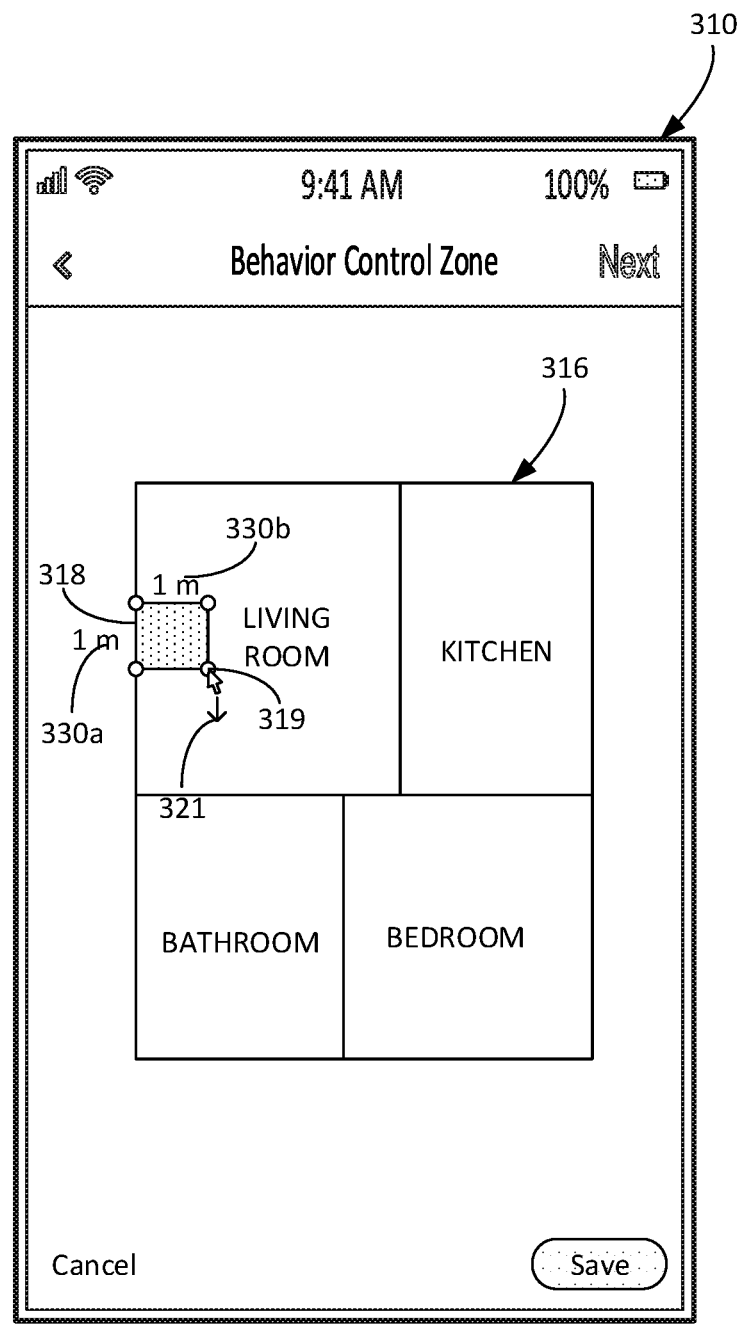
FIGS. 10A-10D are illustrations of user interfaces presenting maps of an environment.

The second indicator 320 of the user-selected behavior control zone is presented based on the recommended behavior control zone and a user-selected modification of the recommended behavior control zone represented by the first indicator 318 in FIG. 10A. The second indicator 320 thus represents a user selection of a behavior control zone based on the recommended behavior control zone. Referring to FIG. 10A, the user can interact with the user interface 310 and adjust the recommended behavior control zone represented by the first indicator 318. For example, the user can operate a user input device, e.g., a touchscreen, a mouse, trackpad, or other user input device, and make the user-selected modification of the shape, the size, the length, the width, or other geometric feature of the recommended behavior control zone. In the example shown in FIG. 10A, if the user interface 310 includes a touchscreen, the user can touch a corner 319 of the first indicator 318 and drag in a downward direction 321 to resize the recommended behavior control zone. Such resizing produces the user-selected behavior control zone represented by the second indicator 320.

Figure 10B:
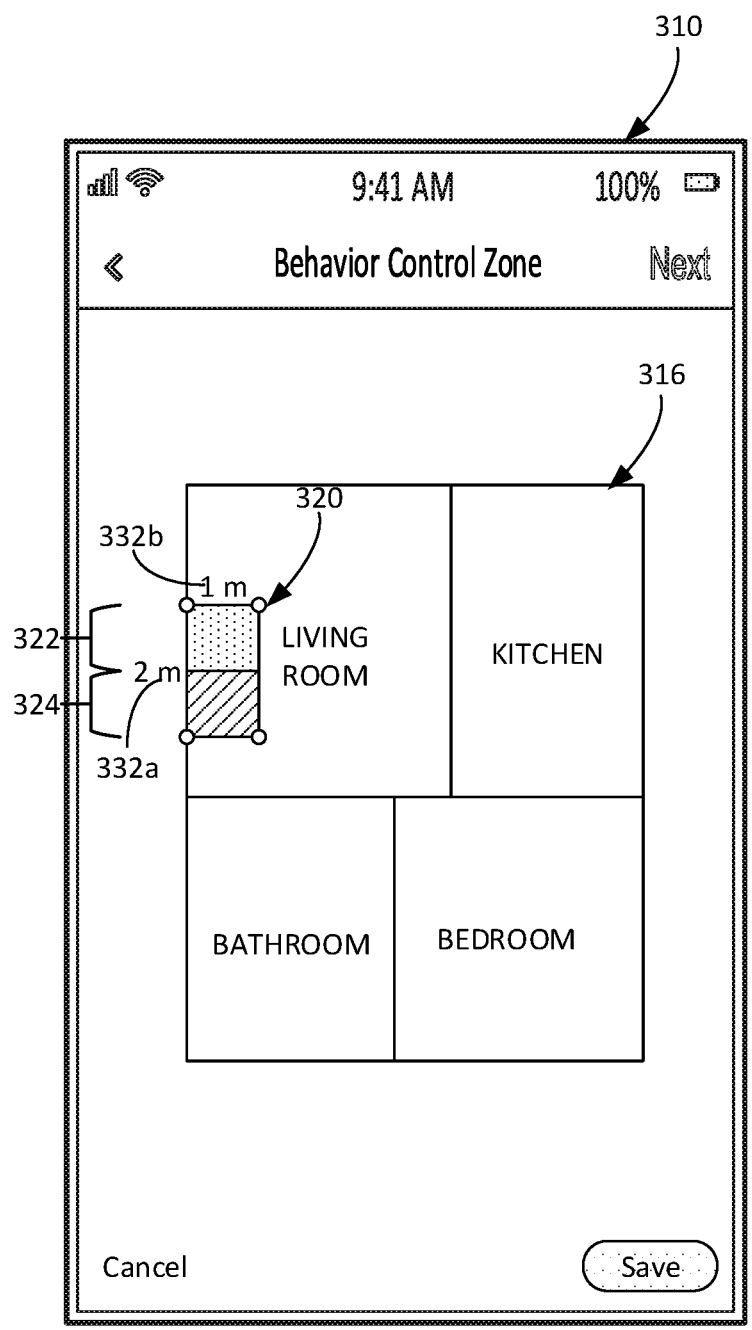

As the user makes changes to the recommended behavior control zone, the second indicator 320 shown in FIG. 10B can indicate the change relative to the first indicator 318 shown in FIG. 10A and thus provide a means of comparison between the recommended behavior control zone and the user-selected behavior control zone. In the example shown in FIG. 10B, the second indicator 320 includes a first portion 322 and a second portion 324. The first portion 322 is indicative of the recommended behavior control zone and has geometric features corresponding to geometric features of the first indicator 318 shown in FIG. 10A. The second portion 324 is indicative of the user-selected modification of the recommended behavior control zone and accordingly represents a difference between the recommended behavior control zone and the user-selected behavior control zone.

The first and second portions 322, 324 of the second indicator 320 can be distinguished from one another through various visual features presented on the user interface 310. In the example depicted in FIG. 10B, the first portion 322 has a first shading style, and the second portion 324 has a second shading style distinct from the first shading style. In some implementations, the first portion 322 and the second portion 324 have distinct colors. In some implementations, rather than showing first and second portions 322, 324 of the second indicator 320 to indicate the modification of the recommended behavior control zone, the second indicator 320 is overlaid on the first indicator 318. The second indicator 320 can be a transparent layer to allow the first indicator 318 to be visible through the second indicator 320. The user can thus see both the first indicator 318 and the second indicator 320 and visually compare the recommended behavior control zone and the user-selected behavior control zone by viewing both the first indicator 318 and the second indicator 320 at the same time.

Figure 10C:
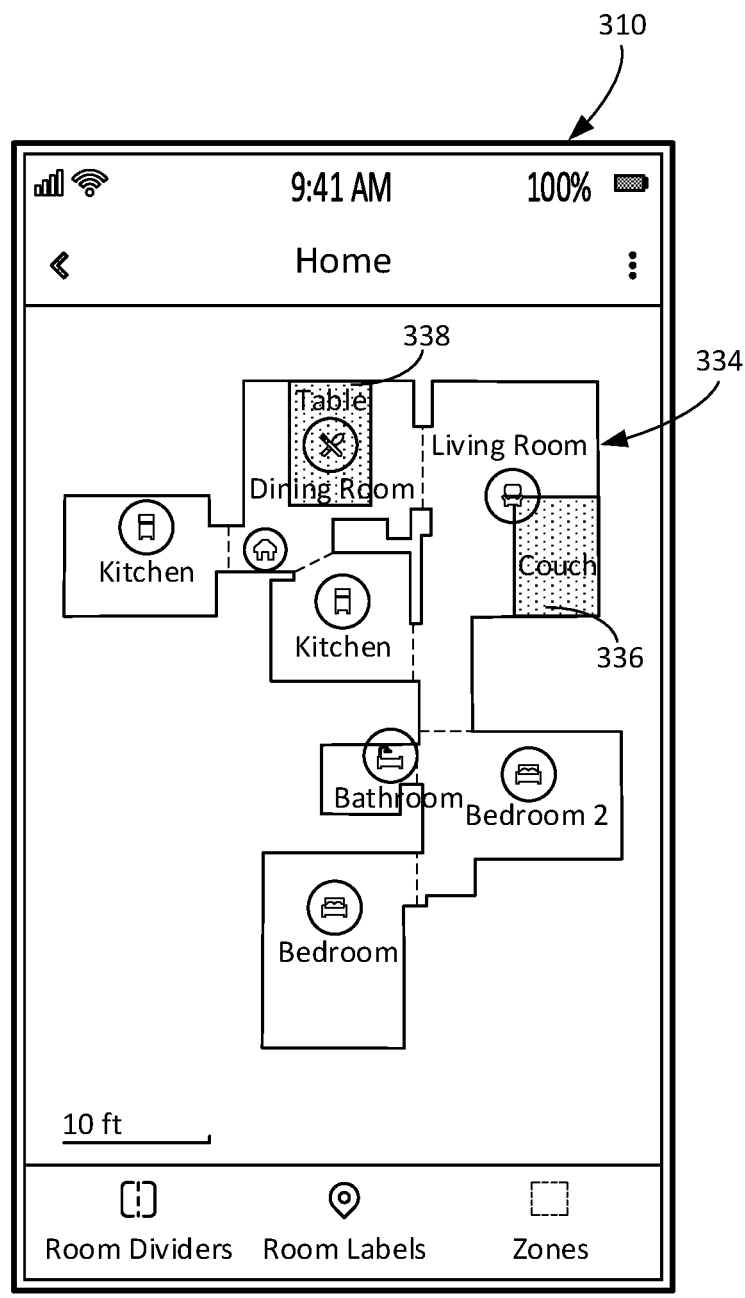
Figure 10D:
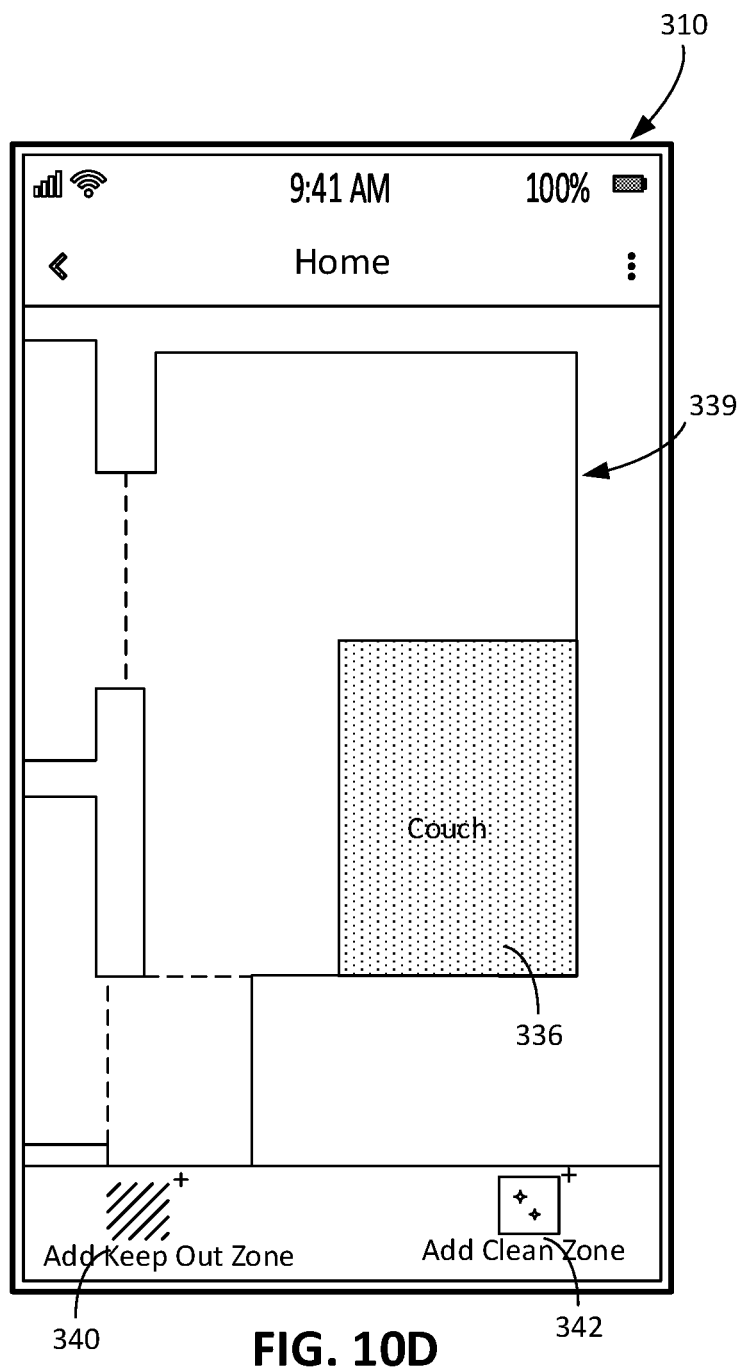

In further implementations, the user can interact with the user interface 310 in other manners to define a behavior control zone. Referring to FIG. 10C, in some implementations, the user interface 310 presents a map 334 of an environment, e.g., generated based on mapping data collected by the robot 100 as the robot 100 moves about the environment. The map 334 can be a visual representation of a floor plan of the environment. The map 334 can include room indicators indicative of rooms in the environment as well as object indicators indicative of objects detected in the environment. In the example depicted in FIG. 10C, an indicator 336 is an object indicator indicative of a couch detected in the environment, and an indicator 338 is an object indicator indicative of a table detected in the environment. The user can select the indicator 336 or the indicator 338 to define a behavior control zone in the environment. For example, referring to FIG. 10D, after the user has selected the indicator 336, the user interface 310 can present a representation of the portion 339 of the map 334 including the indicator 336. The user can then select a type of the behavior control zone to define to correspond to the couch represented by the indicator 336. For example, the user can invoke an indicator 340 to define a keep out zone, or an indicator 342 to define a clean zone.

Figure 11:
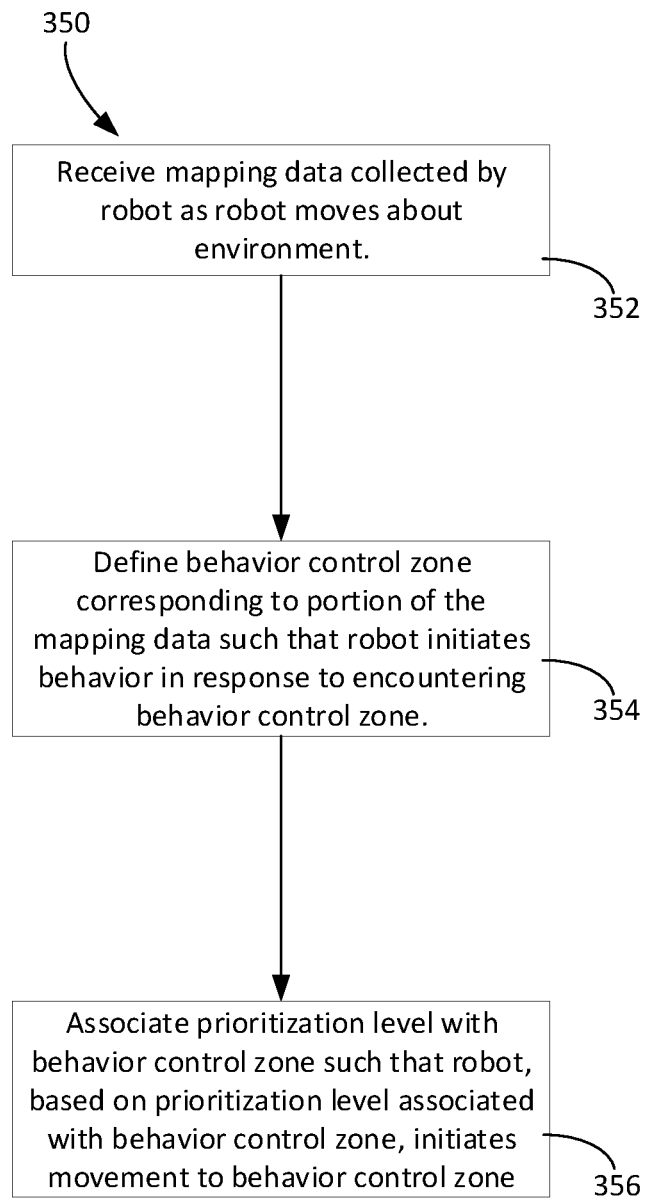
FIG. 11 is a flowchart of a process of defining a behavior control zone associated with a priority.

FIGS. 11-12, 13A-13K, and 14A-14F illustrate example methods of defining behavior control zones and associating priorities with these behavior control zones. FIG. 11 illustrates a flowchart of an example method for defining a behavior control zone and associating a priority with the behavior control zone. Referring to FIG. 11, a process 350 includes operations 352, 354, and 356. The process 350 is used to define a behavior control zone and then associate a priority with the behavior control zone. A map of the environment can be constructed based on mapping data collected by the robot 100 as the robot 100 moves about the environment. The behavior control zone can be defined in accordance with methods described in this disclosure and specifically in accordance with methods described in connection with FIGS. 5, 6A-6B, 7-9, and 10A-10D. The priority can be associated with the behavior control zone so that the robot 100 prioritizes visiting the behavior control zone during a cleaning mission.

At the operation 352, mapping data collected by the robot 100 as the robot 100 moves about the environment is received. The mapping data can be received by a remote computing device, such as the user computing device 188 (shown in FIG. 4), the remote computing system 192 (shown in FIG. 4), the controller 109 (shown in FIG. 3A) of the robot 100, or other computing device. The mapping data can be used to construct a map for the robot 100 to indicate traversable and non-traversable locations in the environment. The mapping data can also be used for presenting a representation of the map of the environment, thus allowing a user to identify areas that the robot 100 can and cannot traverse. The mapping data, as described in this disclosure, can be collected by the sensor system of the robot 100 as the robot 100 navigates about the environment. The robot 100 can collect these mapping data as part of a cleaning mission of the robot 100 or as a part of a training mission of the robot 100.

At the operation 354, a behavior control zone is defined. The behavior control zone can correspond to a portion of the mapping data and thus is associated with locations in the environment. The behavior control zone can also be associated with one or more behaviors that the robot 100 initiates in response to encountering the behavior control zone. Data indicative of the behavior control zone can be stored on the robot 100, the remote computing system 192, or some other computing device.

At the operation 356, a priority is associated with the behavior control zone. The priority is indicative of the extent to which the robot 100 should prioritize, relative to other portions of the environment and/or relative to other behavior control zones, moving to the behavior control zone to perform the one or more behaviors. The association of the priority with the behavior control zone causes the robot 100 to move to the behavior control zone in accordance with the relative priority of the behavior control zone, and then to perform the one or more behaviors associated the behavior control zone upon arriving in the behavior control zone. Associating the priority with the behavior control zone can involve providing a schedule to the robot 100 in which the robot 100 cleans only the behavior control zone and a set of behavior control zones including the behavior control zone during a scheduled cleaning mission.

In some implementations, the robot 100 initiates the movement to the behavior control zone at a start of a mission, and then initiates the behavior in response to encountering the behavior control zone. The behavior can correspond to a clean behavior performed within the behavior control zone. The robot 100 can initiate movement to the behavior control zone once the behavior control zone is next in a priority sequence for cleaning the behavior control zones. For example, the priority for the behavior control zone, in combination with priorities associated with other behavior control zones defined in the environment, can be indicative of a priority sequence for the behavior control zones. If the robot 100 is instructed to initiate an operation to clean one or more of the behavior control zones, the robot 100 can sequentially clean the behavior control zones based on the priority sequence and in particular, based on the priorities associated with the behavior control zones.

The association of the priority with the behavior control zone can have differing effects on the movement of the robot 100 in different implementations. The priority can be associated with some condition that triggers the robot 100 to initiate movement to the behavior control zone. In some implementations, the priority can cause the robot 100 to initiate movement to the behavior control zone in response to a temporal condition, a spatial condition, an environmental condition, or a condition of the robot 100 being satisfied.

Examples of a temporal condition include the current time being a start of a mission, an end of a mission, at the start of a mission scheduled for a particular time, a certain time during a mission, a mission duration, or other time-based condition that, when satisfied, the robot 100 initiates movement to the behavior control zone. For example, the priority associated with the behavior control zone can cause the robot 100 to initiate movement to the behavior control zone at the start of a mission, the end of the mission, or some selected time during the mission. In some implementations, a duration of the mission can be limited. For example, the user can select a duration of the mission in scheduling the mission, or certain environmental conditions (such as expected times during the day when human occupants are present) can limit the duration of the mission. If the expected duration of the mission is less than a threshold duration, the robot 100 can switch to a priority mode in which the robot 100 prioritizes moving to certain behavior control zones and performing the associated behaviors in the behavior control zones (e.g., clean the behavior control zones).

Examples of a spatial condition include the position of the robot 100 being within a particular region in the environment, within a particular room in the environment, within a certain distance from the behavior control zone, within a certain distance of a certain feature in the environment, or at some other position that causes the robot 100 to initiate movement to the behavior control zone. For example, the priority associated with the behavior control zone can cause the robot 100 to initiate movement to the behavior control zone in response to entering a particular region, e.g., a threshold between rooms, a certain distance from the behavior control zone, a room containing the behavior control zone, or other region of the environment.

Examples of an environment condition can include the robot 100 detecting a certain condition in the environment, such as human occupants not being present in the environment, human occupants not being present in a particular region of the environment, a door being closed or open, human occupants returning to the environment, or some other environmental condition. For example, the robot 100 can initiate movement to clean a behavior control zone corresponding to an entryway in the environment in response to the human occupants returning to the environment, as the return of the human occupants could potentially be associated with debris being tracked into the environment. Alternatively, the robot 100 can initiate movement to a behavior control zone in response to the human occupants not being present in the environment so as to reduce the amount of noise that the robot 100 while human occupants are present in the environment.

Examples of a robot condition include a system of the robot 100 being in a particular condition. For example, the robot 100 could initiate movement to the behavior control zone in response to having a certain level of battery charge, a certain remaining capacity in its debris bin (in examples in which the robot 100 is a robot vacuum), a certain amount of fluid in its fluid reservoir (in examples in which the robot 100 is a robot mop), or other condition of the robot 100. A low battery status of the robot 100 can be triggered at different battery level thresholds depending on the implementation, e.g., a low battery level threshold between 5% and 25%, 10% and 20%, or other appropriate value.

In some implementations, the priority is a variable priority that can vary depending on an event, such as a time of the day, a time of the year, a weather event, or some event that causes the behavior control zone to be prioritized. For example, a behavior control zone with a variable priority can be prioritized during certain times of the day or certain times of the year and can be not prioritized during other times of the day or other times of the year. In examples in which the variable priority varies depending on the time of the day, the priority can be defined such that the behavior control zone is prioritized only during the morning and afternoon (e.g., times when there are no human occupants present in the environment). The behavior control zone could be in a region of the environment where human occupants are typically located when the human occupants are in the environment, e.g., a living room or a kitchen, and the variable priority can reduce the time that the robot 100 spends in the region so that noise from the robot 100 does not disturb the human occupants. Alternatively, the behavior control zone could be in a region that receives frequent foot traffic from human occupants, such as a hallway in an office building, and the variable priority can cause the robot 100 to prioritize visiting the behavior control zone during times of the day when human occupants would typically be present.

In examples in which the variable priority varies depending on the time of the year, the priority can be defined such that the behavior control zone is prioritized only during certain months of the year, or during certain seasons of the year. The behavior control zone could be in a region that receives relatively more debris during a particular month or season (e.g., winter), and could be defined such that it is prioritized during the particular month or season. Alternatively, the variable priority could vary based on the weather event. The priority can vary as a function of a current or recent weather event. For example, during or after rainy or snowy weather, human occupants may be more likely to track debris into an entryway of an environment. The behavior control zone can be prioritized for a period of time during or after such a weather event, e.g., during the weather event and for 12 to 72 hours after the weather event.

Figure 12:
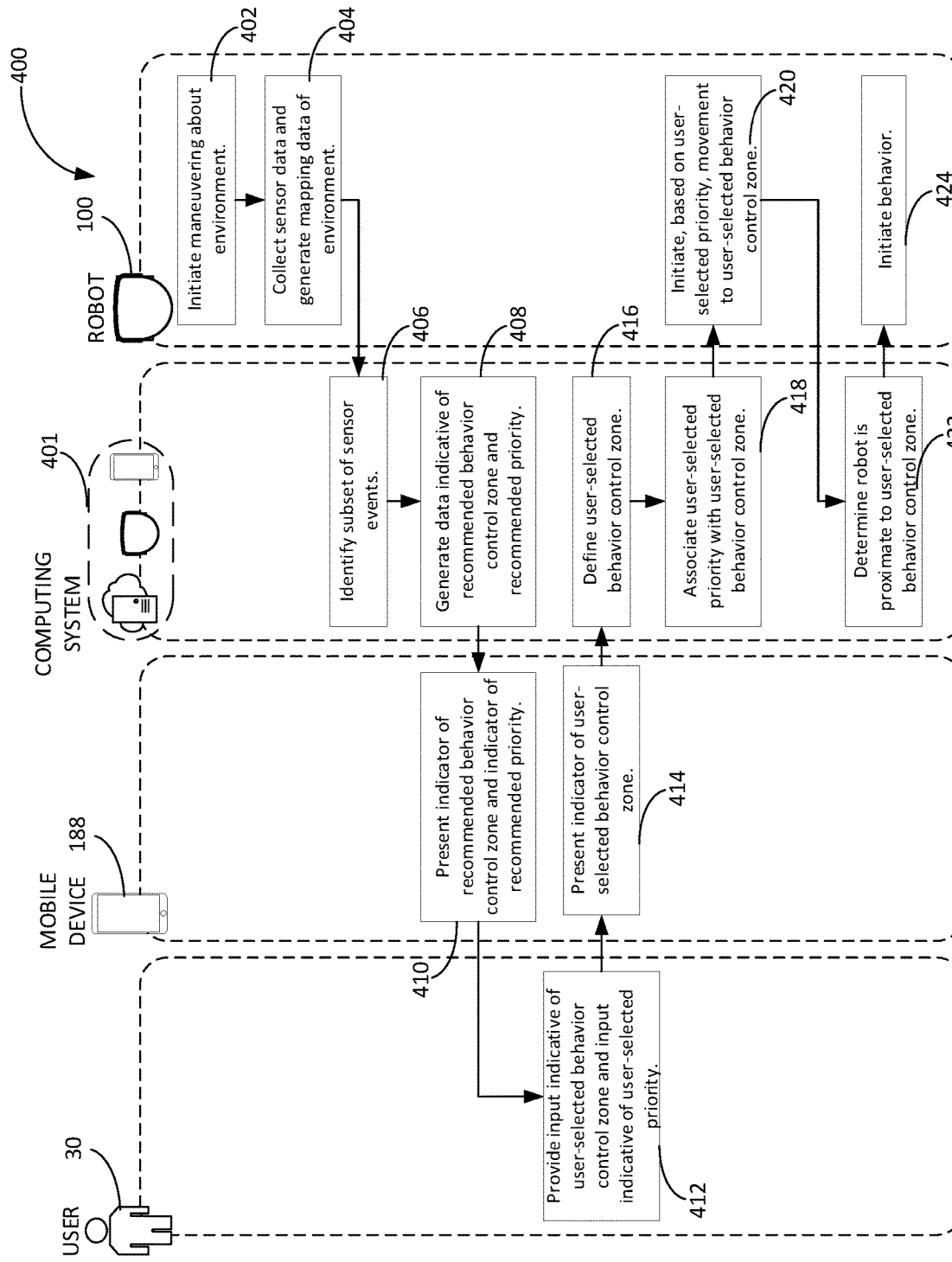
FIG. 12 is a flowchart of a process of defining a behavior control zone associated with a priority, presenting a visual representation of the behavior control zone, and controlling an autonomous mobile robot using the behavior control zone.

Referring to FIG. 12, a process 400 for providing a recommended behavior control zone and a recommended priority, defining a user-selected behavior control zone and associating the user-selected behavior control zone with a user-selected priority, and controlling the robot 100 based on the user-selected behavior control zone and the user-selected priority is illustrated. The process 400 includes operations 402, 404, 406, 408, 410, 412, 414, 416, 418, 420, 422.

The operations 402 and 404 involve operations of the robot 100 as the robot 100 performs a cleaning mission or a training mission and maneuvers about the environment. At the operation 402, the robot 100 initiates maneuvering about the environment. At the operation 404, the robot 100 collects sensor data and generates mapping data of the environment as the robot 100 maneuvers about the environment in the operation 402. The mapping data can be generated based on the sensor data. The mapping data can be indicative of the sensor data and location data associated with the sensor data.

As the robot 100 maneuvers about the environment, the robot 100 can clean the floor surface if the operations 402 and 404 occur as part of a cleaning mission. If the operations 402 and 404 occur as part of a training mission, the robot 100 can move about the floor surface without cleaning.

The operations 406, 408, 410 involve operations to generate a recommended behavior control zone and a recommended priority for the recommended behavior control zone and to present these recommendations to the user. The operations 406 and 408 are performed by a computing system 401, which can be a controller located on the robot 100, a controller located on the user computing device 188, a remote computing system (e.g., the remote computing system 192), a distributive computing system that includes processors located on multiple devices (e.g., the robot 100, the user computing device 188, or the remote computing system 192), processors on autonomous mobile robots in addition to the robot 100, or a combination of these computing devices. At the operation 406, the mapping data is used for identifying a subset of sensor events for generating a recommended behavior control zone and generating a recommended priority. At the operation 408, data indicative of a recommended behavior control and data indicative of a recommended priority are generated and provided to the user computing device 188. And at the operation 410, an indicator of the recommended behavior control zone and an indicator of the recommended priority are presented to the user 30, e.g., through the user computing device 188.

For generating a recommended behavior control zone, the operations 406 and 408 can include features described with respect to the operation 204 of the process 200 illustrated in FIG. 5. The considerations for generating the recommended priority can vary in implementations. In some implementations, the recommended priority is associated with the behavior control zone based on the sensor data collected by the robot 100, e.g., during the operation 402.

The sensor data on which the recommended priority is based can be indicative of debris collected in or located within a region corresponding to the recommended behavior control zone. For example, the debris can be detected as the robot 100 ingests the debris or moves near the debris, e.g., using the debris detection sensor 147 (shown in FIG. 2). The sensor data can be indicative of a characteristic of the debris. For example, the characteristic can be an amount of the debris (e.g., an amount of debris normalized by an area of the recommended behavior control zone), a type of the debris (e.g., filament debris, particulate debris, granular debris, dirt, debris), a size of the debris, a shape of the debris, or other characteristic of the debris detected by the robot 100.

The sensor data on which the recommended priority is based can be indicative of an object proximate to or within the behavior control zone. The object can be associated with debris. For example, occupants in the environment, e.g., pets and humans, may drop debris near the object or may track debris to areas near the object. Airflow in the environment and movement of the occupants may also cause debris to accumulate in certain regions in the environment.

A type of the object can vary in implementations, and the recommended priority can be selected based on the type of the object. In some implementations, an edge of the object can be indicative of a portion of a perimeter of the behavior control zone. For example, the object can be a wall, a corner, a counter, a kitchen counter, a doorway, furniture, or other object with an edge along the floor surface where debris could accumulate. In some implementations, the object can be an object with a portion spaced apart from the floor surface. For example, the object can be a table, a chair, a couch, a desk, a bed, or other object where debris can accumulate under a portion of the object. In some implementations, the object can be an object on the floor surface that is traversable by the robot 100. For example, the object can be an area rug or other similar object. In some implementations, the object can be an object associated with occupants tracking debris onto the floor surface. For example, the object can a door, an entryway, a threshold between rooms, a window, or other similar object.

As discussed with respect to the operation 356 (shown in FIG. 11), the priority can cause the robot 100 to initiate movement to the behavior control zone in response to a certain condition being satisfied, and this condition could be a temporal condition, a spatial condition, an environmental condition, or a condition of the robot 100. For example, if the condition is a temporal condition, the recommended priority for the behavior control zone could correspond to, for example, a recommendation for a scheduled time in which the robot 100 initiates movement to the behavior control zone from the docking station 50. If the condition is a spatial condition, the recommended priority could correspond to, for example, a recommendation to define a room in the environment that triggers the robot 100 to initiate movement to the behavior control zone. If the condition is an environmental condition, the recommended priority could correspond to, for example, a recommendation that the robot 100 begins a mission when the robot 100 determines that the human occupants have left the environment and that the robot 100 initiates movement to the behavior control zone at the start of this mission. If the condition is a robot condition, the recommended priority could correspond to, for example, a recommendation to define a battery level, e.g., between 5% and 25% of full capacity, at which the robot 100 initiates movement to the behavior control zone.

Figure 13B:
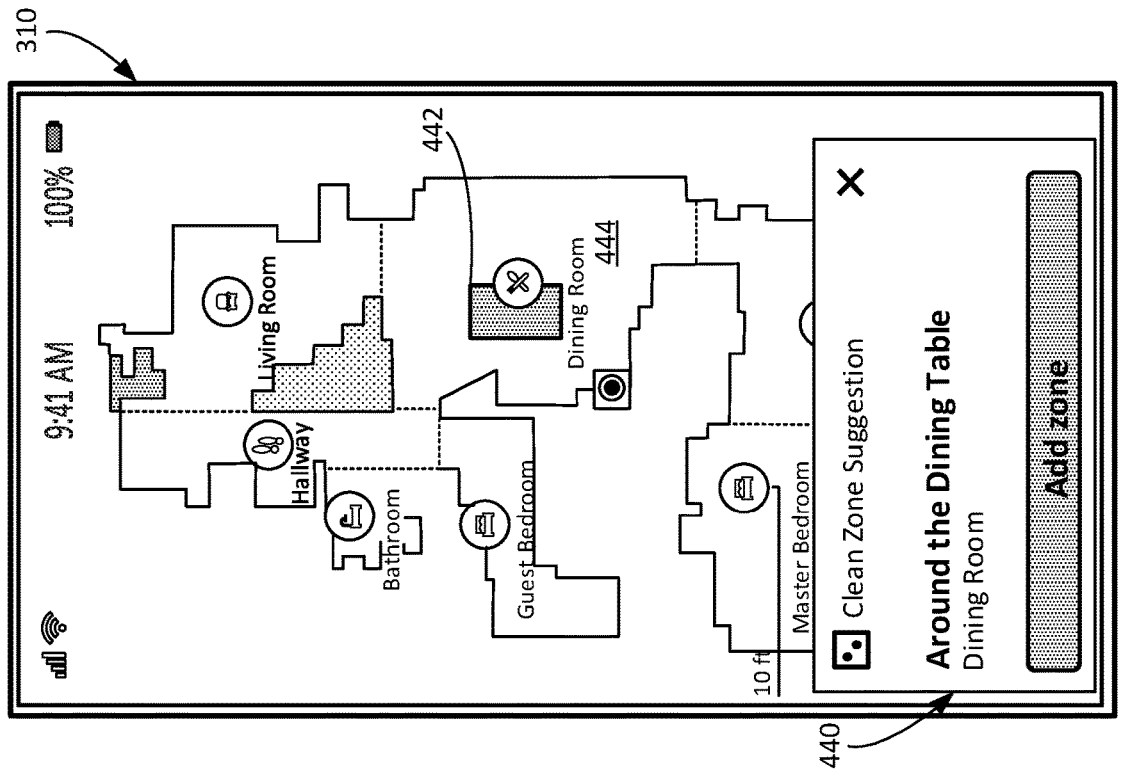
FIGS. 13A-13B are illustrations of user interfaces for providing indicators of recommended behavior control zones.
Figure 13A:
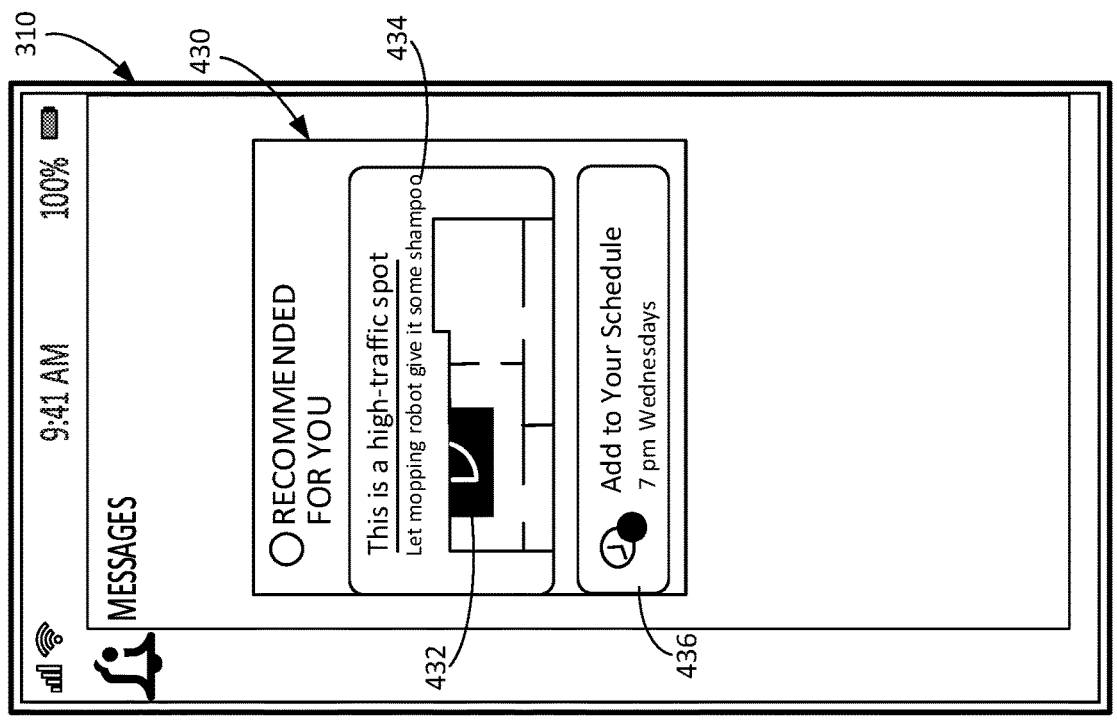

For presenting indicators of the recommended behavior control zone and the recommended prioritization level to be associated with the recommended behavior control zone, the operation 410 can provide such indicators in a number of manners. The operation 410 can be, for example, similar to the operation 302 described with respect to FIG. 8 for presenting an indicator of the recommended behavior control zone. FIGS. 13A and 13B provide further examples of the user interface 310 presenting recommendations to the user.

Referring to FIG. 13A, the user interface 310 for the user computing device, e.g., the user computing device 188, presents a notification 430 indicating that a behavior control zone 432 is recommended. The notification 430 can include an indicator 434 of a particular robot that operates in the environment that should perform a particular behavior in the behavior control zone 432. For example, the notification 430 here recommends that a robot mop clean the region corresponding with the behavior control zone 432. The recommended priority here can be associated with a temporal condition. The user interface 310 presents a recommendation 436 to add a scheduled time for cleaning the behavior control zone 432. In this scheduled time, the behavior control zone 432 is associated with a priority such that the robot mop would prioritize cleaning the behavior control zone 432 during the scheduled time. As discussed in this disclosure, the user 30 can operate the user interface 310 to accept the recommendations, to modify the recommendations, or to decline the recommendations.

In some implementations, multiple robot cleaners operate in the environment, including a robot mop and a robot vacuum, and the notification 430 can recommend that another robot operating in the environment, such as a robot vacuum, performs another behavior in the same behavior control zone 432. For example, the recommendations can include a recommendation for a sequence of behaviors performed by different robots in the same behavior control zone 432. The recommendation can include a recommendation for the robot vacuum to perform a clean behavior in the behavior control zone 432, and a recommendation for the robot mop to perform a clean behavior in the behavior control zone 432 after the robot vacuum performs the clean behavior in the behavior control zone 432. If the behavior control zone 432 corresponds to a region near an entryway, the robot vacuum can vacuum debris that has been tracked into the region, and then the robot mop can wipe the region for any dried mud stains and other debris that the robot vacuum may have missed.

In some implementations, the recommendations can include a recommendation for one of the robots to perform a behavior and for one of the robots to avoid the behavior control zone 432. The behavior control zone 432 functions as a clean zone for one of the robots, and a keep out zone for the other of the robots. The behavior control zone 432 could, for example, correspond to a carpeted surface near an entryway where occupants could track debris into the environment. The behavior control zone 432 could function as a keep out zone for the robot mop and as a clean zone for the robot vacuum.

FIG. 13B presents another example of recommendation indicators presented on the user interface 310. The user interface 310 presents a notification 440 including a recommendation to define a behavior control zone 442 around a dining table in a dining room 444. If the behavior control zone 442 is added to the list of behavior control zones for a robot, the behavior control zone 442 can automatically be added to a list of priorities for the robot. For example, if a scheduled time for cleaning behavior control zones defined for the robot has already been established, the behavior control zone 442, if accepted by the user 30, can be automatically added to the sequence of behavior control zones cleaned at the scheduled time. As discussed in this disclosure, the user 30 can operate the user interface 310 to accept the recommendation, to modify the recommendation, or to decline the recommendation.

The operations 412 and 414 involve operations for the user 30 to select a behavior control zone and a priority associated with the behavior control zone. At the operation 412, the user 30 provides an input indicative of a user-selected behavior control zone and an input indicative of a user-selected priority. At the operation 414, the user computing device 188 presents an indicator of the user-selected behavior control zone.

The user input at the operations 412, 414 can vary in implementations. With respect to the user selection of the behavior control zone, the user 30 can accept or modify the recommended behavior control zone generated at the operation 408. For example, the user 30 can provide a user selection by accepting a recommended behavior control zone and a recommended priority, e.g., accepting the recommendations discussed with respect to FIGS. 13A-13B. Alternatively, the user 30 can operate the user computing device 188 in the manner described with respect to FIGS. 9A and 9B to provide a user-selected modification of the recommended behavior control zone.

In examples in which the user 30 accepts the recommended behavior control zone, the indicator of the user-selected behavior control zone can be the same as or similar to the indicator of the recommended behavior control zone as discussed with respect to the operation 410. As discussed with respect to FIGS. 10A-10D, the user 30 can modify the recommended behavior control zone by redefining a perimeter of the recommended behavior control zone to arrive at a user-selected behavior control zone. The examples of FIGS. 10A-10D can thus be examples of the operation 410 (in which the indicator of the recommended behavior control zone is presented) and the operation 414 (in which the indicator of the user-selected behavior control zone is presented), and can reflect the user input provided at the operation 412.

The user 30 can further provide a user-selected modification of the recommended priority. For example, the user 30 could select a different condition associated with the priority, e.g., one of the temporal, spatial, environmental, or robot conditions described in this disclosure. The user 30 could modify a temporal condition by scheduling a different time at which the robot 100 initiates movement to the behavior control zone. The user 30 could modify a spatial condition by setting a different region in the environment where, upon entering the region, the robot 100 initiates movement to the behavior control zone. The user 30 could modify an environment condition by setting a different state of an object (e.g., a door) in the environment that would trigger the robot 100, when detected by the robot 100, to initiate movement to the behavior control zone. The user 30 could modify a robot condition by setting a different charge level for the battery of the robot 100 that triggers the robot 100 to initiate movement to the behavior control zone. If other behavior control zones have already been established, the user 30 could modify a relative priority of the behavior control zone, e.g., a priority relative to the priorities of the other behavior control zones. The user 30 can further adjust the sequence in which behavior control zones are traversed.

In some implementations, rather than presenting the indicators of the recommended behavior control zone and the priority as described with respect to the operation 410, the user interface 310 presents a representation of a map of the environment, and the user 30 can interact with the user interface 310 to select a behavior control zone without basing the selection of the behavior control zone off of a recommended behavior control zone. Furthermore, the user 30 can interact with the user interface 310 to select a priority to associate with the user-selected behavior control zone without basing the selection of the behavior control zone off of a recommended priority. FIGS. 13C-13K illustrate examples of the user interface 310 during a process facilitated by the user 30 to select a behavior control zone and select a priority to associate with the behavior control zone. In these examples, a recommended behavior control zone and a recommended priority are not provided to the user 30.

Figure 13D:
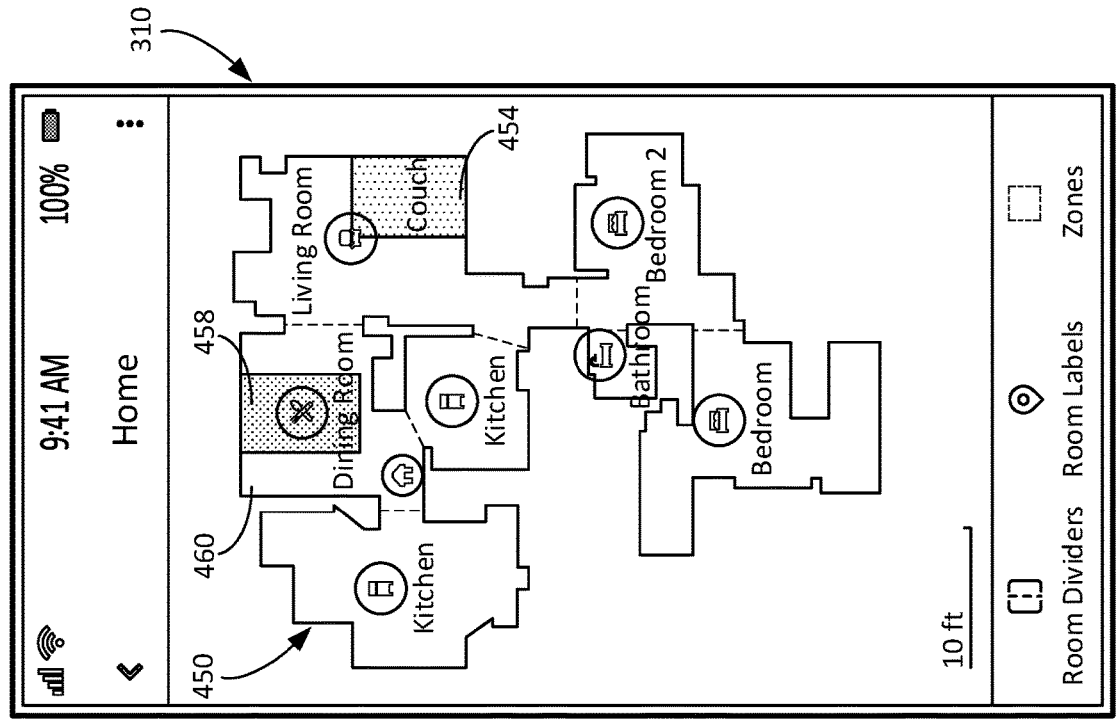
FIGS. 13C-13D are illustrations of user interfaces for providing indicators of behavior control zones on a map.
Figure 13C:
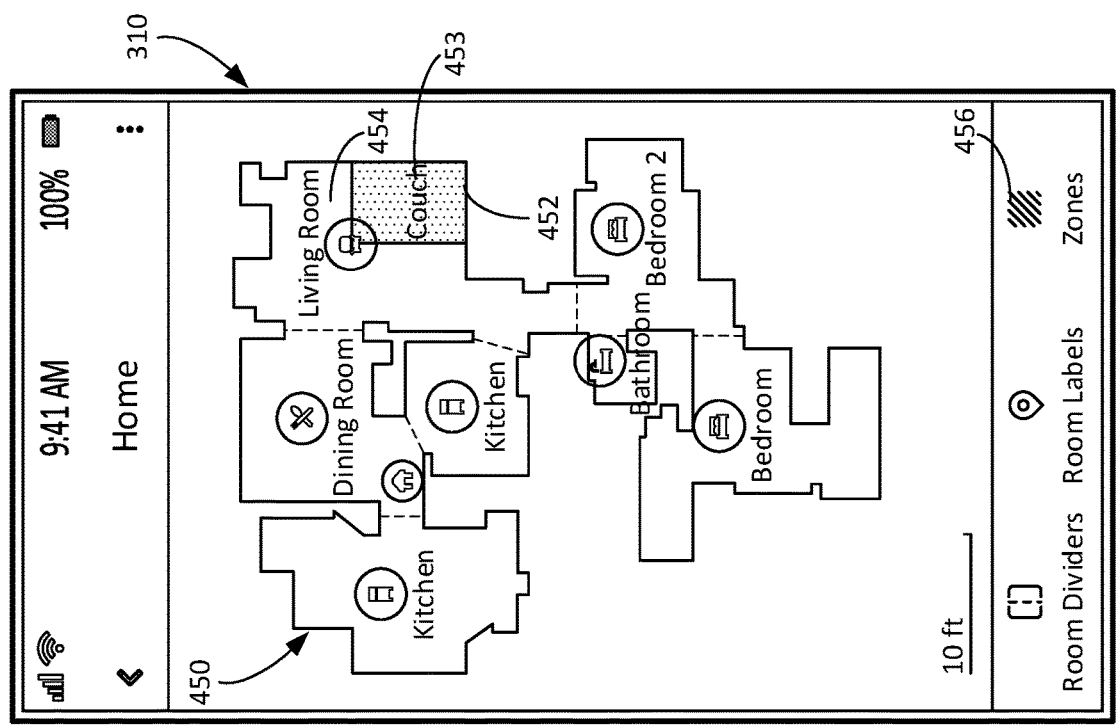
Figure 13F:
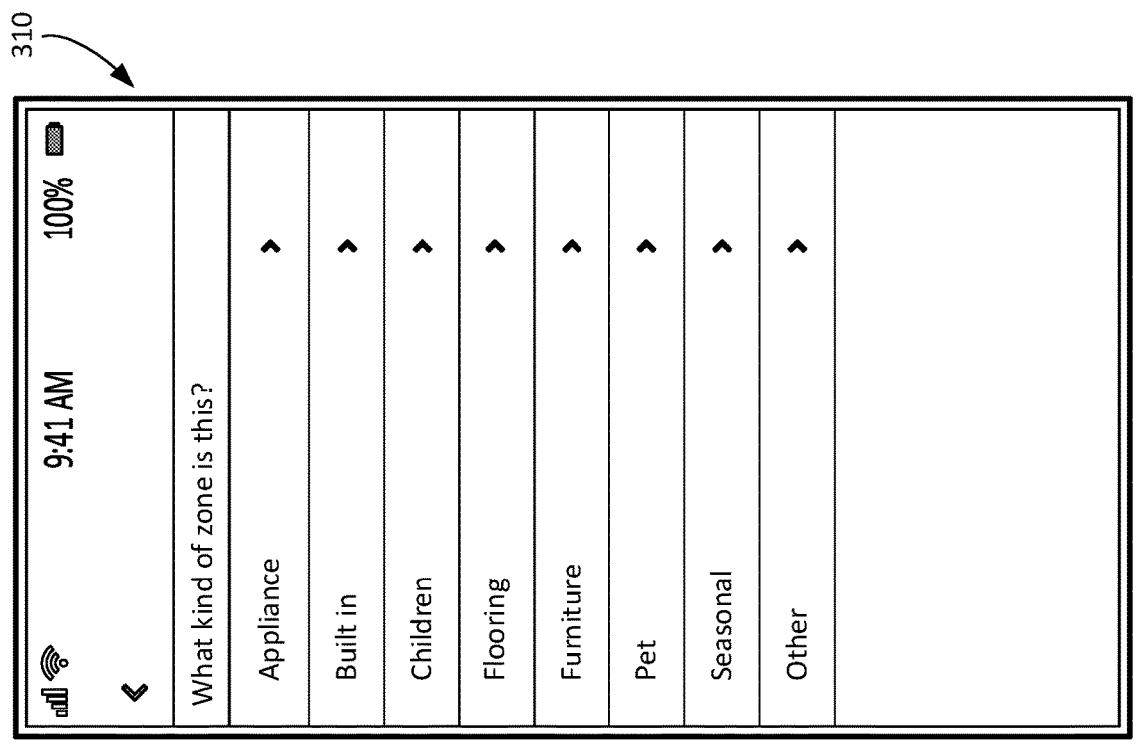
FIGS. 13E-13F are illustrations of user interfaces for allowing a user to define a name and a type of a behavior control zone.

Referring to FIG. 13C, the user interface 310 presents a map 450 of an environment. The map 450 can be labeled with names of different rooms in the environment to allow the user 30 to easily identify an orientation of the map 450. An indicator 452 of a first behavior control zone and a label 453 for the first behavior control zone is presented. This first behavior control zone was previously established, e.g., using the processes described in this disclosure, in a space in the environment identified as a living room. The label 453 is "couch." An indicator 454 represents this space. In the example presented in FIG. 13C, the first behavior control zone was previously established as being associated with a couch in the environment. The visual representations on the user interface 310 allow the user 30 to define behavior control zones with visual references to features in the environment, such as rooms, objects, and previously-established behavior control zones. A user input device of the user computing device can be a touchscreen, and the user interface 310 can present a user input element 456 that can be invoked by the user 30 (e.g., with a touch) to allow the user 30 to define the behavior control zone.

In response to invocation of the user input element 456, the user computing device can be operated to allow the user 30 to define a second behavior control zone. As shown in FIG. 13D, the user 30 can define a second behavior control zone corresponding to a region in a room in the environment identified as a dining room. An indicator 458 represents the second behavior control zone, and an indicator 460 represents the dining room. The indicator 454 and the indicator 458 are examples of indicators of user-selected behavior control zones that would be presented during examples processes at the operation 418.

Figure 13E:
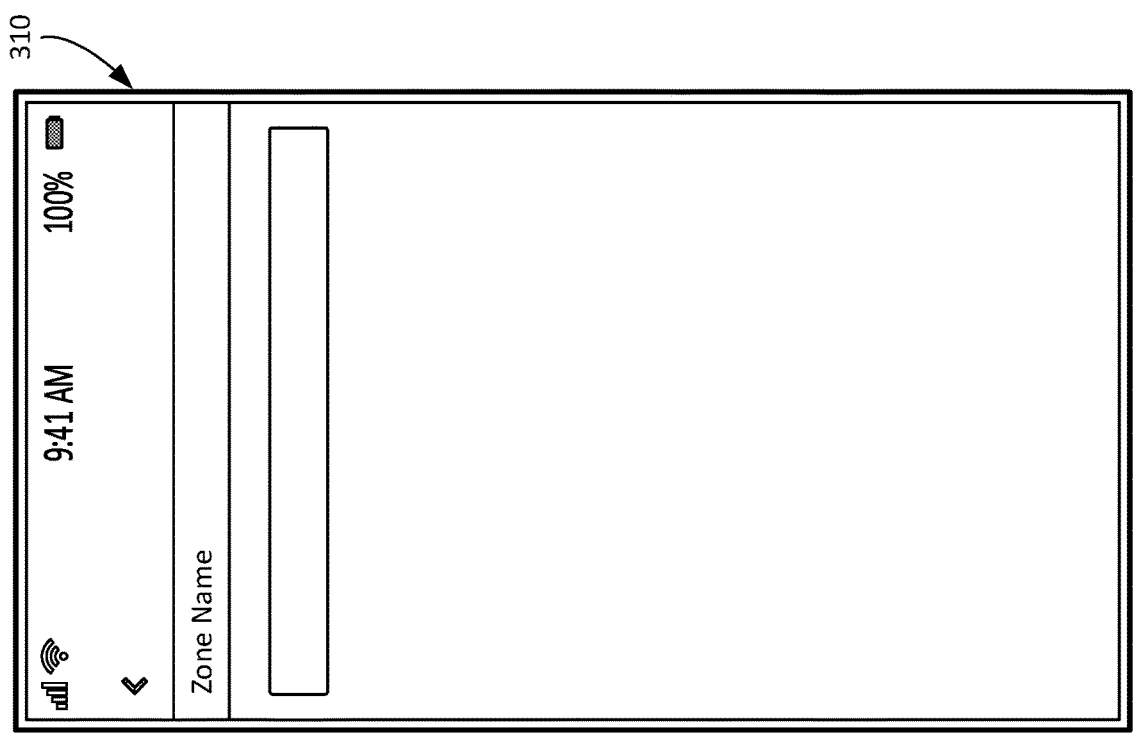

Referring to FIG. 13E, the user 30 can provide a label for the second behavior control zone. The user interface 310 provides a user entry element 462 that allows the user 30 to provide a name for the second behavior control zone that appears as the label for the second behavior control zone on the map 450 (shown in FIG. 13D). Then, referring to FIG. 13F, the user 30 can identify a type of the second behavior control zone. The type of a behavior control zone can be, for example, an appliance, a built in home feature, an area for children, a flooring, furniture, an area for pet, a seasonal area, or other area. Other behavior control zone types are possible, such as a trash area, a window, an entryway, or other type of area in an environment. In some implementations, the user 30 can further define a sub-type of the behavior control zone. For example, if the type of a behavior control zone is an appliance, a selectable sub-type could include a microwave, a toaster, a dishwasher, a laundry machine, a dryer, or other appropriate appliance. Or if the type of the behavior control zone is furniture, the sub-type could include specific types of furniture, such as a couch, a coffee table, or other furniture type. The type and/or sub-type of a behavior control zone can be used to associate a priority with the behavior control zone. For example, the type and/or sub-type can involve a certain condition, e.g., a temporal condition, a spatial condition, an environmental condition, or a robot condition as discussed in this disclosure.

The selection of the type and/or sub-type can, in some implementations, automatically cause an association between the second behavior control zone and a priority. For example, if a scheduled time for cleaning behavior control zones has already been defined, the second behavior control zone can be added to the behavior control zones to be cleaned during the scheduled time. The sequence of the behavior control zones can also be adjusted so that the robot 100 can efficiently clean each of the behavior control zones during the scheduled time, e.g., to minimize backtracking.

In some implementations, the user selection of the priority can involve the user 30 selecting the behavior control zones and then starting a mission in which the robot 100 cleans the selected behavior control zones in an order provided by the user 30. For example, as shown in FIG. 13G, the user 30 can select a subset of several behavior control zones 463 in the environment to be cleaned by the robot 100. The behavior control zones 463 include rooms 463*a* as well as behavior control zones 463*b* that are defined separately from the rooms 463*a*. The user 30 can operate the user interface 310 to select the behavior control zones 463 to clean, and an order in which to clean the behavior control zones 463. In some implementations, as the user 30 selects the subset of the behavior control zones 463, the order in which the behavior control zones 463 (appearing as numerals next to the selected behavior control zones 463 in the example shown in FIG. 13G) can be automatically selected. The user 30 can then manually modify the order in which the selected behavior control zones are cleaned. The order in which the behavior control zones are cleaned is indicative of relative priorities of the selected behavior control zones. The user 30 can then initiate a mission for the robot 100 in which the robot 100 cleans the selected behavior control zones in the selected order.

In some implementations, a priority can be selected for multiple robots that operate in the environment, including the robot 100. For example, the multiple robots can include both a robot mop and a robot vacuum, and referring to FIG. 13H, the user 30 can select a subset of several behavior control zones 464 in the environment to be cleaned by both the robot mop and the robot vacuum. The user 30 can select the behavior control zones 464 in a way similar to that described with respect to FIG. 13G. The selected sequence for cleaning the behavior control zones 464 can be the same for both the robot mop and the robot vacuum. In some implementations, the user 30 can define different sequences for the robot mop and the robot vacuum, such that the robot mop cleans the selected behavior control zones in a first sequence, and the robot vacuum cleans the selected behavior control zones in a second sequence. In the example shown in FIG. 13H, when the user 30 invokes the user input element 466 to initiate the mission, the robot vacuum cleans the selected behavior control zones in the selected sequence, and then the robot mop cleans the selected behavior control zones in the selected sequence.

Figure 13J:
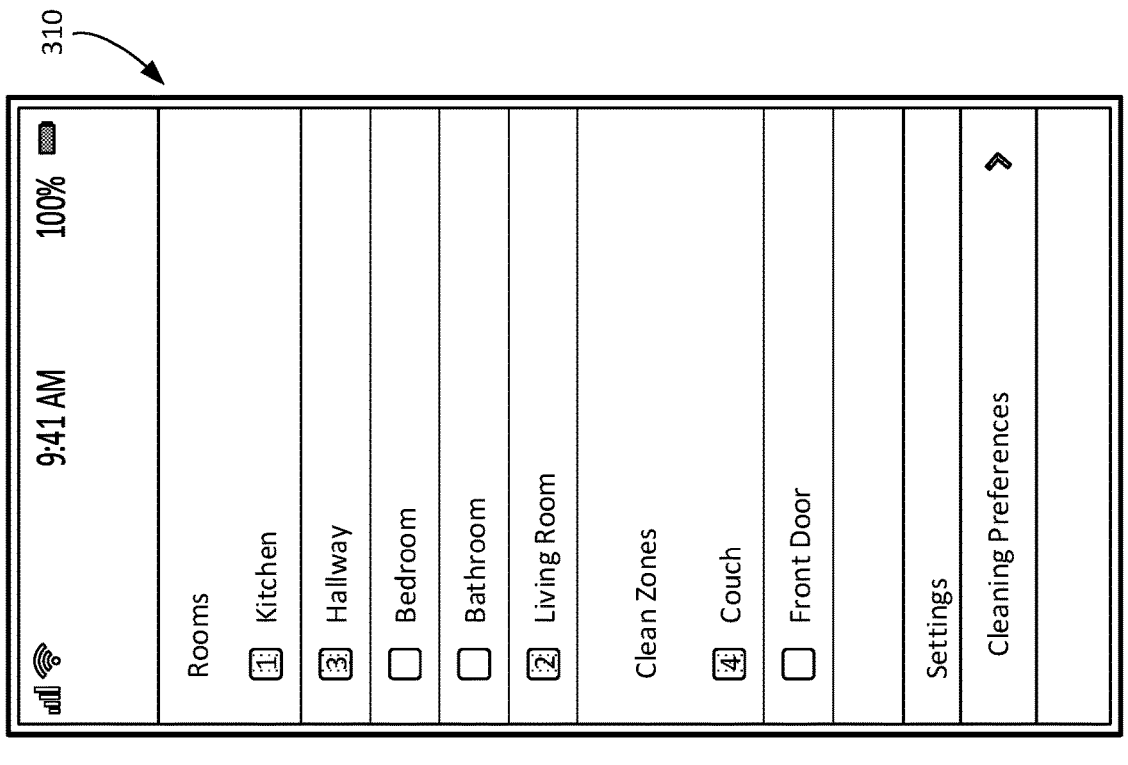
FIGS. 13I-13K are illustrations of user interfaces for allowing a user to selecting a schedule to associate with a behavior control zone
Figure 13I:
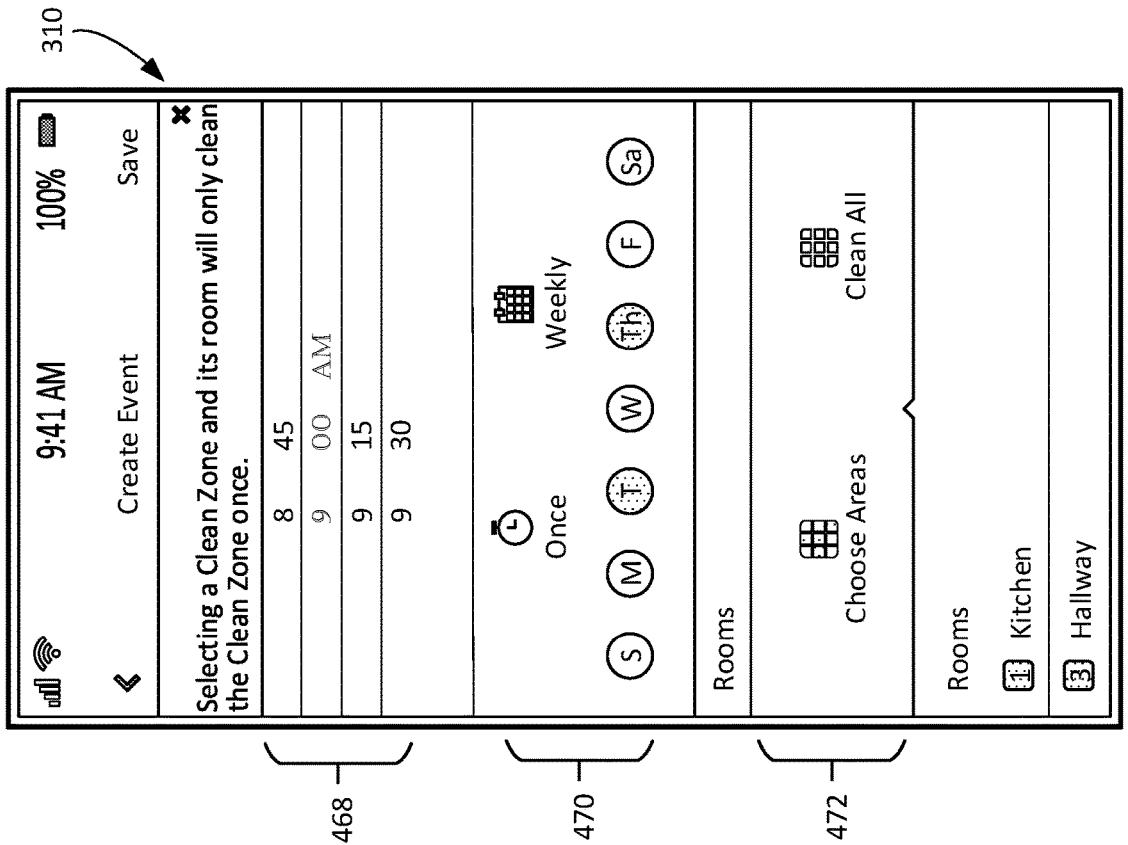
Figure 13K:
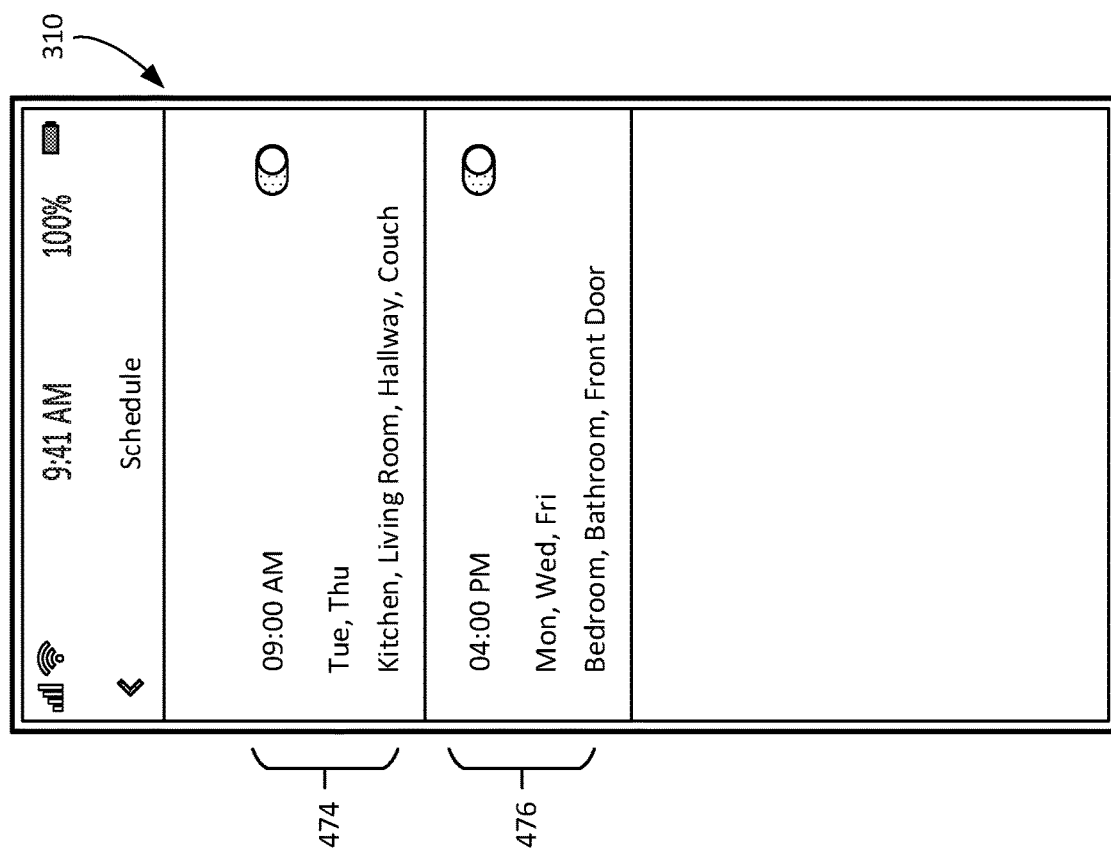

Referring to FIGS. 13I-13K, a scheduled time can also be defined for the robot 100 to initiate a mission. Referring to FIGS. 13I-13J, the user interface 310 can present a user input element 468 to select a time and a user input element 470 to select a frequency for initiating a mission. The user interface 310 can further present a user input element 472 to allow the user 30 to select between cleaning an entirety of the environment or some subset of the behavior control zones defined in the environment. In the examples shown in FIGS. 13I-13J, the user 30 selects a time of 9:00 AM, with a frequency of twice weekly on Tuesdays and Thursdays, in which the robot 100 cleans in order the kitchen, the living room, the hallway, and the couch. Referring to FIG. 13K, two scheduled times 474, 476 have been defined. At the scheduled time 474, the robot 100 initiates a mission to clean a first set of behavior control zones, including the behavior control zones associated with the kitchen, the living room, the hallway, and the couch. At the scheduled time 476, the robot 100 initiates a mission to clean a second set of behavior control zones, including the behavior control zones associated with the bedroom, the bathroom, and the front door.

Turning back to FIG. 12, the operations 416 and 418 involve operations for establishing the user-selected behavior control zone and its priority so that the behavior control zone and priority can be used for controlling the robot 100. At the operation 416, the user-selected behavior control zone is defined by the computing system 401. The operation 416 is similar to the operation 206 as described with respect to FIG. 5. At the operation 418, the user-selected behavior control zone is associated with the user-selected priority. The operations 416 and 418 can occur in response to the user selections provided at the operation 412, or in response to a confirmation by the user 30 of the user selections provided at the operation 412.

The operations 410, 412, 414, 416, and 418 are described herein as involving user selection of a behavior control zone based on the recommended behavior control zone. In some implementations, the behavior control zone is defined without any user intervention. Behavior control zones for controlling the robot 100 are automatically created based on the recommended behavior control zones without the user 30 having to providing a modification of the recommended behavior control zone. The recommended behavior control zone provided at the operation 408 can correspond to the behavior control zone that is defined at the operation 416. In some implementations, the user 30 only accepts the recommended behavior control zone to define the behavior control zone. In other implementations, the user 30 does not need to accept the recommended behavior control zone for the recommended behavior control zone to be defined. The recommended behavior control zone is defined once the subset of sensor events is identified. The mobile device 188 does not request input from the user 30 to modify the recommended behavior control zone, and the user 30 does not provide any input, e.g., at the operation 412, to modify the recommended behavior control zone. The mobile device 188 can present an indicator of the recommended behavior control zone, and indicate that this recommended behavior control zone is defined as a behavior control zone that controls the robot 1000.

The operations 420, 422, and 424 involve operations for moving the robot 100 to the behavior control zone based on a priority and initiating a behavior once the robot 100 arrives at the behavior control zone. At the operation 420, the robot 100 initiates movement to the behavior control zone based on the priority associated with the behavior control zone. At the operation 422, the computing system 401 determines that the robot 100 is proximate to the user-selected behavior control zone or is within the user-selected behavior control zone. And at the operation 424, the robot 100 initiates a behavior associated with the user-selected behavior control zone.

As discussed in this disclosure, multiple behavior control zones can be defined, and each of these multiple behavior control zones can be associated with different relative priorities. The behavior control zone and associated priority defined in the process 400, e.g., at the operations 416 and 418, can be one of multiple behavior control zones that control the operations of the robot 100 at the operations 420, 422, and 424. The robot 100 can initiate the movement to the behavior control zone before or after the other behavior control zones depending on the relative priority of the behavior control zone, and depending on whether the other behavior control zones are selected for the robot 100 to travel to during the mission in which the robot 100 is to visit the behavior control zone. For example, in examples in which the robot 100 performs a mission to perform behaviors in a first behavior control zone associated with a first priority and a second behavior control zone associated with a second priority, if the first priority is higher than the second priority, then the robot 100 initiates movement to the first behavior control zone before initiating movement to the second behavior control zone.

Furthermore, as discussed in this disclosure, the conditions that trigger the robot 100 to initiate movement to the behavior control zone can vary in implementations. For example, in some implementations, the robot 100 initiates the movement to the behavior control zone at the operation 420 in response to a condition, e.g., a temporal condition, a spatial condition, an environmental condition, or a robot condition, being satisfied.

In some implementations, if the behavior control zone defined in the process 400 is a clean zone, the robot 100 can perform a clean behavior in the behavior control zone consistent with the clean behavior performed during the coverage behavior. In this regard, the robot 100 does not change a movement speed, a vacuum power, a movement pattern, or other cleaning parameter in performing the clean behavior in the behavior control zone. In some implementations, the behavior control zone is associated with a focused clean behavior in which the robot 100 changes the movement speed, the vacuum power, the movement pattern, or other cleaning parameter in performing the clean behavior in the behavior control zone. For example, the focused clean behavior can cause the robot 100 to cover the behavior control zone two or more times, to increase a vacuum power of the autonomous cleaning robot, or to decrease a movement speed of the autonomous cleaning robot.

FIGS. 14A-14F show examples of the robot 100 moving about an environment and cleaning the environment in accordance with behavior control zones and their associated priorities. In these examples, the environment is a room, though the systems and processes described with respect to these examples are applicable to implementations in which the robot 100 operates in environments containing multiple rooms. The behaviors described with respect to the behavior control zones shown in FIGS. 14A-14F are clean behaviors, though in other implementations, other behaviors could be performed in one or more of the behavior control zones.

Figure 14A:
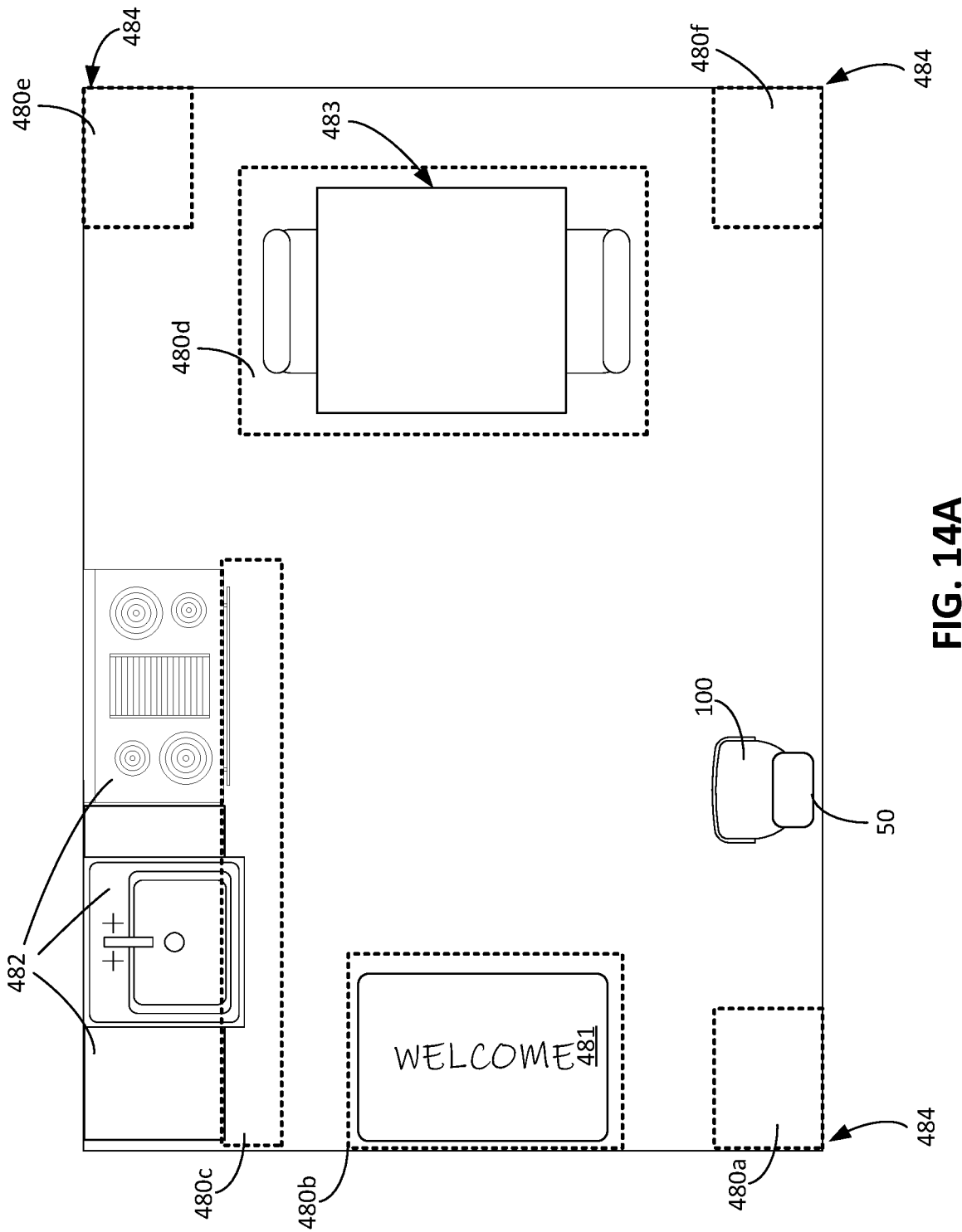
FIGS. 14A-14F are top views of an example of an environment including an autonomous mobile robot operating in accordance with one or more behavior control zones associated with one or more priorities.
Figure 14B:
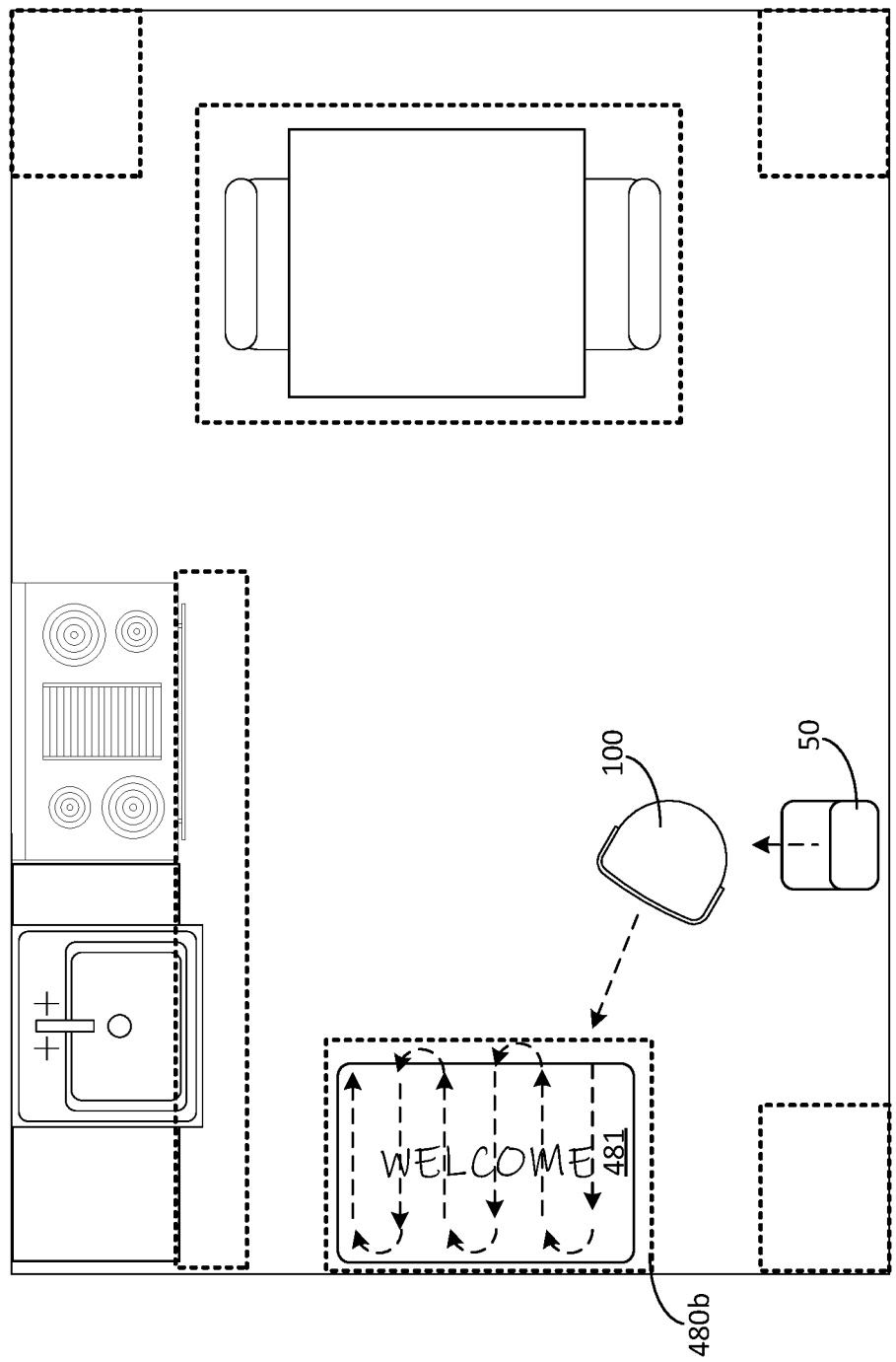

Referring to FIG. 14A, behavior control zones 480a, 480b, 480c, 480d, 480e, 480f (collectively referred to as behavior control zones 480) are defined, e.g., using examples of the process 400. The behavior control zone 480b can be associated with an entryway rug 481. The behavior control zone 480c can be associated with kitchen surfaces 482. The behavior control zone 480d can be associated with a dining room area 483. And the behavior control zones 480a, 480e, 480f can be associated with corner portions 484 of the room. In FIG. 14A, the robot 100 is shown docked at the docking station 50. The behavior control zones 480 can each have a different associated priority such that the robot 100 prioritizes one or more of the behavior control zones 480 over the other behavior control zones 480. For example, in the example shown in FIG. 14A, in implementations in which the behavior control zones 480 are clean zones, the robot 100 can prioritize cleaning the behavior control zone 480a, then the behavior control zone 480b, then the behavior control zone 480c, then the behavior control zone 480d, then the behavior control zone 480e, and then the behavior control zone 480f. In a mission that is time-constrained, the robot 100 can prioritize cleaning the behavior control zone 480a over the other behavior control zones.

FIGS. 14B-14F show further examples in which the priorities associated with the behavior control zones 480 control the navigation of the robot 100. One or more behavior control zones 480 can be associated with a priority responsive to a temporal condition. For example, referring to FIG. 14B, the behavior control zone 480b associated with the entryway rug 481 can be associated with a temporal condition in which the robot 100 initiates movement to the behavior control zone 480b at the start of a mission. The mission can be a scheduled mission, or can be a mission that the user 30 manually initiates. The priority of the behavior control zone 480b can be defined such that when the robot 100 initiates a mission starting at the docking station 50, the robot 100 first moves to the behavior control zone 480b and performs a clean behavior in the behavior control zone 480b.

For example, the robot 100 moves along a series of parallel rows in the behavior control zone 480b to perform the clean behavior. After performing the clean behavior, the robot 100 can proceed to perform a coverage behavior to clean the rest of the environment. Alternatively, the mission is a scheduled mission, and the priority of the behavior control zone 480b can be defined such that the robot 100 cleans the behavior control zone 480b and then returns to the docking station 50.

Figure 14C:
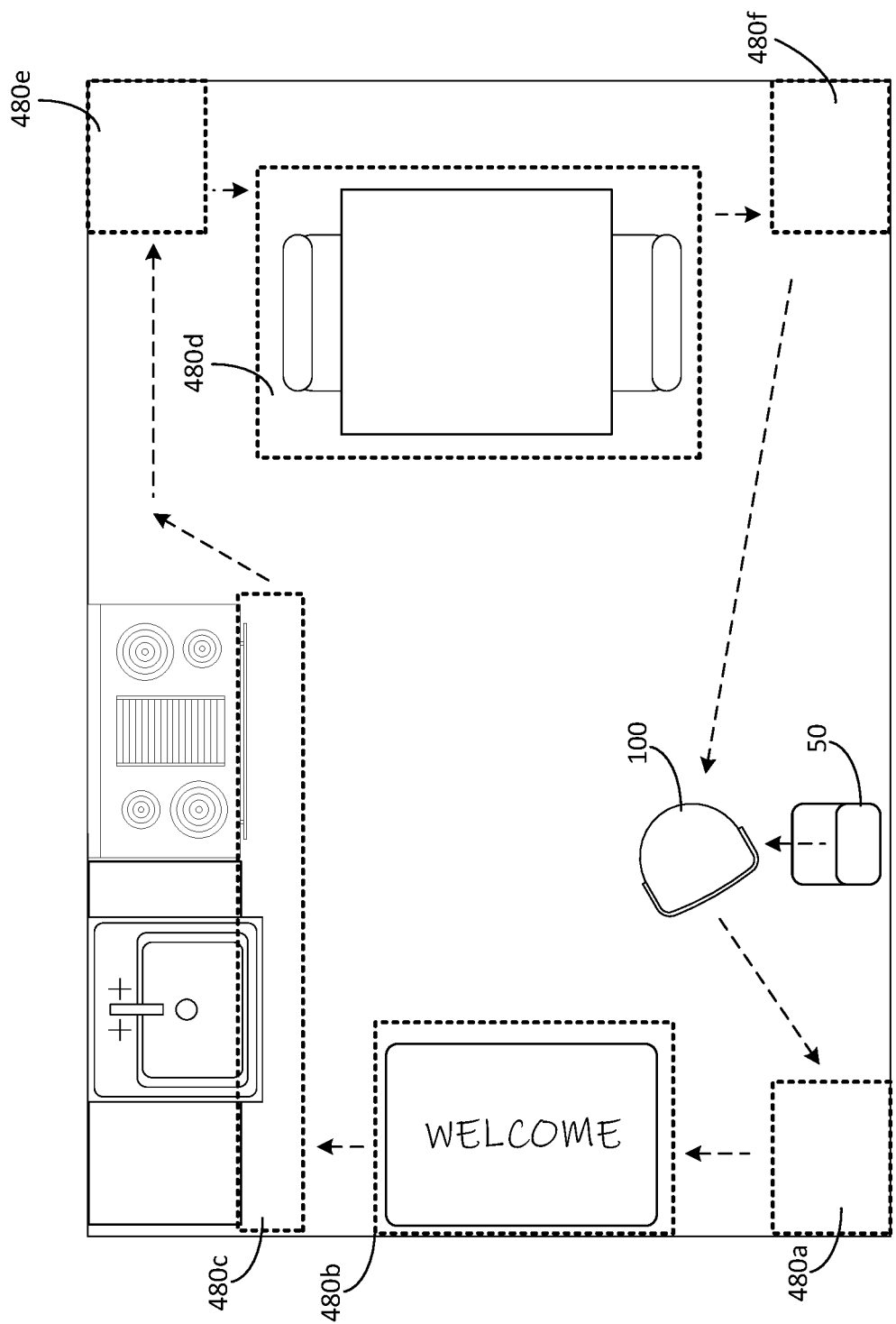
Figure 14D:
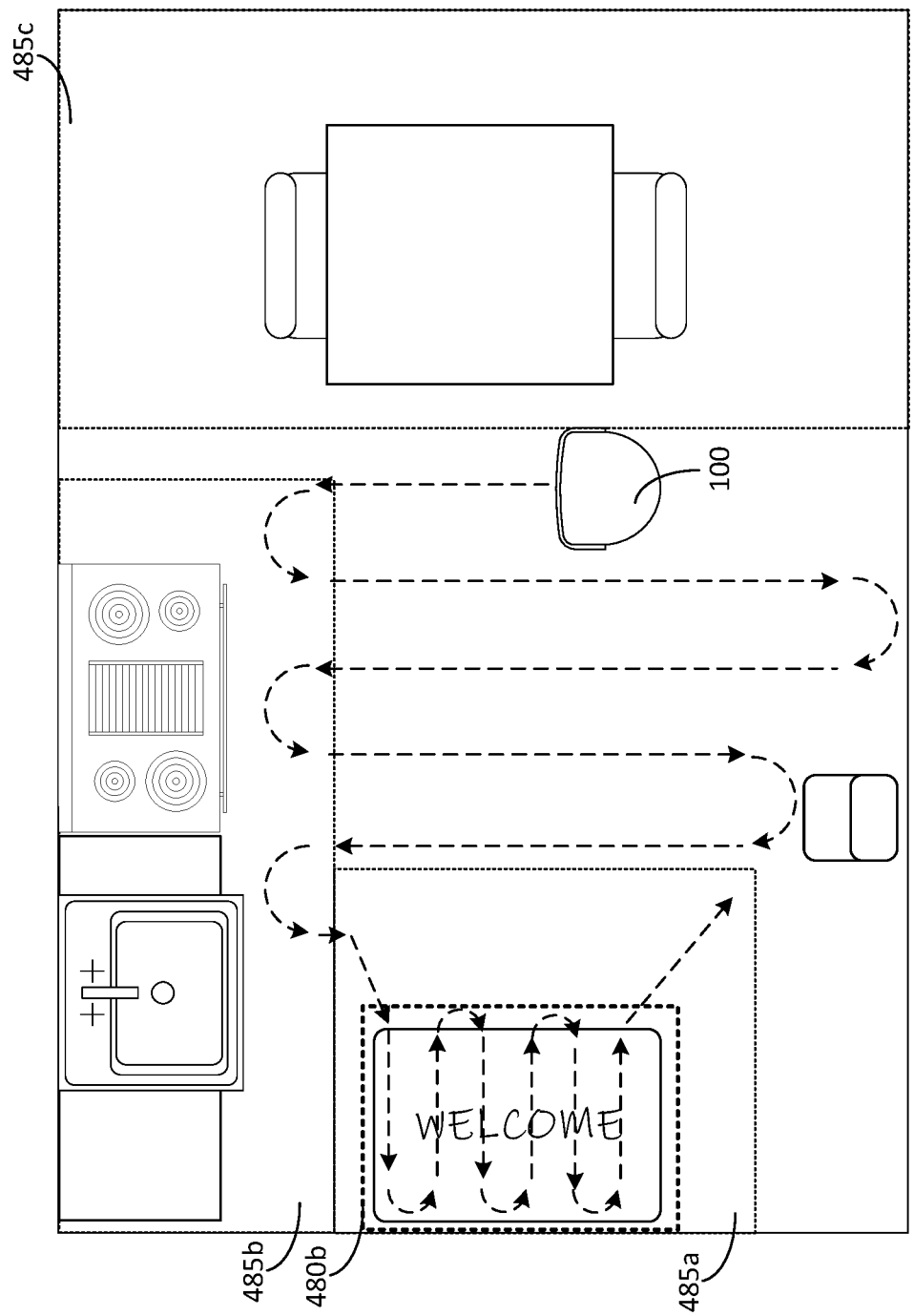

In further examples in which a priority is responsive to a temporal condition, referring to FIG. 14C, the behavior control zones 480 can be associated with a temporal condition in which the robot 100 sequentially initiates movement to each of the behavior control zones 480a-480f in a mission, and performs clean behaviors in each of the behavior control zones 480a-480f. For example, the user 30 can schedule a mission at a particular time to clean a selected set of behavior control zones (i.e., the behavior control zones 480a-480f). The robot 100, at the scheduled time, leaves the docking station 50 and then initiates movement to the behavior control zone 480a. After performing a clean behavior in the behavior control zone 480a, the robot 100 initiates movement to the behavior control zone 480b and then performs a clean behavior in the behavior control zone 480b. After performing a clean behavior in the behavior control zone 480b, the robot 100 initiates movement to the behavior control zone 480c and then performs a clean behavior in the behavior control zone 480c. After performing a clean behavior in the behavior control zone 480c, the robot 100 initiates movement to the behavior control zone 480d and then performs a clean behavior in the behavior control zone 480d. After performing a clean behavior in the behavior control zone 480d, the robot 100 initiates movement to the behavior control zone 480e and then performs a clean behavior in the behavior control zone 480e. After performing a clean behavior in the behavior control zone 480e, the robot 100 initiates movement to the behavior control zone 480f and then performs a clean behavior in the behavior control zone 480f. After performing a clean behavior in the behavior control zone 480f, the robot 100 initiates movement back to the docking station 50. The priorities associated with the behavior control zones 480 in this example thus result in the robot 100 initiating movement to the behavior control zones 480 during the scheduled mission and in a sequence based on the relative priorities.

One or more of the behavior control zones 480 can be associated with a priority responsive to a spatial condition. For example, referring to FIG. 14D, the behavior control zone 480b can be associated with a spatial condition in which the robot 100 initiates movement to the behavior control zone 480b in response to being within an entry region 485a. For example, as the robot 100 moves about the environment and generates mapping data for constructing a map, regions, e.g., rooms or regions smaller than rooms, can be identified. In environments with multiple rooms, the regions could be rooms, e.g., an entry room, a kitchen room, or a dining room. In the example depicted in FIG. 14D, the regions can include the entry region 485a, a kitchen region 485b, and a dining region 485c. The priority associated with the entry region 485a is selected such that the robot 100 initiates movement to the behavior control zone 480b in response to the robot 100 being within the entry region 485a. The robot 100 then performs a behavior once the robot 100 encounters the behavior control zone 480b.

Figure 14E:
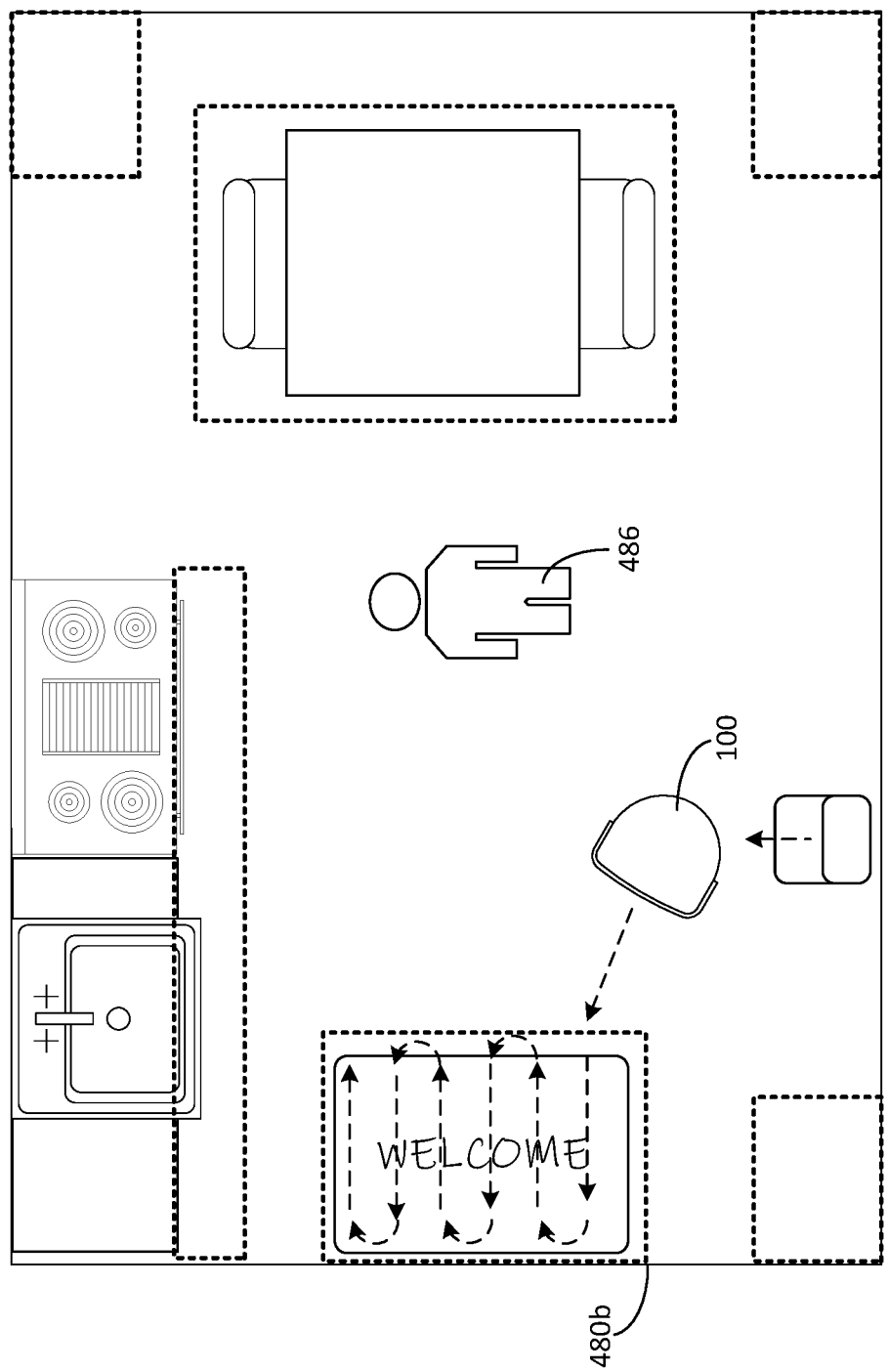

One or more of the behavior control zones 480 can be associated with a priority responsive to an environmental condition. Referring to FIG. 14E, the behavior control zone 480b can be associated with an environmental condition in which the robot 100 initiates movement to the behavior control zone 480b in response to a human occupant 486 entering the environment. The robot 100 can receive data indicative of the human occupant 486 entering the environment. For example, a user computing device carried by the human occupant 486 can generate location data indicative of a location of the user computing device, and can transmit data indicative of the human occupant 486 entering the environment based on these location data. The priority responsive to the environment condition for the behavior control zone 480b can thus allow the robot 100 to clean debris that the human occupant 486 may have tracked into the environment when the human occupant 486 entered the environment.

Figure 14F:
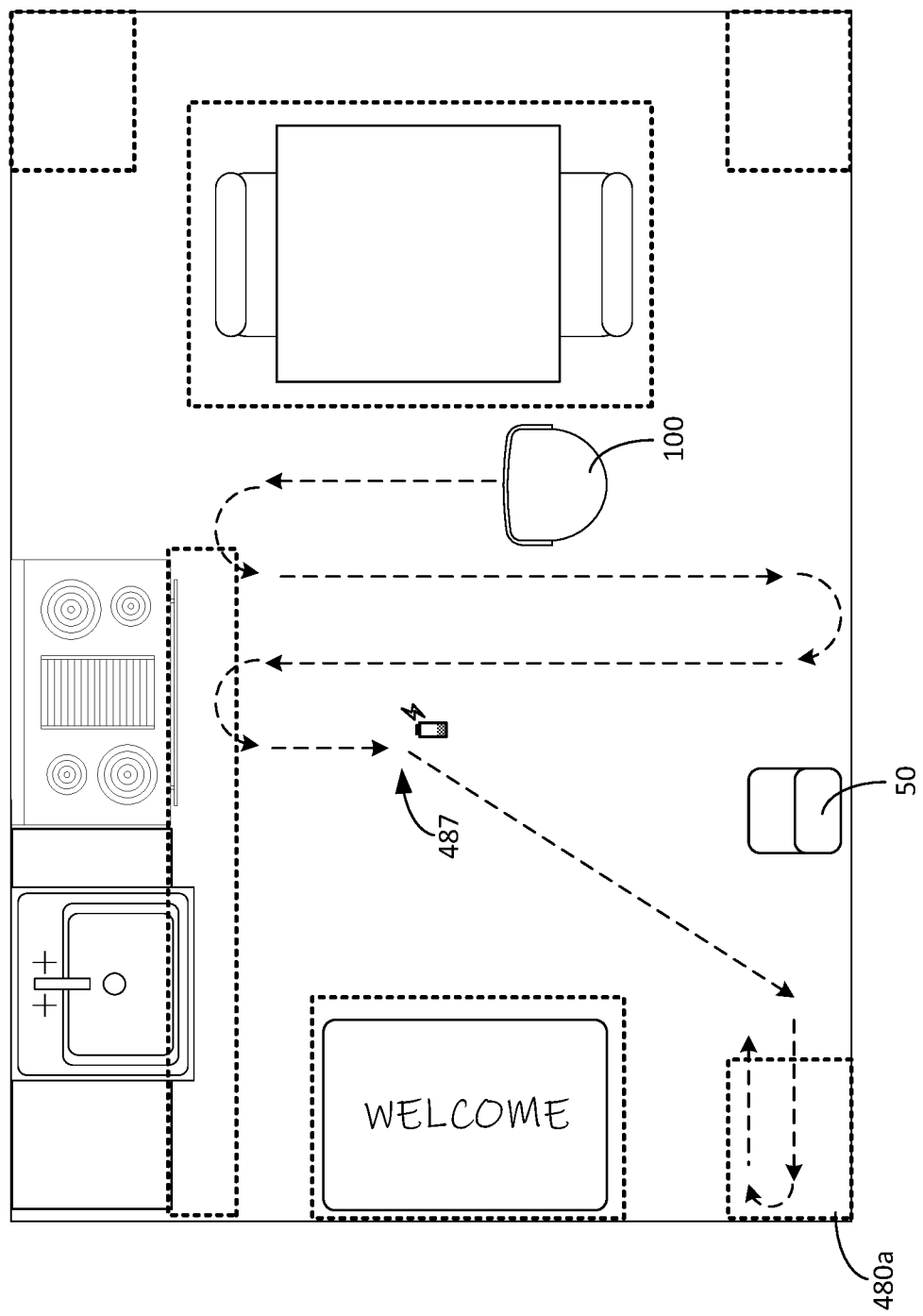

One or more of the behavior control zones 480 can be associated with a priority responsive to a robot condition. Referring to FIG. 14F, for example, the behavior control zone 480b can be associated with a robot condition in which the robot 100 initiates movement to the behavior control zone 480a in response to a low battery status of the robot 100. For example, the low battery status can occur when a battery level is below a battery level threshold, e.g., between 5% and 25%, 10% and 20%, or other appropriate value. In the example shown in FIG. 14F, the low battery status is triggered when the robot 100 is at a location 487. Once the low battery status is triggered, the robot 100 initiates movement to the behavior control zone 480a and then performs a clean behavior in the behavior control zone 480a. After performing the clean behavior in the behavior control zone 480a, the robot 100 returns to the docking station 50 for recharging. In some implementations, rather than being a low battery status that triggers the robot 100 to initiate the movement to the behavior control zone 480a, a near-capacity status for the debris bin of the robot 100 can trigger the robot 100 to initiate the movement to the behavior control zone 480a. For example, if the debris level in the debris bin is greater than a threshold level, e.g., at least 70 to 90% of full bin capacity, the robot 100 can initiate movement to the behavior control zone 480a and then perform the clean behavior in the behavior control zone 480a. The robot 100 can then return to the docking station 50 to allow the docking station 50 to evacuate debris from the robot 100 into the debris chamber of the docking station 50.

FIGS. 15-16, 17A-17B, and 18A-18C illustrate example methods of defining behavior control zones to cause an autonomous mobile robot, e.g., the robot 100, to disable a behavior as the robot traverses the behavior control zone. In FIG. 15, a process 500 includes operations 502 and 504. The process 500 is used to establish a region within an environment where the robot 100 disables a certain behavior that could prevent the robot 100 from traversing the region.

At the operation 502, mapping data collected by the robot 100 as the robot 100 moves about the environment is received. The operation 502 can be similar to the operation 352 described with respect to the process 350 of FIG. 11.

At the operation 504, a behavior control zone corresponding to a portion of the mapping data is defined. The behavior control zone causes the robot 100 to disable a behavior as the robot 100 traverses the behavior control zone. The robot 100 can receive data indicative of the behavior control zone, and then, based on the data, disable the behavior in response to encountering the behavior control zone.

The behavior that is disabled can vary in implementations. In some implementations, the behavior is a clean behavior. For example, if a user wishes to establish a quiet zone in which the robot 100 produces less noise in the environment, the behavior control zone can be a zone in which the robot 100 disables the cleaning system and/or the vacuum system 119 (shown in FIG. 3A) so as to reduce the noise produced by the robot 100. In some implementations, the behavior that is disabled is a rug ride up behavior that is triggered in response to the robot 100 detecting motion indicative of a surface feature that causes a portion of the robot 100 to move upward, as discussed in this disclosure.

Referring to FIG. 15, a process 600 for providing a recommended behavior control zone for disabling a behavior of the robot 100, defining a user-selected behavior control zone, and controlling the robot 100 such that the behavior is disabled as the robot traverses the user-selected behavior control zone is illustrated. The process 600 includes operations 602, 604, 606, 608, 610, 612, 614, 616, 618, and 620.

The operations 602 and 604 involve operations of the robot 100 as the robot 100 performs a cleaning mission or a training mission and maneuvers about the environment. At the operation 602, the robot 100 initiates maneuvering about the environment. At the operation 604, the robot 100 collects sensor data and generates mapping data of the environment as the robot 100 maneuvers about the environment. The operations 602 and 604 can be similar to the operations 402 and 404, respectively.

The operations 606, 608, and 610 involve operations to generate a recommended behavior control zone for disabling a behavior of the robot 100. At the operation 606, the computing system 401 identifies a subset of sensor events of the robot 100. At the operation 608, data indicative of a recommended behavior control is generated and provided to the user computing device 188. At the operation 610, the user computing device 188 presents an indicator of the recommended behavior control zone.

The operation 606 can be similar to the operation 202 of the process 200 and the operation 406 of the process 400. Specifically, the set of sensor events can correspond to the set of sensor events described in connection with the operation 202 that are indicative of a behavior that should be disabled to allow the robot 100 to traverse a traversable portion of the floor surface. The operation 608 can be similar to the operation 204 of the process 200 and the operation 408 of the process 400, except that the recommended behavior control zone is a behavior control zone for disabling a behavior of the robot 100 as the robot 100 traverses the recommended behavior control zone. The operation 610 can be similar to the operation 410.

The operations 612 and 614 involve operations for the user 30 to select a behavior control zone. At the operation 612, the user 30 provides an input indicative of a user-selected behavior control zone. At the operation 614, the user computing device 188 presents the indicator of the user-selected behavior control zone. The user 30 can accept the recommended behavior control zone, modify the recommended behavior control zone, or modify the recommended behavior control zone in the manner discussed with respect to the operation 412, and the user interface can be updated in the manner discussed with respect to the operation 414.

Figure 17B:
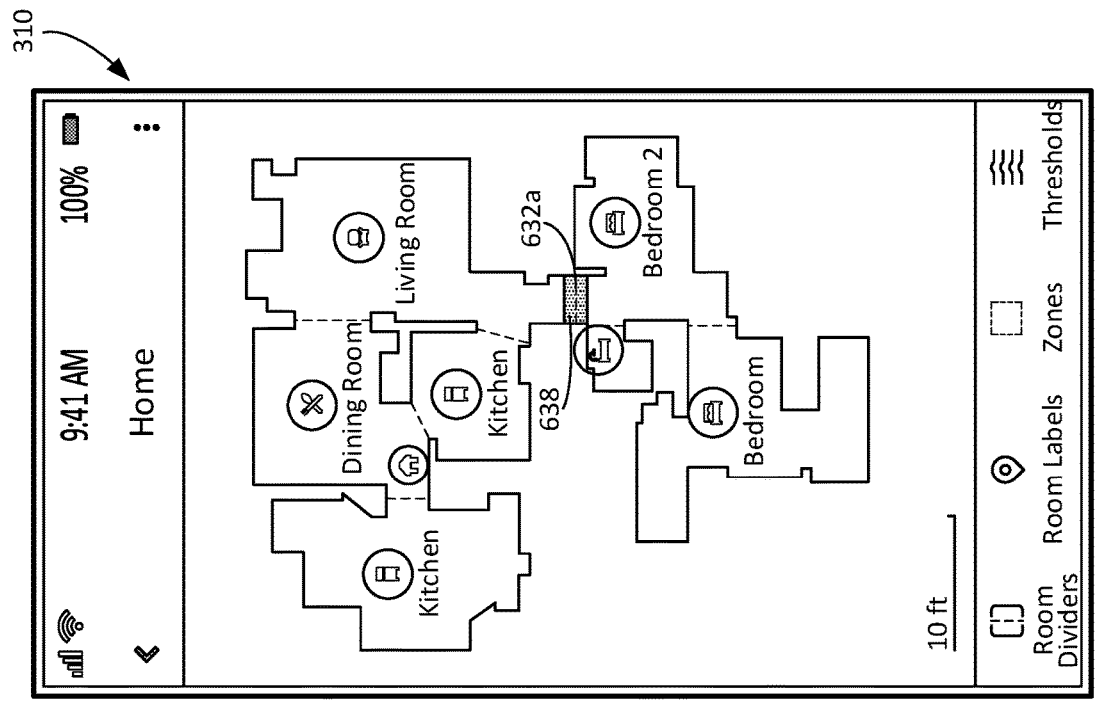
FIGS. 17A-17B are illustrations of user interfaces for establishing a behavior control zone for disabling a behavior of an autonomous mobile robot.
Figure 17A:
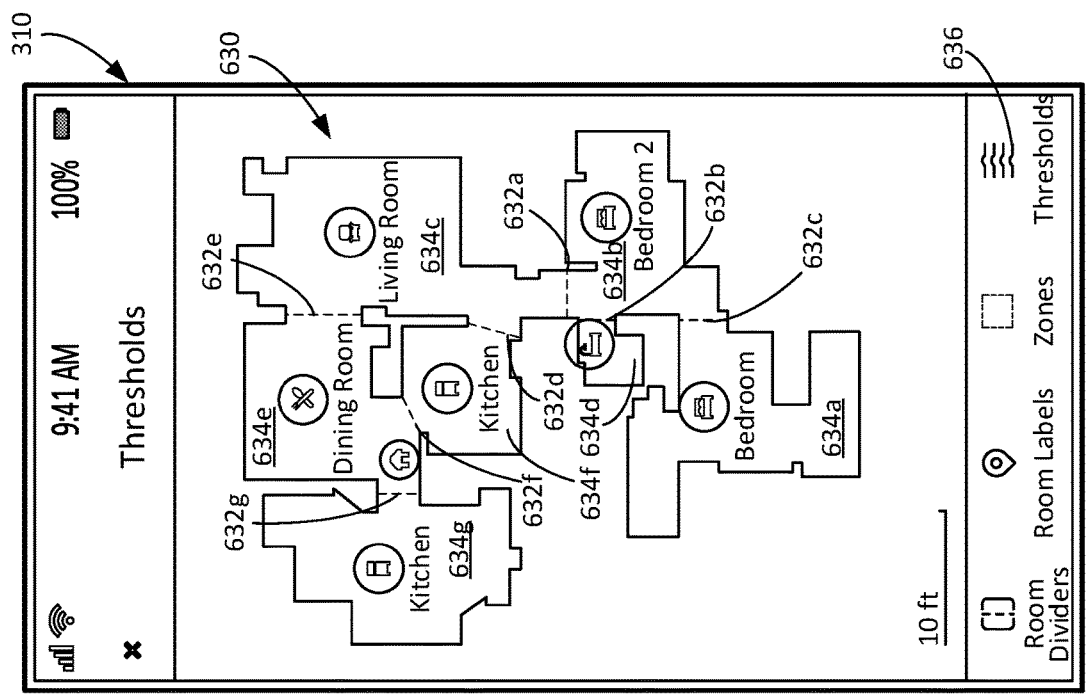

The user 30 can operate the user computing device 188 to provide the input indicative of the user-selected behavior control zone at the operation 612. FIGS. 17A and 17B illustrate an example of the user 30 operating the user computing device 188 in this manner. In the example illustrated in FIGS. 17A and 17B, a recommended behavior control zone is not provided to the user 30. Referring to FIG. 17A, the user interface 310 presents a map 630 of an environment.

The user interface 310 provides a visual representation of a floor plan, including representations of rooms and thresholds between the rooms. For example, the user interface 310 can present indicators 632a-632g of thresholds between indicators 634a-634g of rooms in the environment. The user interface 310 presents a user input element 636 that the user 30 can invoke in to define a user-selected behavior control zone.

Referring to FIG. 17B, after the user input element 636 is invoked, the user 30 can operate the user interface 310 to select one of the indicators 632a-632g of the thresholds (shown in FIG. 17A) to define a behavior control zone. In the example depicted in FIG. 17B, the user 30 invokes the indicator 632a to define a behavior control zone 638 along the threshold represented by the indicator 632a. As discussed in this disclosure, in response to encountering the behavior control zone 638, the robot 100 disables an obstacle avoidance behavior, e.g., the rug ride up behavior, as the robot 100 traverses the behavior control zone 638, thereby allowing the robot 100 to traverse the behavior control zone 638 without triggering a behavior that would cause the robot 100 to move away from the behavior control zone 638.

The operation 616 involves defining the user-selected behavior control zone to allow the user-selected behavior control zone to be used in a mission by the robot 100, e.g., a current mission, a concurrently-initiated mission, or a subsequently-initiated mission. At the operation 616, the user-selected behavior control zone is defined by the computing system 401. The operation 616 is similar to the operation 206 as described with respect to FIG. 5.

The operations 618 and 620 involve operations for initiating a behavior once the robot 100 arrives at the user-selected behavior control zone. At the operation 618, the computing system 401 determines that the robot 100 is proximate to the user-selected behavior control zone or is within the user-selected behavior control zone. At the operation 620, the robot 100 disables a behavior as the robot 100 navigates through the user-selected behavior control zone. As discussed with respect to the operation 504, the behavior can be a rug ride up behavior, a cleaning behavior, or some other appropriate behavior of the robot 100.

Figure 18A:
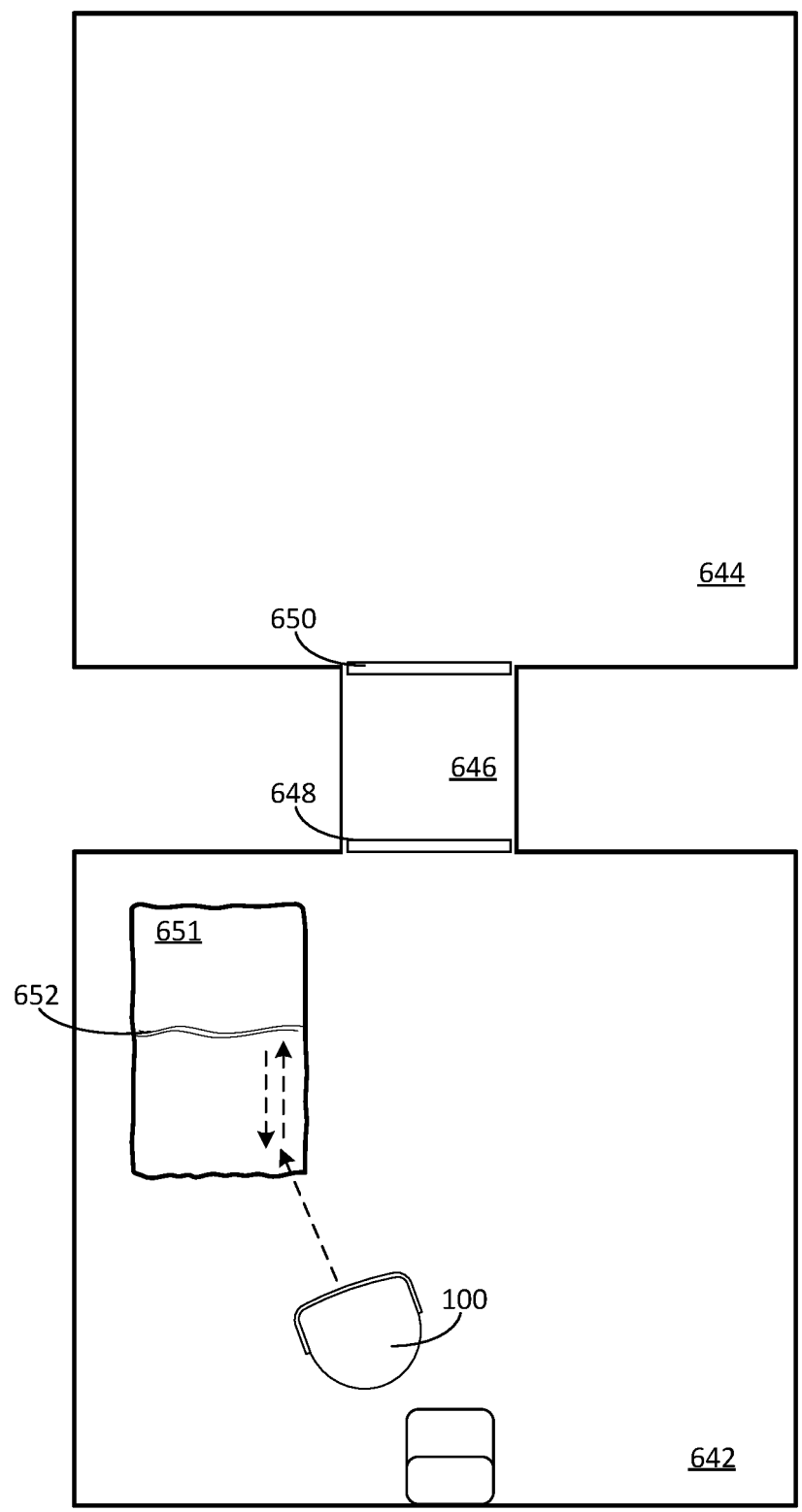
FIGS. 18A-18C are top views of an example of an environment including an autonomous mobile robot operating in accordance with a behavior control zone for disabling a behavior of the robot.
Figure 18B:
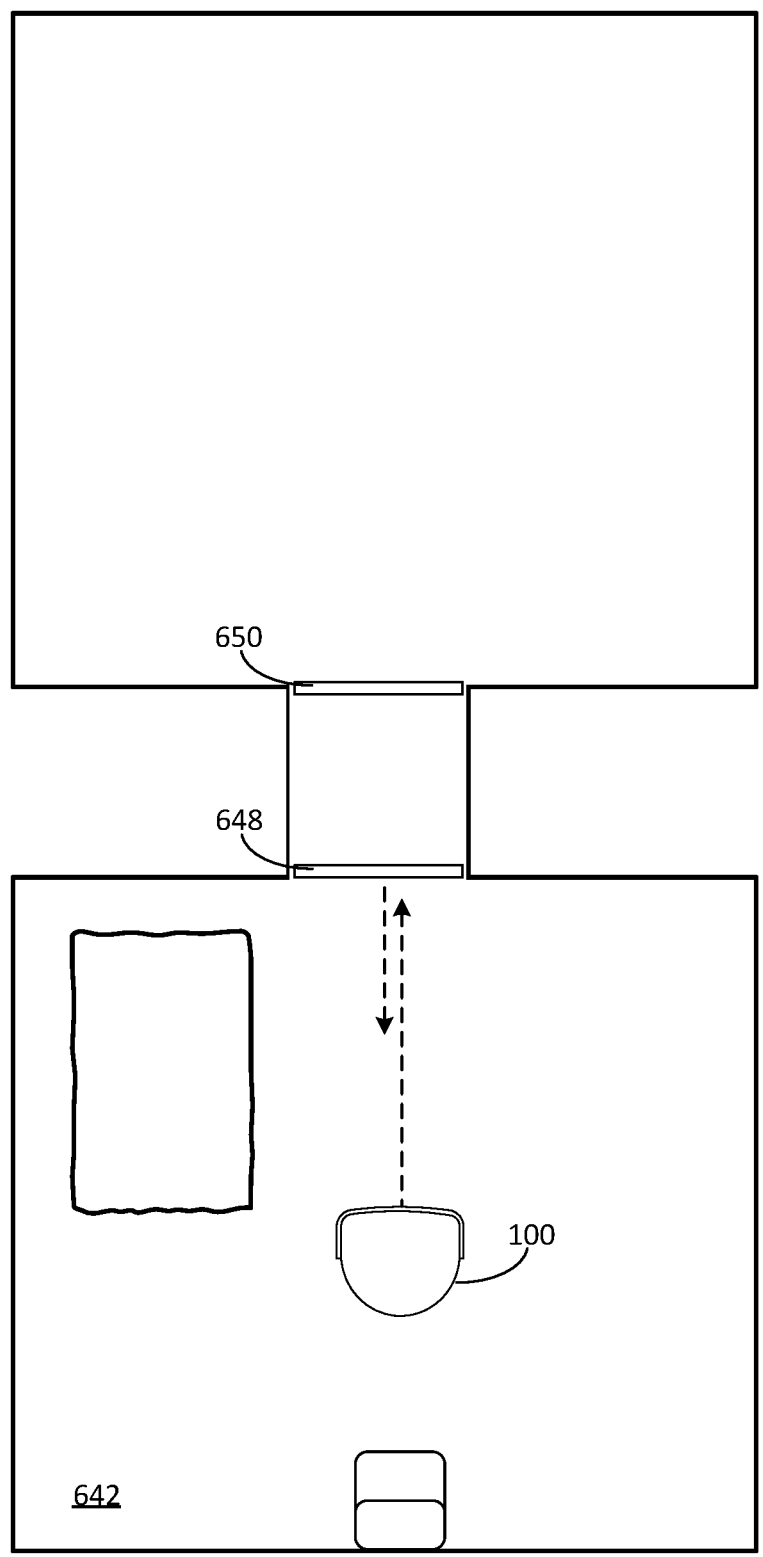
Figure 18C:
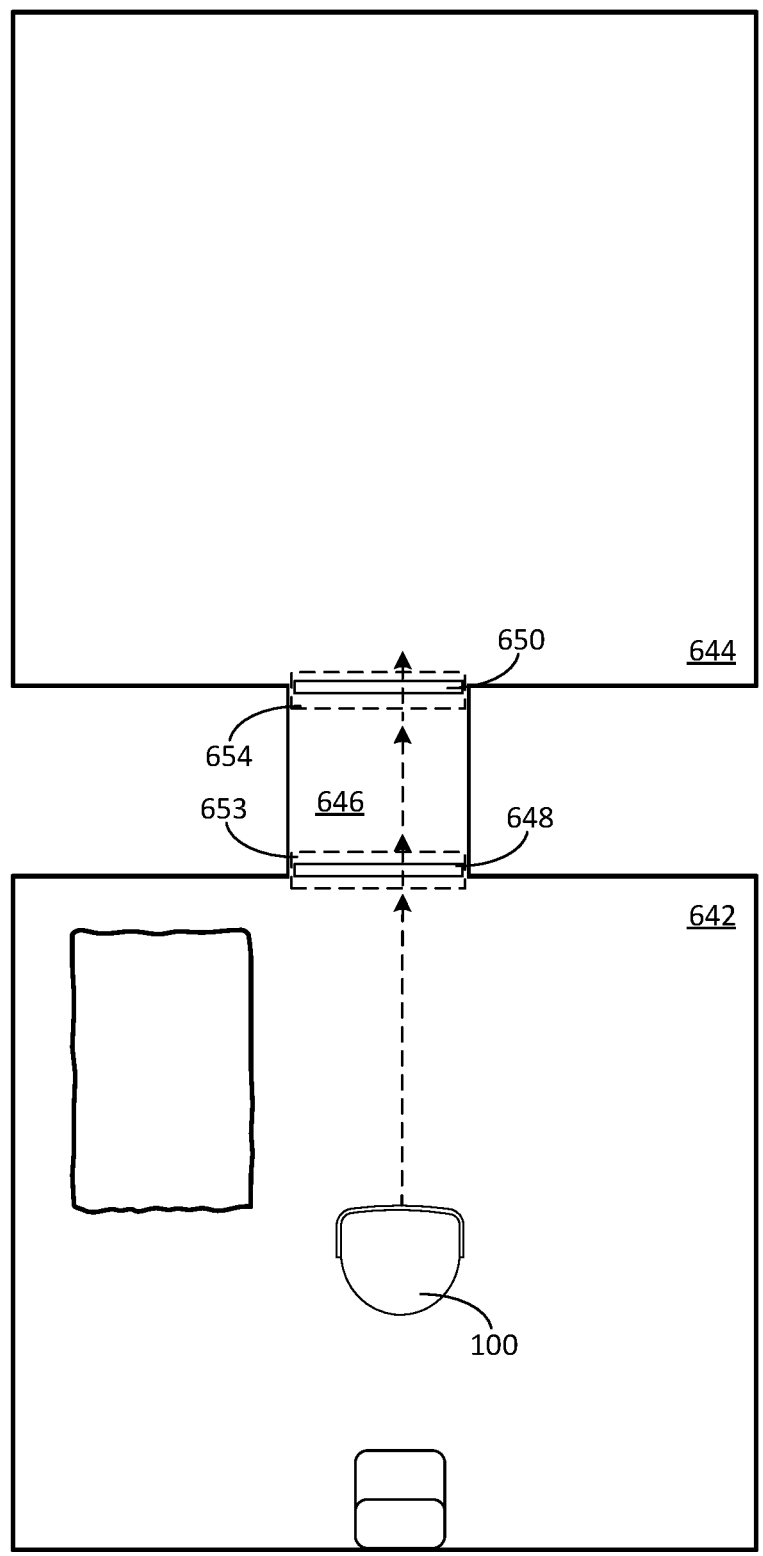

FIGS. 18A-18C illustrate an example of the robot 100 operating in accordance with a behavior control zone that is configured to trigger the robot 100 to disable a behavior as the robot 100 traverses the behavior control zone. Referring to FIG. 18A, the robot 100 navigates about an environment including a first room 642, a second room 644, and a hallway 646 between the first room 642 and the second room 644. A first threshold 648 separates the hallway 646 from the first room 642, and a second threshold 650 separates the hallway 646 from the second room 644. FIG. 18A shows the robot 100, for example, performing a coverage behavior to clean the first room 642. As the robot 100 performs the coverage behavior, the robot 100 initiates a rug ride up behavior in response to a portion 652 of a rug 651 that has ridden up. The robot 100 encounters the ridden up portion 652 and then initiates the rug ride up behavior to avoid the portion 652 of the rug 651. In the rug ride up behavior, the robot 100 reverses away from the portion 652 of the rug 651 to avoid going over the portion 652 of the rug 651 and potentially becoming stuck.

FIG. 18B shows an example of the robot 100 operating in the environment without a behavior control zone across the first threshold 648 or the second threshold 650. For example, the robot 100 performs a coverage behavior to clean the first room 642. As the robot 100 performs the coverage behavior, the robot 100, in response to encountering the first threshold 648, initiates the rug ride up behavior and reverses away from the first threshold 648. To avoid the robot 100 triggering the rug ride up behavior in response to the first threshold 648 or the second threshold 650. The user can establish a behavior control zone that covers the first threshold 648 and a behavior control zone that covers the second threshold 650.

FIG. 18C shows an example in which such behavior control zones have been established, for example, using methods described in this disclosure. A first behavior control zone 653 covers the first threshold 648, and a second behavior control zone 654 covers the second threshold 650. The first and second behavior control zones 653, 654 are configured to cause the robot 100 to disable the rug ride up behavior in response to the robot 100 encountering the behavior control zones 653, 654. As shown in FIG. 18C, instead of reversing relative to the first threshold 648 in response to encountering the first threshold 648, the robot 100 traverses the first threshold 648 because the first behavior control zone 653 causes the robot 100 to disable its rug ride up behavior. Similarly, instead of reversing relative to the second threshold 650 in response to encountering the second threshold 650, the robot 100 traverses the second threshold 650 because the second behavior control zone 654 causes the robot 100 to disable its rug ride up behavior. The robot 100 is thus able to cross the hallway 646 into the second room 644 without the first threshold 648 and the second threshold 650 impeding the movement of the robot 100. In some implementations, the robot 100 can perform a coverage behavior in the hallway 646 before advancing across the second threshold 650 into the second room 644.

The user interface 310 is described as presenting visual information for the user. The user interface 310 can vary in implementations. The user interface 310 can be an opaque display or a transparent display. In the implementation shown in FIG. 4, the user computing device 188 can include an opaque display that can visually present the map as an image viewable on the display. In some implementations, the user computing device 188 can include a transparent display that allows the display to present a virtual reality representation of the map and indicators overlaid on the map.

The robot 100 depicted in FIGS. 2 and 3A-3B is a floor cleaning robot. In particular, the robot 100 is a robot vacuum that moves about the floor surface 10 and ingests debris as the robot 100 moves over debris on the floor surface 10. The type of the robot can vary in implementations. In some implementations, the robot is a floor cleaning robot that uses a cleaning pad moved along the floor surface to collect debris on the floor surface. The robot can include a fluid application device, such as a spraying device, that applies fluid, such as water or a cleaning solution including detergent, to the floor surface to loosen debris on the floor surface. The cleaning pad of the robot can absorb the fluid as the robot moves along the floor surface. In addition to the uses of behavior control zones described herein, when the robot is a wet cleaning robot, the behavior control zones can be used to control other parameters the robot. For example, the behavior control zones can be used to control a fluid application pattern of the robot. The robot may spray the fluid at a certain rate as the robot moves across the floor surface. When the robot encounters or enters into the behavior control zone, the rate at which the robot sprays the fluid may change. Such a behavior control zone may be recommended in response to sensor events indicating a change in floor surface type.

In some implementations, a patrol robot with an image capture device can be used. The patrol robot can include mechanisms to move the image capture device relative to a body of the patrol robot. When the robot is a patrol robot, the behavior control zones can be used to control parameters of the robot in addition to those described herein.

While the robot 100 is described as a circular robot, in other implementations, the robot 100 can be a robot including a front portion that is substantially rectangular and a rear portion that is substantially semicircular. In some implementations, the robot 100 has an outer perimeter that is substantially rectangular.

In some implementations, the recommended behavior control zone and/or the user-selected behavior control zone can snap to a feature in the environment when the behavior control zone is recommended or selected. For example, the feature can be a wall, a perimeter of a room, a perimeter of an obstacle, an object in a room, a room, a doorway, a hallway, or other physical feature in the environment.

The robots and techniques described herein, or portions thereof, can be controlled by a computer program product that includes instructions that are stored on one or more non-transitory machine-readable storage media, and that are executable on one or more processing devices to control (e.g., to coordinate) the operations described herein. The robots described herein, or portions thereof, can be implemented as all or part of an apparatus or electronic system that can include one or more processing devices and memory to store executable instructions to implement various operations.

Operations associated with implementing all or part of the robot operation and control described herein can be performed by one or more programmable processors executing one or more computer programs to perform the functions described herein. For example, the mobile device, a cloud computing system configured to communicate with the mobile device and the autonomous cleaning robot, and the robot's controller may all include processors programmed with computer programs for executing functions such as transmitting signals, computing estimates, or interpreting signals. A computer program can be written in any form of programming language, including compiled or interpreted languages, and it can be deployed in any form, including as a stand-alone program or as a module, component, subroutine, or other unit suitable for use in a computing environment.

The controllers and mobile devices described herein can include one or more processors. Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass PCBs for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

The robot control and operating techniques described herein may be applicable to controlling other mobile robots aside from cleaning robots. For example, a lawn mowing robot or a space-monitoring robot may be trained to perform operations in specific portions of a lawn or space as described herein.

Elements of different implementations described herein may be combined to form other implementations not specifically set forth above. Elements may be left out of the structures described herein without adversely affecting their operation. Furthermore, various separate elements may be combined into one or more individual elements to perform the functions described herein.

A number of implementations have been described. Nevertheless, it will be understood that various modifications may be made. Accordingly, other implementations are within the scope of the claims.

What is claimed is:

1. A method comprising:
   receiving, at a computing system, sensor data collected by an autonomous cleaning robot as the autonomous cleaning robot moves about an environment, the sensor data comprising mapping data indicative of a location of an object in the environment;
   based on the sensor data, determining, by the computing system, a type of the object, wherein the type of the object is associated with a debris level; and
   based on the type of the object being associated with the debris level, defining, by the computing system, a clean zone at the location of the object such that the autonomous cleaning robot initiates a clean behavior constrained to the clean zone in response to encountering the clean zone in the environment.

2. The method of claim 1, wherein determining the type of the object is based on one or more contextual features in the environment proximate to the object and distinct from the object.

3. The method of claim 2, wherein the one or more contextual features indicate a type of a room in which the object is located.

4. The method of claim 1, wherein, after performing the clean behavior within the clean zone, the autonomous cleaning robot
   initiates movement to a second clean zone associated with another object in the environment, and then
   initiates a clean behavior in response to encountering the second clean zone.

5. The method of claim 1, further comprising associating a priority with the clean zone such that the autonomous cleaning robot, based on the priority associated with the clean zone, initiates movement to the clean zone.

6. The method of claim 5, wherein, based on the priority, the autonomous cleaning robot initiates the movement to the clean zone in response to a mission with an expected duration less than a threshold duration.

7. The method of claim 5, wherein, based on the priority, the autonomous cleaning robot initiates the movement to the clean zone in response to a low battery status of the autonomous cleaning robot.

8. The method of claim 5, further comprising causing the autonomous cleaning robot, in response to an initiation of a mission in the environment, to initiate the movement to the clean zone from a docking station based on the priority.

9. The method of claim 1, wherein the clean behavior corresponds to a focused clean behavior.

10. The method of claim 9, wherein the focused clean behavior causes the autonomous cleaning robot to cover the clean zone two or more times, to increase a vacuum power of the autonomous cleaning robot, or to decrease a movement speed of the autonomous cleaning robot.

11. The method of claim 1, wherein the type of the object comprises a sink, a stove, a kitchen counter, a dining room table, a doormat, a door, a kitchen island, a trash can, a window, a pet home, or a cabinet.

12. The method of claim 1, wherein the type of the object is associated with increased debris.

13. The method of claim 12, wherein the type of the object is associated with increased debris on the object or in a vicinity of the object.

14. A method comprising:
   receiving mapping data collected by an autonomous cleaning robot as the autonomous cleaning robot moves about an environment;
   defining a behavior control zone corresponding to a portion of the mapping data such that an autonomous cleaning robot initiates a behavior in response to encountering the behavior control zone in the environment; and
   associating a priority with the behavior control zone such that the autonomous cleaning robot, based on the priority associated with the behavior control zone, initiates movement to the behavior control zone, wherein the priority is associated with a temporal condition based on which the autonomous cleaning robot initiates movement to the behavior control zone.

15. The method of claim 14, wherein the temporal condition comprises that, based on the priority, the autonomous cleaning robot
   initiates the movement to the behavior control zone at a start of a mission, and then
   initiates the behavior in response to encountering the behavior control zone, the behavior corresponding to a focused clean behavior performed within the behavior control zone.

16. The method of claim 15, wherein, after performing the focused clean behavior within the behavior control zone, the autonomous cleaning robot
   initiates movement to a second behavior control zone associated with another priority lower than the priority associated with the behavior control zone, and then
   initiates a focused clean behavior in response to encountering the second behavior control zone.

17. The method of claim 14, wherein associating the priority with the behavior control zone comprises associating the priority with the behavior control zone based on a user selection of an environmental feature to associate with the behavior control zone.

18. The method of claim 14, further comprising:
   defining a plurality of behavior control zones, wherein defining the plurality of behavior control zones comprises defining the behavior control zone; and
   associating a plurality of priorities with the plurality of behavior control zones, respectively, wherein associating the plurality of priorities with the plurality of behavior control zones comprises associating the priority with the behavior control zone.

19. The method of claim 18, further comprising providing, to the autonomous cleaning robot, a schedule to cause the autonomous cleaning robot to prioritize cleaning a first subset of the plurality of behavior control zones during a first time, and to prioritize cleaning a second subset of the plurality of behavior control zones during a second time.

20. The method of claim 19, wherein the first time is during a first cleaning mission, and the second time is during a second cleaning mission.

21. The method of claim 19, wherein the first time and the second time are during a cleaning mission.

22. The method of claim 14, wherein the temporal condition comprises that the autonomous cleaning robot initiates the movement to the behavior control zone in response to a mission with an expected duration less than a threshold duration.

23. The method of claim 14, wherein the priority associated with the behavior control zone varies based on an event.

24. The method of claim 23, wherein the event comprises a time of day, a time of year, or a weather event.

* * * * *